United States Patent
Fieldman

(10) Patent No.: US 10,515,561 B1
(45) Date of Patent: *Dec. 24, 2019

(54) VIDEO PRESENTATION, DIGITAL COMPOSITING, AND STREAMING TECHNIQUES IMPLEMENTED VIA A COMPUTER NETWORK

(71) Applicant: Study Social, Inc., Gainesville, FL (US)

(72) Inventor: Ethan Fieldman, Gainesville, FL (US)

(73) Assignee: STUDY SOCIAL, INC., Gainesville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,672

(22) Filed: Sep. 27, 2018

Related U.S. Application Data

(63) Continuation of application No. 15/299,658, filed on Oct. 21, 2016, which is a continuation-in-part of
(Continued)

(51) Int. Cl.
| | | |
|---|---|---|
| G09B 5/06 | (2006.01) | |
| G09B 7/00 | (2006.01) | |
| H04N 21/81 | (2011.01) | |
| H04N 21/472 | (2011.01) | |
| H04N 21/2187 | (2011.01) | |

(Continued)

(52) U.S. Cl.
CPC ............... *G09B 5/065* (2013.01); *G09B 5/10* (2013.01); *G09B 7/00* (2013.01); *G11B 27/031* (2013.01); *H04N 21/2187* (2013.01); *H04N 21/47205* (2013.01); *H04N 21/816* (2013.01); *H04N 21/854* (2013.01)

(58) Field of Classification Search
None
See application file for complete search history.

(56) References Cited

U.S. PATENT DOCUMENTS

| | | | |
|---|---|---|---|
| 4,400,724 A | * | 8/1983 | Fields ................. H04L 12/1813 348/14.1 |
| 4,654,648 A | | 3/1987 | Herrington |

(Continued)

FOREIGN PATENT DOCUMENTS

| | | |
|---|---|---|
| KR | 20060135411 | 12/2006 |
| KR | 100924688 | 11/2009 |

(Continued)

OTHER PUBLICATIONS

Vantage AVcom; "Lumens CL510 Ceiling Document Camera"; Feb. 2, 2012; https://www.youtube.com/watch?time_continue=30&v=MNhPZdhHjBw (Year: 2012).*

(Continued)

*Primary Examiner* — Eddy Saint-Vil
*Assistant Examiner* — William D Ermlick
(74) *Attorney, Agent, or Firm* — Beyer Law Group LLP

(57) ABSTRACT

Various aspects disclosed herein are directed to Online Education techniques and award incentives for facilitating collaborative, social online education. One aspect disclosed herein is directed to different methods, systems, and computer program products for facilitating mobile video presentations using digital compositing techniques.

47 Claims, 58 Drawing Sheets

Related U.S. Application Data application No. 14/791,700, filed on Jul. 6, 2015, application No. 16/144,672, which is a continuation-in-part of application No. 14/659,436, filed on Mar. 16, 2015, and a continuation-in-part of application No. 14/641,840, filed on Mar. 9, 2015, now Pat. No. 10,126,927, said application No. 14/791,700 is a continuation-in-part of application No. 14/216,688, filed on Mar. 17, 2014, now abandoned.

(60) Provisional application No. 62/076,049, filed on Nov. 6, 2014, provisional application No. 61/954,419, filed on Mar. 17, 2014, provisional application No. 61/799,332, filed on Mar. 15, 2013.

(51) Int. Cl.
*G09B 5/10* (2006.01)
*G11B 27/031* (2006.01)
*H04N 21/854* (2011.01)

(56) References Cited

U.S. PATENT DOCUMENTS

| | | | |
|---|---|---|---|
| 4,730,218 A * | 3/1988 | Goodrich | H04N 5/2222 348/335 |
| 4,821,118 A * | 4/1989 | Lafreniere | G07C 9/00079 348/150 |
| 4,827,410 A | 5/1989 | Corren | |
| 4,843,568 A | 6/1989 | Krueger et al. | |
| 5,025,314 A | 6/1991 | Tang et al. | |
| 5,239,373 A * | 8/1993 | Tang | H04N 1/00283 348/14.01 |
| 5,363,120 A | 11/1994 | Drumm | |
| 5,400,069 A * | 3/1995 | Braun | H04N 7/144 348/14.08 |
| 5,436,639 A | 7/1995 | Arai | |
| 5,489,938 A | 2/1996 | Maruyama et al. | |
| 5,546,598 A * | 8/1996 | Yamaguchi | H04N 7/15 345/501 |
| 5,638,092 A | 6/1997 | Eng | |
| 5,731,846 A | 3/1998 | Kreitman et al. | |
| 5,732,227 A | 3/1998 | Kuzunuki et al. | |
| 5,737,031 A | 4/1998 | Tzidon et al. | |
| 5,886,747 A | 3/1999 | Tzidon et al. | |
| 6,052,648 A | 4/2000 | Burfeind et al. | |
| 6,121,981 A | 9/2000 | Trower, II et al. | |
| 6,288,753 B1 | 9/2001 | DeNicola et al. | |
| 6,400,932 B1 | 6/2002 | Yamaguchi | |
| 7,164,392 B2 * | 1/2007 | Nishimura | G09G 5/08 345/173 |
| 7,434,154 B2 * | 10/2008 | Konetski | H04N 5/76 348/E5.006 |
| 7,916,120 B2 | 3/2011 | Tiphane | |
| 8,064,817 B1 | 11/2011 | Ziv-El | |
| 8,230,367 B2 | 7/2012 | Bell et al. | |
| 8,259,163 B2 | 9/2012 | Bell | |
| 8,339,418 B1 | 12/2012 | Nesmith | |
| 8,358,964 B2 | 1/2013 | Radtke et al. | |
| 9,164,590 B2 | 10/2015 | Patel et al. | |
| 9,298,884 B1 | 3/2016 | Ahmad | |
| 9,635,281 B2 * | 4/2017 | Takahashi | H04N 5/2621 |
| 9,671,931 B2 * | 6/2017 | Kosmach | G06F 3/04845 |
| 9,697,562 B2 | 7/2017 | De Assuncao et al. | |
| 9,900,669 B2 | 2/2018 | Touma | |
| 10,084,849 B1 | 9/2018 | Segal | |
| 10,122,966 B2 * | 11/2018 | Horio | H04M 11/00 |
| 2004/0109014 A1 | 6/2004 | Henderson | |
| 2004/0241624 A1 | 12/2004 | Sudo | |
| 2004/0252400 A1 * | 12/2004 | Blank | G06F 17/30017 360/70 |
| 2005/0243062 A1 | 11/2005 | Liberty | |
| 2005/0270494 A1 | 12/2005 | Banning | |
| 2006/0238548 A1 | 10/2006 | Stotts, Jr. et al. | |
| 2007/0150612 A1 | 6/2007 | Chaney et al. | |
| 2008/0184124 A1 * | 7/2008 | Agarwal | G06Q 10/10 715/733 |
| 2008/0261195 A1 * | 10/2008 | Kanamaru | G09B 5/00 434/362 |
| 2009/0256901 A1 * | 10/2009 | Mauchly | H04N 5/45 348/14.07 |
| 2010/0081116 A1 | 4/2010 | Barasch et al. | |
| 2010/0115047 A1 * | 5/2010 | Briscoe | G06F 1/12 709/208 |
| 2010/0135334 A1 * | 6/2010 | Briscoe | H04J 3/0664 370/503 |
| 2010/0253850 A1 | 10/2010 | Cooper et al. | |
| 2010/0289903 A1 * | 11/2010 | Farquharson | G03B 21/00 348/207.1 |
| 2010/0289906 A1 * | 11/2010 | Kaye | G09B 7/00 348/207.11 |
| 2010/0318921 A1 * | 12/2010 | Trachtenberg | G06Q 10/10 715/751 |
| 2011/0242277 A1 * | 10/2011 | Do | H04N 5/272 348/43 |
| 2012/0038549 A1 | 2/2012 | Mandella et al. | |
| 2012/0070808 A1 | 3/2012 | Fulkerson et al. | |
| 2012/0081611 A1 | 4/2012 | Tan et al. | |
| 2012/0171656 A1 | 7/2012 | Shen | |
| 2012/0231441 A1 * | 9/2012 | Parthasarathy | G09B 7/02 434/362 |
| 2013/0031208 A1 | 1/2013 | Linton et al. | |
| 2013/0057642 A1 | 3/2013 | Catchpole | |
| 2013/0084553 A1 * | 4/2013 | Kaneko | G09B 5/067 434/350 |
| 2013/0314421 A1 * | 11/2013 | Kim | G09B 5/065 345/427 |
| 2014/0111600 A1 * | 4/2014 | Schaefer | H04N 5/232 348/14.08 |
| 2014/0111690 A1 * | 4/2014 | Kim | H04N 21/42203 348/565 |
| 2014/0133836 A1 * | 5/2014 | Burns | G11B 27/10 386/278 |
| 2014/0146204 A1 * | 5/2014 | Boss | H04N 5/23229 348/239 |
| 2014/0232905 A1 * | 8/2014 | Jung | H04N 5/265 348/239 |
| 2014/0232906 A1 * | 8/2014 | Ha | H04N 5/265 348/239 |
| 2014/0232921 A1 * | 8/2014 | Kim | H04N 5/23293 348/333.05 |
| 2014/0240540 A1 * | 8/2014 | Kim | H04N 5/2258 348/231.99 |
| 2014/0240543 A1 * | 8/2014 | Kim | H04N 5/2258 348/231.99 |
| 2014/0240551 A1 * | 8/2014 | Kim | H04N 5/2258 348/239 |
| 2014/0306995 A1 | 10/2014 | Raheman et al. | |
| 2014/0321834 A1 | 10/2014 | Segal | |
| 2015/0009349 A1 * | 1/2015 | Kim | H04N 5/2258 348/218.1 |
| 2015/0029294 A1 * | 1/2015 | Lin | H04N 7/141 348/14.01 |
| 2015/0127340 A1 * | 5/2015 | Epshteyn | G10L 15/26 704/235 |
| 2015/0172552 A1 * | 6/2015 | Kim | H04N 5/23293 348/333.05 |
| 2015/0181134 A1 * | 6/2015 | Takahashi | H04N 5/2621 348/239 |
| 2015/0186744 A1 | 7/2015 | Nguyen et al. | |
| 2015/0187076 A1 * | 7/2015 | Lin | H04N 7/15 382/103 |
| 2015/0188970 A1 * | 7/2015 | Kowshik | H04L 65/602 715/204 |
| 2015/0189146 A1 * | 7/2015 | Venshtain | H04N 5/2352 382/103 |
| 2015/0262189 A1 | 9/2015 | Hendrikus | |
| 2015/0271401 A1 * | 9/2015 | Khoury | H04N 5/23238 348/36 |
| 2016/0012739 A1 | 1/2016 | Jafari | |

(56) References Cited

U.S. PATENT DOCUMENTS

| | | | |
|---|---|---|---|
| 2016/0057317 A1* | 2/2016 | Zhao | H04N 21/4627 348/515 |
| 2016/0119532 A1* | 4/2016 | Chen | G06T 7/593 348/211.2 |
| 2016/0260236 A1 | 9/2016 | Fogarty et al. | |
| 2016/0269631 A1 | 9/2016 | Jiang et al. | |
| 2016/0313822 A1 | 10/2016 | Krishnakumar et al. | |
| 2016/0330497 A1* | 11/2016 | VanAntwerp | H04N 21/2665 |
| 2016/0350585 A1* | 12/2016 | Lin | H04N 7/15 |
| 2016/0373693 A1 | 12/2016 | Segal et al. | |
| 2017/0039867 A1 | 2/2017 | Fieldman | |
| 2017/0126592 A1* | 5/2017 | El Ghoul | H04L 51/04 |
| 2017/0295926 A1 | 10/2017 | Shen | |
| 2018/0033326 A1 | 2/2018 | Gok | |
| 2018/0197430 A1 | 7/2018 | Apokatanidis | |

FOREIGN PATENT DOCUMENTS

| | | |
|---|---|---|
| KR | 101351085 B1 * | 1/2014 |
| WO | WO-2012121277 | 9/2012 |

OTHER PUBLICATIONS

Reflecmedia; "Reflecmedia—low cost/high quality chroma key"; Apr. 19, 2011; https://sites.duke.edu/nab2011/2011/04/19/reflecmedia-low-costhigh-quality-chroma-key/ (Year: 2011).*

PrompterPeople; "Prompter People FLEX-D-UC17 Under-Camera Teleprompter"; Aug. 14, 2012; https://web.archive.org/web/20120814013819/https://www.bhphotovideo.com/c/product/632617-REG/Propmpter_People_FLEX_D_UC17_FLEX_D_UC17_Under_Camera_Teleprompter.html (Year: 2012).*

Screenshot of video presentation from https://www.khanacademy.org/math/algebra/quadratics/quadratics-square-root/e/solving_quadratics_by_taking_the_square_root, captured on or before Apr. 2, 2015.

Screenshot of webpage from www.mathtv.com/#, captured on or before Apr. 2, 2015.

Screenshot of webpage from Brightstorm.com, captured on or before Apr. 2, 2015.

Screenshot of video presentation from http://www.hippocampus.org/HippoCampus/Algebra%20%26%20Geometry;jsessionid=BB8CA4E674D7DC84DABD7042E3E6F4EB, captured on or before Apr. 2, 2015.

Screenshots of 2 video presentations from youtube.com, captured on or before Apr. 2, 2015.

Screenshot of video presentation from clutchprep.com, captured on or before Apr. 2, 2015.

2 Screenshots of webpages from tutoringzone.com, captured on or before Apr. 2, 2015.

Screenshot of video presentation from https://www.youtube.com/watch?v=N1I4Afti6XE, captured on or before Apr. 2, 2015.

2 Screenshots of video presentations from https://class.coursera.org/algo-004/lecture/167, captured on or before Apr. 2, 2015.

Screenshot of webpage from learnzillion.com, captured on or before Apr. 2, 2015.

Screenshot of webpage from mystatlab.com, captured on or before Apr. 2, 2015.

2 Screenshots of video presentations from mymathlab.com, captured on or before Apr. 2, 2015.

Screenshot of video presentation from http://ufonline.ufl/edu/, captured on or before Apr. 2, 2015.

2 Screenshots of video presentations from coursera.com, captured on or before Apr. 2, 2015.

Screenshot of video presentation from echo360.com, captured on or before Apr. 2, 2015.

Screenshot of video presentation from panopto.com, captured on or before Apr. 2, 2015.

Screenshot of video presentation from mediasite.com, captured on or before Apr. 2, 2015.

Screenshot of video presentation from newtek.com, captured on or before Apr. 2, 2015.

2 Screenshots of webpages form soundfoundry.com, captured on or before Apr. 2, 2015.

Screenshot of video presentation from http://mymathuniverse.com/channels/1, captured on or before Apr. 2, 2015.

Fieldman, U.S. Appl. No. 14/791,700, filed Jul. 6, 2015.

Fieldman, U.S. Appl. No. 15/299,658 filed Jul. 6, 2015.

AWSAndroid, "Android Remote Presentation", Feb. 8, 2011, https://www.youtube.com/watch?v=YqHgOXuBgO0.

IPEVO; Design for learning; Feb. 10, 2014; https://web.archive.org/web/20140210020746/https://www.ipevo.com/prods/point-2-view-usb-camera.

I PEVO; USB Document Camera; Jan. 2012; https://web.archive.org/web/20120114103440/https://www.ipevo.com/prods/point-2-view-usb-camera.

Final Office Action dated Jul. 17, 2017 from U.S. Appl. No. 15/299,658.

English Translation of KR-20060135411-A; Gi; 2006 (Year: 2006).

* cited by examiner

Fig. 11

Graph the equation: $y = -\frac{1}{2}x + 3$ $m = -\frac{1}{2}$   $b = 3$

Graph the equation: $x + y = 1$

Video 5 – Identify a Graph From an Equation (Shorter Version)
Video Problems? Click here.

Fig. 16D

VIDEO PRESENTATION, DIGITAL COMPOSITING, AND STREAMING TECHNIQUES IMPLEMENTED VIA A COMPUTER NETWORK

RELATED APPLICATION DATA

This application is a continuation application, pursuant to the provisions of 35 U.S.C. § 120, of prior U.S. patent application Ser. No. 15/299,658 titled "MOBILE VIDEO PRESENTATION, DIGITAL COMPOSITING, AND STREAMING TECHNIQUES IMPLEMENTED VIA A COMPUTER NETWORK" by Fieldman, filed on Oct. 21, 2016, which in turn is a continuation-in-part application, pursuant to the provisions of 35 U.S.C. § 120, of prior U.S. patent application Ser. No. 14/791,700 titled "VIDEO PRESENTATION, DIGITAL COMPOSITING, AND STREAMING TECHNIQUES IMPLEMENTED VIA A COMPUTER NETWORK" by Fieldman, filed on Jul. 6, 2015, which in turn is a continuation-in-part application, pursuant to the provisions of 35 U.S.C. § 120, of prior U.S. patent application Ser. No. 14/216,688 titled "METHODS FOR ONLINE EDUCATION" by Fieldman, filed on Mar. 17, 2014, which claims benefit of U.S. provisional application No. 61/799,332, titled "PROVISION OF ONLINE EDUCATION" naming Ethan Fieldman as inventor, filed Mar. 15, 2013, all of which are incorporated by reference for all purposes.

This application is also a continuation-in-part application of U.S. patent application Ser. No. 14/659,436 titled "AWARD INCENTIVES FOR FACILITATING COLLABORATIVE, SOCIAL ONLINE EDUCATION" naming Ethan Fieldman as inventor, filed on Mar. 16, 2015, and of U.S. patent application Ser. No. 14/641,840 titled "COLLABORATIVE, SOCIAL ONLINE EDUCATION AND WHITEBOARD TECHNIQUES", by Fieldman, filed on Mar. 9, 2015, which claims benefit, pursuant to the provisions of 35 U.S.C. § 119, of U.S. provisional application Nos. 62/076,049, titled "COLLABORATIVE, SOCIAL ONLINE EDUCATION AND WHITEBOARD TECHNIQUES", by Fieldman, filed Nov. 6, 2014 and 61/954,419, titled "PROVISION OF ONLINE EDUCATION", by Fieldman, filed Mar. 17, 2014. Each of these applications is incorporated by reference for all purposes.

BACKGROUND

The present disclosure relates to online education. More particularly, the present disclosure relates to various techniques for award incentives for facilitating collaborative, social online education.

Online education is increasing in popularity and user participation. The strength and appeal of online education is that users do not have to be in the same location, either physically or academically, in order to collaborate and learn. However, this strength is undermined by existing limitations in online learning platforms.

Despite advances in online education techniques, it remains problematic to engage in discussions and/or collaborations focused on non-textual material in online discussion forums, chat rooms, discussion walls, etc. It also remains problematic to engage in online video presentations and/or online educational videos. For example, many of today's online educational videos do not capture student attention for long (or at all), and often come across as being impersonal or mechanical. Such educational videos typically have to choose between showing an instructor, speaking to a camera (lecture style), or featuring the problem at hand, with instruction, if any is given, as a voiceover (documentary style). None of these styles is conducive to learning, particularly math-related learning. For example, in educational videos providing math instruction via the documentary style, students may need to view problems and equations (presented in the educational video) in order to follow along fully, and are therefore unable to simultaneously or concurrently observe the visual cues of the Presenter. As a result, the student's eye never quite knows where to "rest". Such issues are detrimental to the online learning experience, particularly in situations involving concepts that need to be illustrated in order to be understood and/or discussed.

BRIEF DESCRIPTION OF THE DRAWINGS

FIGS. 6-10 and 11-13 illustrate example screenshots of various graphical user interfaces (GUIs), which may be used for facilitating activities relating to one, or more of the online social education aspects disclosed herein.

FIGS. 16A-E illustrate example screenshots of various GUIs which may be used for facilitating activities relating to one or more of the video presentation and digital compositing aspects disclosed herein.

DETAILED DESCRIPTION OF EXAMPLE EMBODIMENTS

Overview

Figure 1:
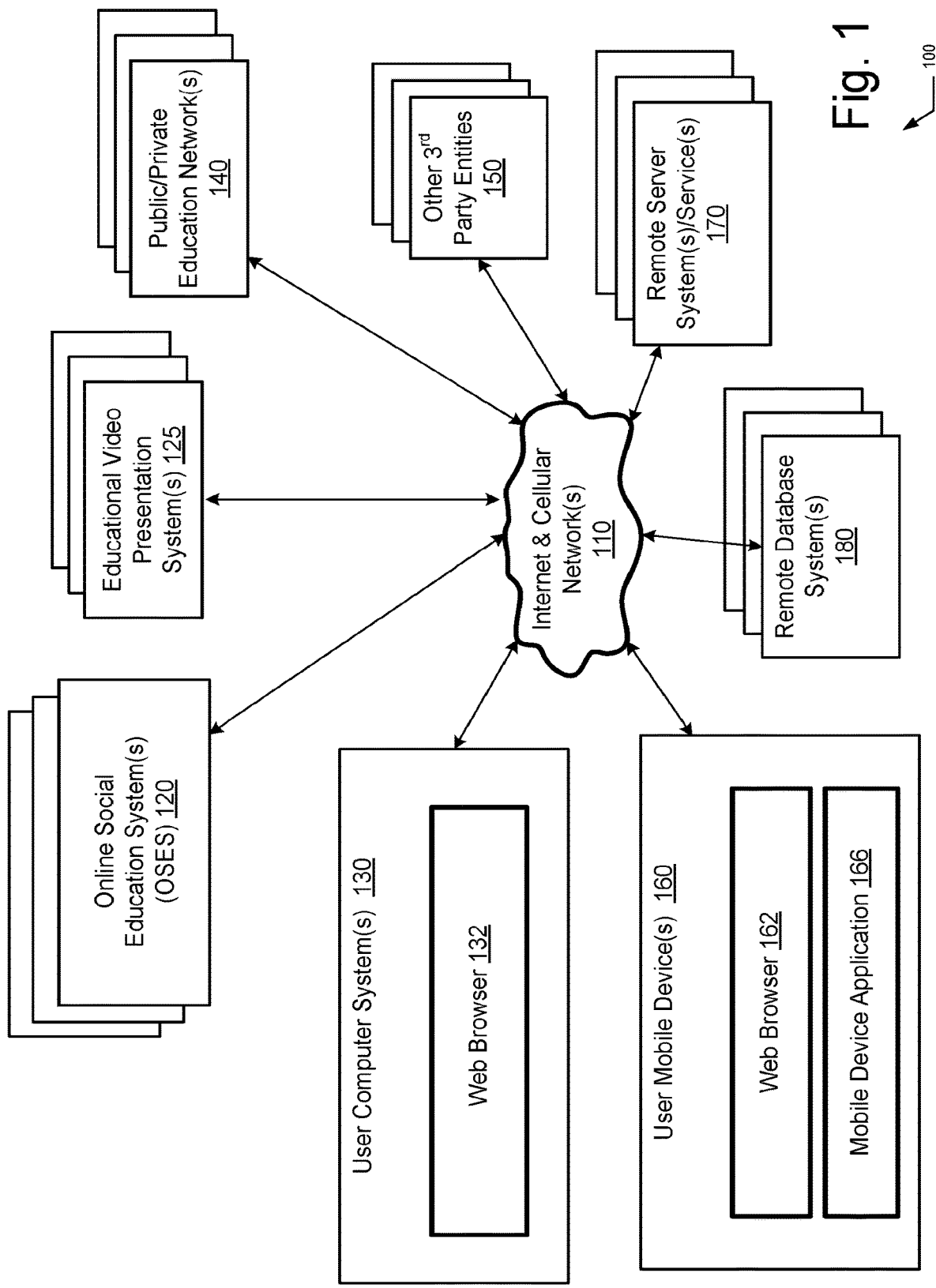
FIG. 1 illustrates a simplified block diagram of a specific example embodiment of an Online Social Education Network (OSEN) or Online Social Education System (OSES), which may be implemented via a computerized data network.

Various aspects described or referenced herein are directed to different methods, systems, and computer program products relating to online education techniques, functions and features.

One aspect disclosed herein is directed to different methods, systems, and computer program products for facilitating collaborative, online education, video presentation and digital compositing via a computer network.

Another aspect disclosed herein is directed to different methods, systems, and computer program products for using a mobile device to facilitate presentation of a streamed video media presentation over a computer network. In at least one embodiment, the computer network includes a video presentation production system comprising a mobile device that includes at least one processor, memory, a first display, a first camera component, and a first microphone. In at least one embodiment, the mobile device is configured to cause the at least one processor to execute instructions stored in the memory to: capture, using the first camera component, a video media of a presenter delivering a first live mobile video presentation, and further being configured to generate a presenter video feed of the presenter delivering the first mobile video presentation; generate a first presentation content feed relating to the first mobile video presentation, the first presentation content feed including a first portion of presentation content; and generate a composite video presentation feed comprising a Chroma key composite video image of the presenter video feed overlaid or superimposed over a portion of the first presentation content feed.

Additional method(s), system(s) and/or computer program product(s) may be further operable to cause at least one processor to execute additional instructions to display, at the first display, a video presentation graphical user interface ("video presentation GUI") which is operable to display a real-time feed of the composite video presentation feed.

Additional method(s), system(s) and/or computer program product(s) may be further operable to cause at least one processor to execute additional instructions to: cause a video presentation graphical user interface ("video presentation GUI") to be displayed at the first display; cause the video presentation graphical user interface to display a real-time feed of the composite video presentation feed in a manner such that presenter is able to view, while delivering the first mobile video presentation, displayed content on the first display concurrently while substantially maintaining eye contact with the first camera component.

Additional method(s), system(s) and/or computer program product(s) may be further operable to cause at least one processor to execute additional instructions to cause the composite video presentation feed to be simultaneously streamed to a plurality of end user devices in substantially real-time, while presenter delivering a first live presentation.

Additional method(s), system(s) and/or computer program product(s) may be further operable to cause at least one processor to execute additional instructions to: enable the presenter to selectively add, in real-time and while the presenter is delivering the first mobile video presentation, at least one annotation to the first portion of presentation content; and enable the presenter to view the annotated presentation content on the display screen in substantially real-time, while the presenter is delivering the first mobile video presentation.

Additional method(s), system(s) and/or computer program product(s) may be further operable to cause at least one processor to execute additional instructions to: capture content displayed on the first display of the mobile device; and generate the presentation content feed using at least a portion of the captured display content.

Additional method(s), system(s) and/or computer program product(s) may be further operable to cause at least one processor to execute additional instructions to: identify presenter image content from the presenter video feed, wherein the presenter image content represents an image of the presenter; identify background content of the presenter video feed to be filtered from the presenter video feed; and dynamically generate a filtered presenter video feed which includes the presenter image content, and which does not include the identified background content.

Additional method(s), system(s) and/or computer program product(s) may be further operable to cause at least one processor to execute additional instructions to: identify, while the presenter is delivering the first mobile video presentation, presenter image content from the presenter video feed, wherein the presenter image content represents an image of the presenter; identify, while the presenter is delivering the first mobile video presentation, background content of the presenter video feed to be filtered from the presenter video feed; dynamically generate, while the presenter is delivering the first mobile video presentation, a filtered presenter video feed which includes the presenter image content, and which does not include the identified background content; and use the filtered presenter video feed generate the Chroma key composite video image of the composite video presentation feed.

Additional method(s), system(s) and/or computer program product(s) may be further operable to cause at least one processor to execute additional instructions for streaming the presenter video feed as a first media stream; streaming the presentation content feed as a second media stream; and synchronizing streaming of the first media stream and the second media stream.

Additional method(s), system(s) and/or computer program product(s) may be further operable to cause at least one processor to execute additional instructions for enabling an end user to dynamically resize the video image of the presenter.

Additional method(s), system(s) and/or computer program product(s) may be further operable to cause at least one processor to execute additional instructions for enabling the end user to dynamically resize the video image of the presenter in real-time, while first video presentation is being displayed to the end user.

Additional method(s), system(s) and/or computer program product(s) may be further operable to cause at least one processor to execute additional instructions for enabling the end user to dynamically resize the video image of the presentation content feed.

Additional method(s), system(s) and/or computer program product(s) may be further operable to cause at least one processor to execute additional instructions for enabling the end user to dynamically adjust a transparency display characteristic of the video image of the presenter.

Additional method(s), system(s) and/or computer program product(s) may be further operable to cause at least one processor to execute additional instructions for enabling the end user to dynamically adjust a transparency display characteristic of the video image of the presentation content feed.

Additional method(s), system(s) and/or computer program product(s) may be further operable to cause at least one processor to execute additional instructions for: causing the first video presentation to be displayed in a manner such that the video image of the presenter is superimposed over a first region of displayed presentation content associated with the presentation content feed; and enabling the end user to dynamically move the video image of the presenter over a second region of displayed presentation content associated with the presentation content feed.

Additional method(s), system(s) and/or computer program product(s) may be further operable to cause at least one processor to execute additional instructions for configuring the video presentation GUI to enable one or more end users to participate in an online, collaborative discussion thread which is linked to the first video presentation.

Another aspect disclosed herein is directed to a video presentation production system comprising: a video presentation server including at least one processor and a memory; a first video camera communicatively coupled to the video presentation server, the first video camera being configured to capture a video image of a presenter delivering a first live presentation, and further configured to generate a first presenter video feed of the presenter delivering the first mobile video presentation; a presentation content production system communicatively coupled to the video presentation server, the communicatively coupled to the video presentation server configured to generate a first presentation content feed relating to the first mobile video presentation, the first presentation content feed including at least one image of presentation content selected from a group consisting of: a hand written note, a whiteboard canvas, an annotation generated by the presenter, animation, a graph, an equation, a picture, a slide, a spreadsheet, and a document; the video presentation server being operable to cause the at least one processor to execute a plurality of instructions stored in the memory for: (i) generating, using a Chroma key compositing technique, an output presenter video feed comprising a Chroma key composite video image of the presenter delivering the first mobile video presentation, and (ii) generating, using the output presenter video feed and the first presentation content feed, a first video presentation media stream configured to present the first mobile video presentation in a manner such that the Chroma key composite video image of the presenter is superimposed over a portion of displayed presentation content associated with the first presentation content feed; the video presentation production system further comprising a display screen physically positioned adjacent to the first video camera such that the presenter is able to view, while delivering the first mobile video presentation, displayed content on the display screen concurrently while substantially maintaining eye contact with the first video camera; and the display screen being operable to display the first video presentation media stream to the presenter while the presenter is delivering the first mobile video presentation, thereby enabling the presenter to view on the display screen, in substantially real-time and while the presenter is delivering the first mobile video presentation, the at least one image of presentation content while concurrently substantially maintaining eye contact with the first video camera. In at least one embodiment, the video presentation server is operable to generate the output presenter video feed in substantially real-time while the presenter is delivering the first mobile video presentation. In at least one embodiment, the video presentation server is operable to generate the first video presentation media stream in substantially real-time while the presenter is delivering the first mobile video presentation.

In at least one embodiment, the video presentation production system further comprises a remote annotation device operable by the presenter and configured to enable the presenter to selectively add annotations to the at least one image of presentation content while the presenter is delivering the first mobile video presentation; and wherein the video presentation production system is configured to enable the presenter to view the annotated presentation content on the display screen in substantially real-time, while the presenter is delivering the first mobile video presentation.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

As described in greater detail herein, various aspects of the present application describe different techniques which may be used to improve online education techniques, and to overcome at least a portion of the issues relating to online education and online learning, such as those described above. More specifically, various different techniques are described herein for improving online education techniques by enabling users to communicate and collaborate on online social education platforms using images, graphs, drawings, etc. Such techniques significantly enhance the online learning experience, and provide a heretofore missing piece to online learning platforms. For example, using the various image posting techniques described herein, users can now easily show tutors, teachers, peers, etc. the exact problem they are working on, and communicate regarding the problem without dealing with how to express the problem itself. These techniques are suitable for a wide range of online learning environments, including, but not limited to, facilitating 1-on-1 tutoring scenarios, small group interactions (in which a small group of peers exchange ideas, or, a small group of students are led by a teacher, or a mixed thereof), and universal group learning (in which discussion area is not segmented to only include a subset of users, but rather, all who visit the area can see the ongoing discussion.) This solution may also be extended beyond the online realm and into real-world classrooms. For example, using the various image posting techniques described herein, students in real-world (physical) classrooms may capture images and/or compose text (e.g., relating to potential solutions, comments, and/or questions) using their mobile devices, and may easily transmit or convey such images/text (e.g., via email, mobile app, text message, MMS message, chat, etc.) to teachers, without a teacher having to visit each individual, desk, or group of students. Students may also participate in group work without moving desks, which is something that may be otherwise impractical (e.g. students with mobility issues) or impossible (e.g. classrooms are in computer lab setting, so students cannot move desks to easily collaborate) in conventional education environments. In this way, students can contribute ideas even if they are hesitant to verbally express ideas simply by, for instance, texting in a graphed solution.

FIG. 1 illustrates a simplified block diagram of a specific example embodiment of an Online Social Education Network (OSEN) or Online Social Education System (OSES) 100, which may be implemented via a computerized data network. As described in greater detail herein, different embodiments of Online Social Education Systems may be configured, designed, and/or operable to provide various different types of operations, functionalities, and/or features generally relating to Online Education technology. More specifically, the Online Education (OE) techniques described herein utilize social learning and technological breakthroughs to construct and stage a vibrant online learning system for students, teachers, parents, and educators. These Online Education techniques help to foster a dynamic online education environment via social interaction (e.g., non-linear, hands-on, effective and fun).

For example, one aspect of the Online Social Education System (OSES) 100 is directed to an online, "Interactive Study Wall", where students can ask/post questions and receive answers from peers (e.g., other students), teachers, and/or other educators (such as, for example, Study Experts). The OE System may include functionality for enabling participants to post questions/responses via drawing graphs, inserting equations, taking/uploading images (e.g., photos, screenshots, etc.), voice memos (and/or other audio clips), and/or videos. In at least one embodiment, Study Experts may function as Interactive Study Wall moderators, and monitor the interactions in real time and/or non-real time, answering questions and reviewing posted threads to ensure the accuracy of the posted replies/responses.

In at least one embodiment, the Interactive Study Wall is configured or designed to encourage students to feel free to ask even the simplest of questions. The discussions, which these questions spark, and the answers/responses they elicit are individualized to the student, yet also universally applicable (e.g., a response describing a solution to a math problem).

According to different embodiments, multiple different instances of online Interactive Study Walls may be instantiated (e.g., concurrently instantiated) for different topic or fields of study such as, for example, one or more of the following (or combinations thereof):

Algebra;
Geometry;
Physics;
Accounting;
Chemistry;
Civics;
Social Sciences;
General Educational Curriculum;
Foreign Language Curriculum;
etc.

In at least one embodiment, an Interactive Study Wall may be configured or designed to be completely searchable and transparent. For example, in one embodiment, a specific Interactive Study Wall (e.g., Algebra Wall) may be accessible to all students and teachers of a given district or region (such as, for example, school district, county, state, country, textbook, or subgroup—e.g. all students who take the same test, etc.). For example, a question asked by a student in Miami, Fla. might prove useful to a student in Boulder, Colo., and a teacher or Study Expert in Phoenix, Ariz. may use the Interactive Study Wall to provide assistance to students in Dallas, Tex.

In at least some embodiments, Interactive Study Wall may be configured as a shared resource for facilitating student and/or teacher communications across school, district, state, country, subjects, etc., thereby creating a substantially collaborative and open environment among all users, while simultaneously reducing security threats to children. In at least some embodiments, the Online Social Education System may be configured or designed to enable various collaborative, non-hierarchical Interactive Study Wall features. For example, the Interactive Study Wall may be configured or designed to:

Enable teachers to use the Interactive Study Wall to interact with their students and vice-versa.
Enable students to use the Interactive Study Wall to interact with other students, such as, for example, students who are learning or studying similar educational curriculum or similar educational standards.
Enable students and Study Experts to use the Interactive Study Wall to interact with each other.
Enable teachers to interact with other teachers.
Etc.

In some embodiments, manual and/or automated mechanisms may be provided to identify and filter out unrelated, negative or derogatory comments/responses. Additionally, unlike most existing social networks and online forums, in at least some embodiments, the Interactive Study Wall may be configured or designed to prohibit personal or private messaging (e.g., between or among peers). This helps to foster a publically collaborative, socially interactive environment among all users. Further, in at least some embodiments, the Interactive Study Wall may be configured or designed to prohibit or prevent students (and/or other users) from accessing other users' pictures and personal profiles. Students are able to select their own photo to use on the Wall, or to select from an array of preset avatars. For example, participants' profile pages may be blocked, thereby preventing access participants' personal information.

Additionally the Interactive Study Wall may be continuously monitored (e.g., via automated and/or human mechanisms), and may be configured or designed to provide notification to Study Experts (e.g., moderators) whenever a question and/or response is posted on an Interactive Study Wall. The wall may also be configured so each post must be approved prior to posting, or, in another embodiment, posts during a certain range of time or days may have to be approved (e.g. posts made "after hours", when wall is not monitored by a Study Expert.)

In at least one embodiment, students may be allocated points or awards or incentives for posting questions and/or for answering peers' questions on the Interactive Study Wall. In the following embodiments, the awards are called "Karma points", but do not necessarily need to be named so. For example, in one embodiment, the Interactive Study Wall may include functionality for enabling Study Experts or moderators to award students with differing amounts of "Karma points" for asking questions and/or answering peers' questions. In some embodiments, Karma points may be shown next to a student's name, and a "Karma Leader Board" may be maintained and automatically updated to track, for example, the top n (e.g., n=5) karmic leaders in a specified group, region or district. Accumulated Karma points may be redeemable for physical (e.g., real-world) prizes. For example, according to different embodiments, the Online Social Education System may award incentive prizes to various different entities such as, for example: students, teachers, schools, grades, classes, school districts, regions, etc. In some embodiments, the Interactive Study Wall award system may be configured or designed to provide or enable one or more of the following features (or combinations thereof):

Identifying and assigning specific roles to certain persons as administrators, teachers, Study Experts, etc.
Enabling persons (e.g., administrators, Study Experts, etc.) to monitor study wall posts and allocate or distribute awards/points to users based on perceived effort of user and on helpfulness of user's comment(s)/post(s).
Preventing awards/points from being allocated or distributed to users who post or give away answers.
Prevent awards/points from being allocated or distributed to users who engage in cheating.
Provide mechanisms for punishing users who engage in cheating.
Deduct points from users who give away the answer(s), provide too much help, and/or engage in cheating.

According to different embodiments, at least some Online Social Education System(s) may be configured, designed, and/or operable to provide additional features, advantages and/or benefits and/or may be operable to initiate, and/or enable various different types of operations, functionalities, and/or features, such as, for example, one or more of the following (or combinations thereof):

Features relating to Personalization on of Wall/Adaptive Learning/Interactive Discussion Forums
Discussion boards may be automatically and dynamically personalized dependent on the needs and/or interests of user/viewer.
Automated Adaptive Learning and Personalization of User's Interactive Study Wall. In at least one embodiment, this may include showing specific posts to specific students (e.g., based on level of student, student's district, school, course enrollment, state or national standards associated with the student's needs, etc.). In some embodiments the automated adaptive learning and personalization of a user's Interactive Study Wall may be based, at least partially, posts which the user has "liked". In this way, the Online Social Education System is able to dynamically learn what subject matter a student like, and may dynamically learn or determine the educational curriculum levels: (1) in which the student has demonstrated an adequate understanding or proficiency of specific subject matter, and (2) in which the student has not yet demonstrated an adequate understanding or proficiency of specific subject matter. For example, in one embodiment, the Online Social Education System may evaluate the student based on his or her performance on practice tool or test, and may use the evaluation results to dynamically select, modify, and/or filter selected posts which are displayed on the user's personalized Interactive Study Wall. For example, if the Online Social Education System determines that a given user is less proficient in nonlinear functions, the system may dynamically filter the posts displayed on the user's Interactive Study Wall to cause more posts relating to nonlinear functions to be displayed on the user's Interactive Study Wall.

In some embodiments, this may also be based on "pre-test" that asks students to self-assess their confidence level on given problems. In some embodiments, this may also be based on "self-assessment" such as, for example, student checking off what they understand/don't understand.

Interactive Study Wall users can mark posts as "high/medium/low" or "conceptual" vs. "skills-focused" to identify the perceived level of difficulty or complexity with a given post, which may be shared with other users, and may also be utilized by the Online Social Education System. In some embodiments, Moderators can monitor these assignments for accuracy.

In this way, the Online Social Education System may improve some aspects of students' academic performance and may create a sense of connectedness that promotes active learning.

Although other social networks may provide features for enabling users to "like" selected posts, one important distinction between such social networks and the Online Social Education System is that, in the Online Social Education System, the user's interests and needs are continually shifting and changing as the user continues to learn and digest new educational curriculum. For example, if a user "likes" a baking-related post on Facebook, Facebook system may show the user more posts about baking, and it is likely that the user will probably still like baking 3 months later. In contrast, a student user of the Interactive Study Wall may "like" a post relating to algebraic equations one month (e.g., while the student is studying algebraic equations in class), but may no longer be interested in viewing posts relating to algebraic equations three months later, for example, because the student has moved on to studying other subject matter. Accordingly, the Online Social Education System is configured or designed to take into account that the student users are continually learning, and are moving through different curriculum in their classrooms. In this way, the Online Social Education System is able to provide dynamically changing, personalized content for each respective user or groups of users (e.g., of a given classroom, grade, etc.) which is substantially relevant to the specific curriculum which the user is currently studying, and relevant to the current needs and interests of the user. For example:

Students mastering certain topics—posts relating to those topics are filtered out from the user's Interactive Study Wall "feed".

Students identified as having issues with certain topic—posts relating to those topics are included in the user's Interactive Study Wall "feed".

Students identified as having similar "Learning Profiles" may view posts from similar learning profile students.

Students' academic schedule given the time of year Study Wall is accessed

Interactive Study Wall Filtering and Filtered Interactive Study Wall Feeds

Typically, currently existing online discussion boards are either organized around a topic, or organized around a community. This means users either have to find appropriate forum to ask question(s), or can only get answers from members of an existing community.

In contrast, in at least one embodiment of the Interactive Study Wall, teachers all use the same Interactive Study Wall with their respective students, but it's a shared Interactive Study Wall across multiple schools, districts, and/or states or any given/designated subgroup. For example, students and teachers in the state of Florida may use a single Interactive Study Wall to collaborate with each other, and the Interactive Study Wall may be configured or designed to automatically and/or dynamically filter posts displayed on each respective user's Interactive Study Wall "Feed" so that only relevant and/or appropriate posts are displayed to each respective user, based on various criteria such as, for example, one or more of the following (or combinations thereof):

class;
grade level;
school;
teacher;
school district;
geographic region;
user experience level (e.g., novice vs. advanced user);
number of Karma points accrued;
user's current education curriculum;
user's current state standards;
etc.

In at least some embodiments, the Interactive Study Wall may also provide functionality for enabling users to define or configure various filtering rules and/or filtering parameters.

In at least some embodiments, some levels of administrators (e.g. Study Experts) may set filtering parameters for other users.

In at least some embodiments, Interactive Study Wall may also provide functionality for enabling users to search for key words or tags of post.

In at least some embodiments, Interactive Study Wall may also provide functionality for recommending to a given user one or more video tutorials, where such recommendations may be based, at least partially upon the subject matter or relevancy of posts which have been (or are being) viewed by that user or that the user himself has generated.

In at least some embodiments, the Interactive Study Wall may be configured or designed to provide or assign different roles for different users of the Interactive Study Wall. Examples of such different roles may include, for example: Students, Teachers, Study Experts, etc. In at least some embodiments, each different role may have associated therewith a respectively different set of Interactive Study Wall permissions, privileges, and tools for accessing, viewing, and filtering posted Interactive Study Wall content and user activities. For example, in one embodiment, only Study Experts may be provided with ability to close selected threads, or mark them as complete/reviewed/answered (e.g., by commenting on or liking the last post in a given thread). A Study Expert may also filter the wall to see only posts that have not been completed/reviewed/answered by a Study Expert to ensure that no posts remain unanswered.

By using the various Online Education techniques described herein, the Online Social Education System may be configured or designed to achieve an optimum balance between Human interaction and automated systems.

Protected Collaboration and Security Features

- Non-clickable profiles. Users may be prevented from viewing or accessing profile information relating to other users of the Interactive Study Wall. This may help to minimize security threats to children/student users.
- The use of avatars in place of profile pictures to help protect the identity of children/student users.
- Private conversations or private messaging between users may be prevented.
- Aspects of user identity may be masked but not anonymous (e.g., concealing last name of user, concealing user's school associated, but displaying city where user's school is located, allowing students to choose a nickname while their real identity is still available for admins, teachers, Study Experts, etc.)
- Features that encourage positively and/or discourage negativity.
- Friending between users may be prevented.
- All conversations may be publically accessible and viewable. No private posts.
- User identity authenticated from $3^{rd}$ party system (e.g., School district system) to prevent anonymity or impersonation of other students.
- Duplicate posts allowed so as to allow students to easily ask their questions w/out having to research prior topics/posts
- Some information may be available to a given subset of users and not the general population of users (for instance, all users in a student's district may see the student's full name, but for all other users, they can only see the student's first name and last initial.)

Features Relating to Managing Posts/Conversations of Interactive Study Wall

In at least one embodiment, the Online Social Education System may include functionality for enabling moderators and Study Experts to manage Interactive Study Wall posts, threads, and conversations. For example, in at least one embodiment, the Interactive Study Wall may be configured or designed to automatically close a discussion thread upon detection of various events/conditions such as, for example, one or more of the following (or combinations thereof):

when a Study Expert or Teacher is the last person to post a comment in the discussion thread;

when a Study Expert or Teacher clicks on a "like" icon or other designated button/icon associated with the discussion thread.

when a Study Expert of Teacher hits a button "closing" the comment.

In at least some embodiments, the Online Social Education System may be configured or designed to provide functionality for providing automatic and/or manual closing of Interactive Study Wall threads. For example, in one embodiment, a Study Expert may "like" a posted comment of a discussion thread (e.g., by clicking on "Like" object 1733, FIG. 17) to indicate to the system that the discussion thread is considered "closed" or "answered". In some embodiments, teachers may also be permitted to "like" a posted comment of a discussion thread to indicate to the system that the discussion thread is considered "closed" or "answered". In some embodiments, the Online Social Education System may determine that a particular discussion thread is considered to be "closed" or "answered" only if the most recently posted comment is from the Study Expert (or teacher), and Study Expert (or teacher) has "liked" this comment.

In some embodiments, users may be allowed to subsequently post comments to discussion threads which are considered by the system to be "closed" or "answered".

In some embodiments, users may not be allowed to subsequently post comments to discussion threads which are considered by the system to be "closed" or "answered".

In some embodiments, a "closed" or "answered" discussion thread may be automatically reopened (e.g., status of discussion thread automatically changed to "open" or "unanswered") if a user posts a subsequent comment to that discussion thread. In some embodiments:

a closed post/discussion is considered "answered"

subsequent question could re-open post (change status to "unanswered")

the Online Social Education System may also be configured or designed to analyze punctuation a posted comments to automatically and/or dynamically determine the status of post as "answered" or "unanswered".

In some embodiments, a post may be considered "closed" if last person on thread is Study Expert (or teacher).

In some embodiments, a Study Expert can mark thread as closed (meaning thread is considered to be "answered".)

In some embodiments, the Online Social Education System may automatically scan posted comments/questions to identify and/or recognize references to other posts of the Interactive Study Wall (e.g., "Please refer to Post #351781"), and may automatically and dynamically convert such references to hyperlinks to enable users to click on such hyperlinked references to navigate directly to the referenced post(s).

Interactive Study Wall discussion board functionality which, for example, may be restricted to specific video or topic, and not personalized dependent on the needs/interests of user.

Collaborative, non-hierarchical Interactive Study Wall features. For example, the Interactive Study Wall may be configured or designed to enable teachers to use the Interactive Study Wall to interact with their students, but the Wall may be configured as a shared Wall across school, district, state, country, etc., thereby creating a substantially collaborative and open environment among all users, while simultaneously maximizing security for students.

Filtering functionality for enabling personalization of users' Interactive Study Wall interactions, such as, for example, filtering posts to specific students (e.g. based on level of student, student's district, school, course enrollment, etc.). In some embodiments, filtering personalization for one or more students/users may be based, at least partially, on one or more of the following criteria (or combinations thereof):
posts for which a student/user has flagged as being of interest (e.g., user has clicked on "like" button);
posts with which a student/user has actively engaged/interacted;
student performance (e.g., how well student performs on practice tools);
student inputs/self-assessment;
tags/classifications associated with one or more Interactive Study Wall posts (e.g., high difficulty, medium difficulty, low difficulty, conceptual, skills-based, standards (e.g. Common Core Math, state-based standards, geometry, algebra, fractions, etc.)

Dynamic whiteboard functionality. For example, in at least one embodiment, the Interactive Study Wall may include functionality for providing users with access to a dynamic Whiteboard GUI which may be configured or designed to provide various tools for enabling users to initiate various activities such as, for example, one or more of the following (or combinations thereof):
draw diagrams;
draw graphs, either freehand or using pre-set grid lines
plot graphs based upon data points, equations, etc. either freehand or by using a computer program;
capture and upload images (e.g., via mobile device, email, MMS, etc.);
record and upload videos (e.g., via mobile device, email, MMS, etc.);
record and upload voice memos (e.g., via mobile device, email, MMS, etc.);
record and upload annotated/animated whiteboard diagrams;
Click button to bring up dynamic white board, which is recorded and displayed on wall in connection with post.
Ability to view and playback entire recording embedded in wall discussion board
Providing drawing and graphic tools
Gridlines feature;
Ability to draw on/annotate over existing image;
etc.

In at least one embodiment, where multiple whiteboard pages exist, the dynamic whiteboard may provide navigation links for enabling users to navigate to specific pages, page positions, previously bookmarked pages, etc.

Leaderboard Functionality. In at least some embodiments, Karma points and/or other awards awarded to users of the Interactive Study Wall may be used to generate leaderboard rankings among selected groups of users. In at least some embodiments, the Online Social Education System may include various types of Leaderboard Functionality, which may be configured or designed to display various types of rankings among selected groups of users.
For example, in at least one embodiment, the Interactive Study Wall leaderboard results/rankings may be filtered according to various criteria such as, for example, one or more of the following (or combinations thereof):
class;
subject;
grade level;
students in my class;
students in my school;
students in my district;
school;
school district;
geographic region;
state;
district middle schools;
district high schools;
district elementary schools;
user experience level (e.g., novice vs. advanced user);
user demographics such as, for example, sex, age, location, etc.;
time range (e.g. lifetime vs. monthly points);
EOC/assessment;
etc.
Leaderboard Functionality may be configured or designed to provide the ability for students to compete against their peers (classmates, school mate, etc.).
Interactive Study Wall leaderboard shows middle school vs. high school rankings depending on the viewing user's grade level (e.g. middle school student will see middle school leaderboard results). In another embodiment, student users may be able to see all students or middle vs. high school leaderboards.
Personalized leaderboard results/rankings may be automatically and/or dynamically displayed to a given user, based on the identity of the viewing user (and/or other criteria associated with that user);
Prizes can be awarded by school, class, period, teacher, district, state, etc. In some embodiments, prizes can be awarded by teacher or by school or district/school system (e.g. charter organizations).
Leaderboard Functionality provides additional incentive for users to proactively participate in conversations and other interactions of the Interactive Study Wall.

Status Update Functionality such as, for example, "check in"/"check out", "Do Not Disturb", etc.
Using social media as avenue towards studying is effective, but students may be distracted by friends who want to chat during study time.
In some embodiments, the Online Social Education System may be configured or designed to include functionality for enabling Students to post updates about their current status (e.g., "check in", "check out", "available", "Do Not Disturb", etc.). In some embodiments, the Online Social Education System may be configured or designed to receive user status updates, and post such status updates to other social media networks such as Facebook, Twitter, etc.
In some embodiments, the Online Social Education System may be configured or designed to include functionality for enabling users to access educational materials from other online educational platforms (e.g. Pearson, Khan Academy, etc.). In this way, students may selectively use educational materials from a variety of different online educational platforms without having to separately sign into each different online educational platform in order to study.

In some embodiments, the Online Social Education System may be configured to block a students' access to distracting media when a student checks in to study (e.g., disable browsing on non-educational sites, enable "do not disturb" mode on mobile devices, block social media access on mobile devices).

In some embodiments, the Online Social Education System may be configured to use geofencing to automatically check in/check out students when they enter a specific location, such as a library.

Automated functionality for detecting and preventing students/users cheating with other students/users. For example, in one embodiment, the OSES Server may be configured or designed to analyze and reject reply posts which have been identified as not meeting or satisfying a specified minimum character count. In some embodiments, the Online Social Education System may be configured or designed to include various mechanisms for preventing or prohibiting discussion walls from serving as forums for facilitating cheating (e.g., where students simply type in answers to math problem). Examples of such cheating prevention mechanisms may include, but are not limited to, one or more of the following (or combinations thereof):

Imposing minimum character limits/requirements on response posts to prevent cheating.

Mechanisms for discouraging giving away answer or discouraging "cheating".

Students can flag inappropriate response.

Automated pattern matching for posted answers.

Automated functionality for detecting and preventing students/users from posting answers/solutions to homework and/or test related questions.

Automated functionality for detecting copying/pasting from other sites.

Automated mechanisms for preventing students from deleting a post once it has been replied to. This ensures that the post will remain public and the student will be discouraged from cheating as there will be a permanent record of the activity.

Automated student identification authentication.

Automated student-school enrollment verification.

Speed Test/Video Player

Video players which are overly feature-heavy are distracting to students and detract from the video viewing experience (need to save screen space, especially in mobile education environment vs. other markets). However, it is desirable to determine/detect if video playback is being affected because user's internet is too slow to support video viewing (e.g., for troubleshooting purposes).

In some embodiments, the Online Social Education System may be configured or designed to include functionality for enabling a speed test to be automatically conducted when the system detects a potential issue with video playback/streaming to a given user's system.

The user may also be informed that he or she may need to find a faster source of internet. Such functionality helps cut down customer service tech calls. This selectivity/flexibility allows for maximize screen space usage for majority of the time. Speed test only pops up when necessary.

Automatic Pause of Video Playback—When user hits mute on video or computer, or when it detect headset is unplugged, the video automatically pauses so user does not miss any material.

Dynamically customized interfaces. In some embodiments, the Online Social Education System may be configured or designed to include functionality for identifying a user's current activities on the Interactive Study Wall, and providing dynamically customized interfaces specifically configured or designed to facilitate a the user with initiating or performing tasks relating to the user's current activities. Similarly, the Online Social Education System may be configured or designed to include functionality for identifying aspects of a user's current educational curriculum, and providing dynamically customized interfaces specifically configured or designed to facilitate a the user with initiating or performing tasks relating to the user's current educational curriculum (e.g., subject matter which a student is currently studying; standards; school curriculum; etc.). For example, in some embodiments, the OSES Server may be configured or designed to generate and display customized Interactive Study Wall GUIs to different users, in which one or more of the GUIs includes (or provides easy access to) a customized set of symbols, characters, equations, and/or other content which may facilitate a given user in initiating or performing tasks relating to the user's current activities and/or educational curriculum. For example:

a student user studying chemistry student may be presented with a customized GUI which includes an interactive Periodic Table, which may provide access to functionality for facilitating the user in creating or editing chemistry-related formulas and/or expressions.

a student user studying algebra student may be presented with a customized GUI which includes a list of symbols representing different mathematical functions, and which may provide access to functionality for facilitating the user in creating or editing algebraic-related formulas and/or expressions.

And/or other aspects/features described and/or referenced herein.

One of the problems, which the Online Education techniques described herein helps to solve relates to the issues of scaling human interaction with mass online education. As described in greater detail herein, the Online Social Education System may be configured or designed to provide a hierarchy of participants, which facilitates human interaction scaling. For example, Karma points may be awarded by human Study Experts, and given out to human users (e.g., student users) who provide appropriate degrees of assistance, but not too much (e.g., explaining how to reach the answer, as opposed to simply stating the answer). The Online Social Education System also facilitates collaborative interaction among peer student users.

According to different embodiments, the Online Social Education System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Online Social Education System may include one or more of the following types of systems, components, devices, processes, etc. (or combinations thereof):

Online Social Education System (OSES) (s) 120—In at least one embodiment, the Online Education Server System(s) may be operable to perform and/or implement various types of Online Social Education functions, operations, actions, and/or other features such as those described or referenced herein.

Public/Private Education Network(s) 140, including, for example, Student Information System(s) (SIS), Student Data Management Networks, etc.

User Computer System(s) 130—In at least one embodiment, the User Computer System(s) may be operable to perform and/or implement various types of Online Social Education functions, operations, actions, and/or other features such as those described or referenced herein.

$3^{rd}$ Party System(s) 150, including, for example social networks (e.g., Facebook, Twitter, You Tube, etc.), Online conferencing and webinar systems (e.g., Webex, Adobe Connect, Skype, etc.), etc.

Internet & Cellular Network(s) 110

Remote Database System(s) 180

Remote Server System(s)/Service(s) 170, which, for example, may include, but are not limited to, one or more of the following (or combinations thereof):
Content provider servers/services
Media streaming servers/services
Database storage/access/query servers/services
Financial transaction servers/services
Payment gateway servers/services
Electronic commerce servers/services
Event management/scheduling servers/services
Etc.

User Mobile Device(s) 160—In at least one embodiment, the User Mobile Device(s) may be operable to perform and/or implement various types of Online Social Education functions, operations, actions, and/or other features such as those described or referenced herein.

etc.

According to different embodiments, at least a portion of the various types of Online Social Education functions, operations, actions, and/or other features provided by the Online Social Education System may be implemented at one or more client systems(s), at one or more server systems (s), and/or combinations thereof.

In at least one embodiment, the Online Social Education System may be operable to utilize and/or generate various different types of data and/or other types of information when performing specific tasks and/or operations. This may include, for example, input data/information and/or output data/information. For example, in at least one embodiment, the Online Social Education System may be operable to access, process, and/or otherwise utilize information from one or more different types of sources, such as, for example, one or more local and/or remote memories, devices and/or systems. Additionally, in at least one embodiment, the Online Social Education System may be operable to generate one or more different types of output data/information, which, for example, may be stored in memory of one or more local and/or remote devices and/or systems. Examples of different types of input data/information and/or output data/information which may be accessed and/or utilized by the Online Social Education System may include, but are not limited to, one or more of those described and/or referenced herein.

According to specific embodiments, multiple instances or threads of the Interactive Study Wall may be concurrently implemented and/or initiated via the use of one or more processors and/or other combinations of hardware and/or hardware and software. For example, in at least some embodiments, various aspects, features, and/or functionalities of the Interactive Study Wall may be performed, implemented and/or initiated by one or more of the various systems, components, systems, devices, procedures, processes, etc., described and/or referenced herein.

In at least one embodiment, a given instance of the Online Social Education System may access and/or utilize information from one or more associated databases. In at least one embodiment, at least a portion of the database information may be accessed via communication with one or more local and/or remote memory devices. Examples of different types of data which may be accessed by the Online Social Education System may include, but are not limited to, one or more of those described and/or referenced herein.

According to different embodiments, various different types of encryption/decryption techniques may be used to facilitate secure communications between devices in Online Social Education System(s) and/or Online Social Education Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Interactive Study Wall functionality may be initiated in response to detection of one or more conditions or events satisfying one or more different types of minimum threshold criteria for triggering initiation of at least one action and/or operation. Various examples of conditions or events which may trigger initiation and/or implementation of one or more different threads or instances of the Interactive Study Wall functionality may include, but are not limited to, one or more of those described and/or referenced herein.

It may be appreciated that the Online Social Education System of FIG. 1 is but one example from a wide range of Online Social Education System embodiments, which may be implemented. Other embodiments of the Online Social Education System (not shown) may include additional, fewer and/or different components/features that those illustrated in the example Online Social Education System embodiment of FIG. 1.

Generally, the video presentation and digital compositing techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the video presentation and digital compositing techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Online Social Education GUIs

FIGS. 6-10 and 11-13 illustrate example screenshots of various GUIs, which may be used for facilitating activities relating to one or more of the online social education aspects disclosed herein.

FIGS. 16A-E illustrate example screenshots of various GUIs, which may be used for facilitating activities relating to one or more of the video presentation and digital compositing aspects disclosed herein.

In at least one embodiment, at least a portion of the GUIs may be configured or designed for use at one or more user computer devices and/or mobile devices.

For illustrative purposes, each of the example screenshots of FIGS. 6-10 and 11-13 relate to specific embodiments of an Interactive Study Wall, which has been specifically configured for facilitating online social education relating to algebra (herein referred to as "Algebra Wall"). However, it will be appreciated that other embodiments of Interactive Study Walls may be specifically configured for facilitating online social education relating to other educational topics/ standards/curriculum. Additionally, as illustrated and described with respect to the example screenshots of FIGS. 6-10 and 11-13, the display of Interactive Study Wall content and/or access to various Interactive Study Wall functionality may differ, for example, based on the user's identity and/or user classification type (e.g., Teacher, Study Expert, Student). Additionally, in at least some embodiments, at least a portion of the Interactive Study Wall content, which is displayed to a given user, may be dynamically generated and/or dynamically filtered.

Figure 6:
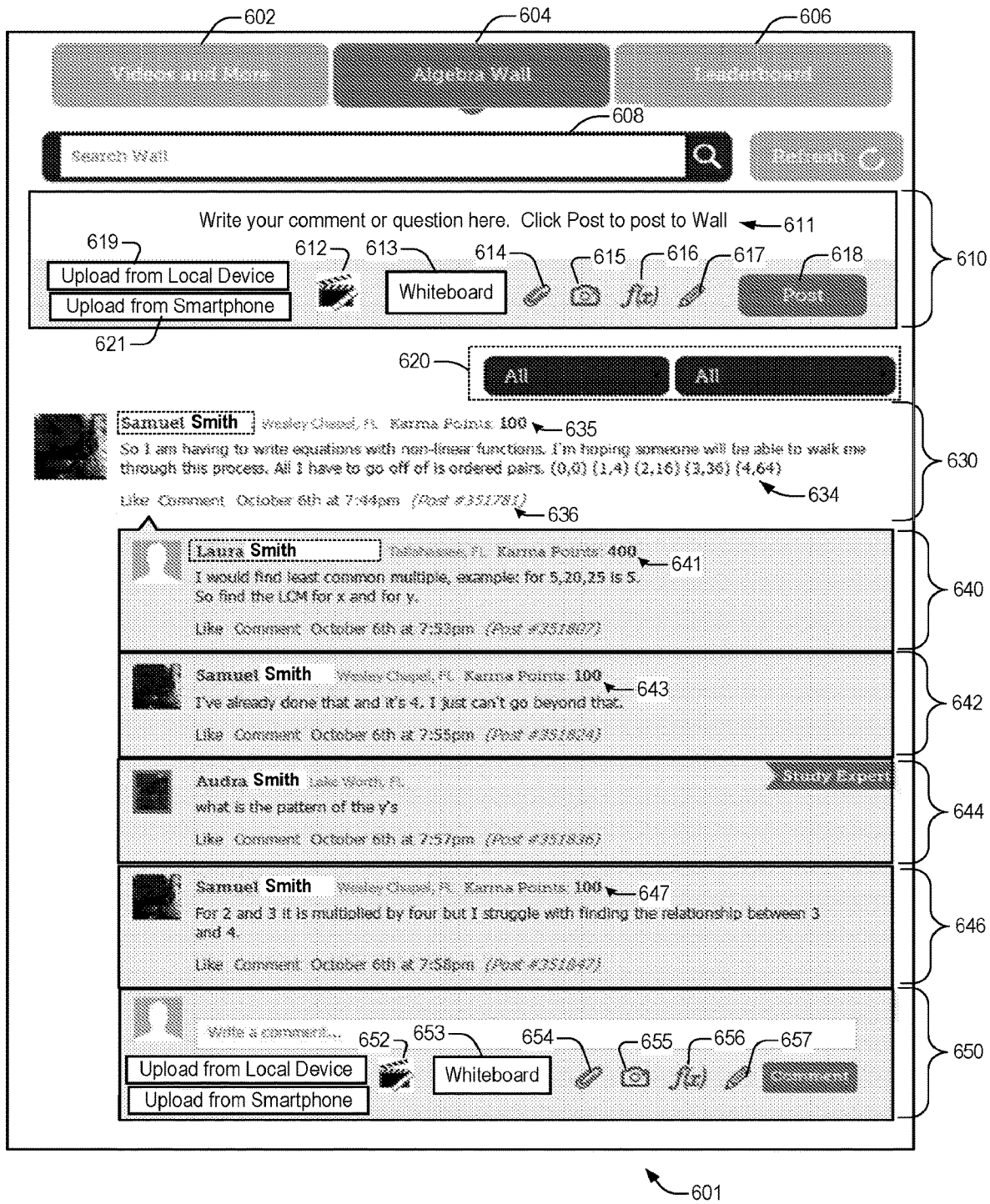

FIG. 6 shows an example screenshot of a Student Interactive Study Wall GUI 601 in accordance with a specific embodiment. According to different embodiments, the Student Interactive Study Wall GUI 601 may be configured or designed to enable students to perform a variety of activities such as, for example:

- Browsing questions, comments, threads and discussions posted to the Interactive Study Wall;
- Viewing Interactive Study Wall posts (e.g., 630) such as those posted by the student user, other students, teachers, and/or Study Experts;
- Viewing comments/replies to Interactive Study Wall posts (e.g., 640, 642, 644, 646) such as those posted by the student user, other students, teachers, and/or Study Experts;
- Searching for posts relating to specific content, keywords, topics, etc.;
- Drafting and posting questions to the Interactive Study Wall;
- Drafting and posting comments or replies to the Interactive Study Wall;
- And/or other types of activities described and/or referenced herein.

As illustrated in the example embodiment of FIG. 6, the Student Interactive Study Wall GUI 601 may be configured or designed to provide a student user with access to a variety of functions and/or features of the Interactive Study Wall such as, for example, one or more of the following (or combinations thereof):

- Access to tutorials, videos, and other educational content 602
- Access to Interactive Study Wall Leaderboard(s) 606
- Keyword search functionality 608
- Interfaces (e.g., 610, 650) for enabling student user to initiate new posts (e.g., via 610), post comments/ questions/replies to existing threads/posts (e.g., via 650), etc.
- As illustrated in the example embodiment of FIG. 6, the Interface portions 610 and 650 may include features and/or functionality for enabling the student user to initiate and/or perform one or more of the following operation(s)/action(s) (or combinations thereof):
- Select, upload and post attachments (614).
- Select, capture, edit, annotate, upload and post images or photos (615).
- Create and post equations via equation editor functionality (616).
- Record, edit, upload and post video content (612).
- Access various types of whiteboard functionality (e.g., 613, 617), which, for example, may be used to create and post drawings, graphs, animated tutorials, etc. For example, as illustrated in the example embodiment of FIG. 6, Student Interactive Study Wall GUI 601 includes buttons or icons (e.g., Whiteboard Buttons 613, 653) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.
- Post an image or video captured from the user's smartphone (621).
- Post an image or video captured from the user's computer, tablet, etc. (619).
- In at least one embodiment, students may preview their post before publishing their post on the Interactive Study Wall.
- Post/Thread filtering functionality (e.g., 620) for enabling student users to selectively include or exclude display of posts/threads by defining, configuring and/or setting various filtering criteria such as, for example, one or more of the following (or combinations thereof):
- Students' Teacher
- Students' Section/Class
- Students' School
- Students' District
- Students' State
- Students' Grade Level
- Students' Educational curriculum such as, for example: class/grade/school/textbook/state curriculum information.
- Student's profile data such as, for example: User ID, User email address, User IP address, User messaging address, etc.
- Students' Region (e.g. Panhandle, Southern Florida, etc.)
- Students' Consortiums (e.g. NEFEC schools, etc.)
- Students' School Rankings
- Students' Gender
- Students' Demographics
- Students' test scores from previous formative assessments (e.g. benchmarks)

Students' test scores from previous summative assessments (e.g. end of course exams)
Post difficulty level (e.g., as ranked by algorithms)
Post difficulty level (e.g., as ranked by humans)
Number of posts started by students
Number of comments (replies) made by students
Number of karma points made by students
Number of videos watched by students
Difficulty level of videos watched by students
Number of "Test Yourself!" questions attempted by students
Number of "Test Yourself!" questions correctly answered by students
Percentage of "Test Yourself!" questions correctly answered by students
Posts/threads which have been identified as being closed or correctly answered
Posts/threads which have been identified as still being open or unanswered,
Etc.

User Award/Incentive Functionality ("Karma points")
Students may be allocated points (e.g., "Karma points") or awards or incentives for posting questions and/or for answering peers' questions on the Interactive Study Wall. In some embodiments, the Interactive Study Wall GUIs may include functionality for enabling Study Experts or moderators to award students with differing amounts of "Karma points" for asking questions and/or posting comments in response to questions/comments posted by other users.

For example, as illustrated in the example embodiment of FIG. 6, each student user has associated therewith a respective Karma Point score (e.g., 635, 641, 643, 647) which may represent that user's current, cumulative Karma Point total.

In some embodiments, the cumulative Karma Point score may be automatically calculated and displayed by the OSES Server based on Karma Point awarded to each user over a given time interval (such as, for example, a range of days, a range of months, lifetime, a range of time corresponding to the beginning and end of a school year, etc.).

Figure 7:
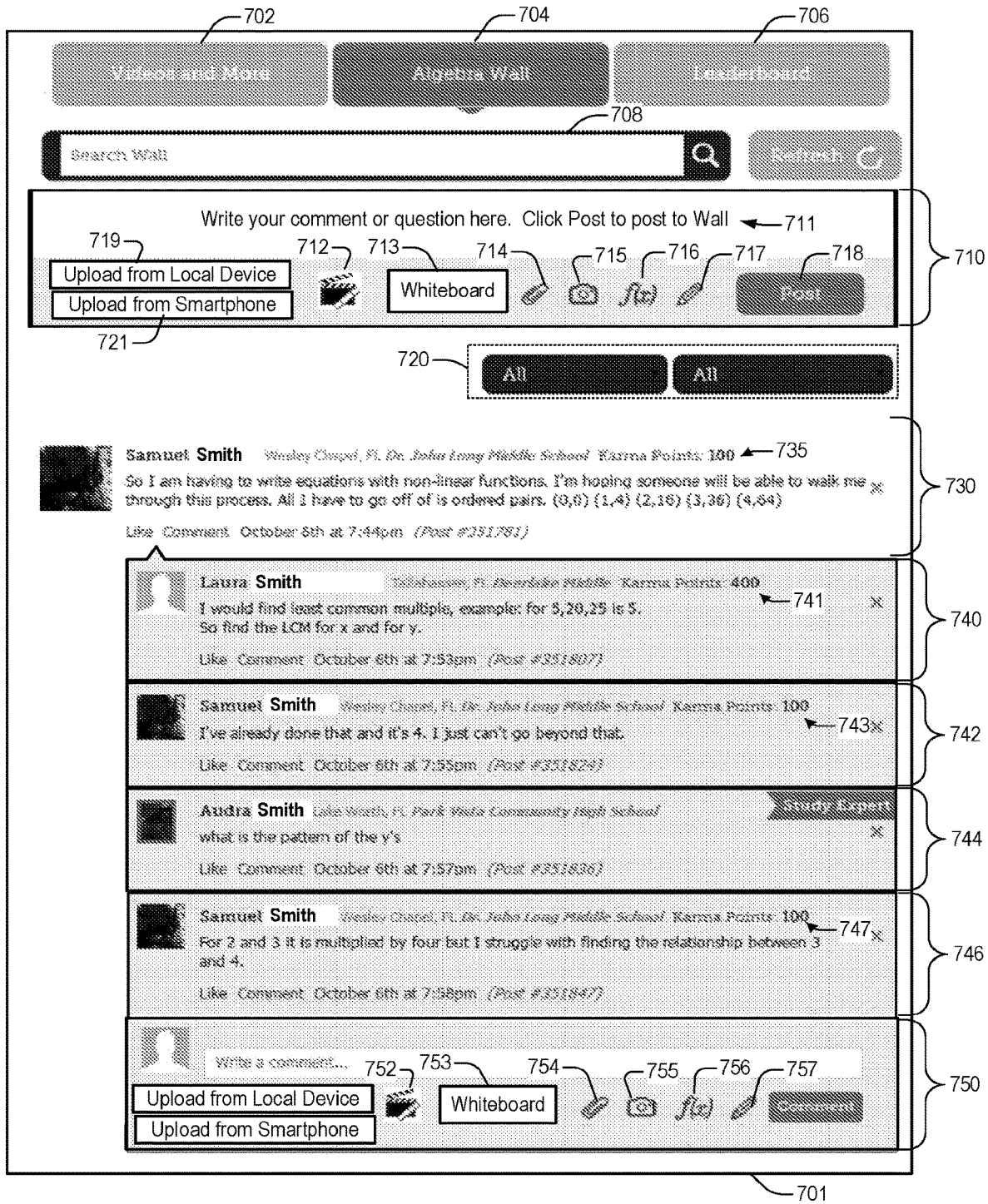

FIG. 7 shows an example screenshot of a Teacher Interactive Study Wall GUI 701 in accordance with a specific embodiment. According to different embodiments, the Teacher Interactive Study Wall GUI 701 may be configured or designed to enable school teachers and/or other school educators to perform a variety of activities such as, for example:

Browsing questions, comments, threads and discussions posted to the Interactive Study Wall;
Viewing Interactive Study Wall posts (e.g., 730) such as those posted by the Teacher user, students, other teachers, and/or Study Experts;
Viewing comments/replies to Interactive Study Wall posts (e.g., 740, 742, 744, 746) such as those posted by the Teacher user, students, other teachers, and/or Study Experts;
Searching for posts relating to specific content, keywords, topics, etc.;
Drafting and posting questions to the Interactive Study Wall;
Drafting and posting comments or replies to the Interactive Study Wall;
And/or other types of activities described and/or referenced herein.

In at least one embodiment, a "Teacher" as described herein may refer to an educator (e.g., teacher, professor, instructor, math coach, etc.) who is a member of a school staff or administration. Typically, such Teachers may have associated identities and/or profiles in the school district's computer network(s), which may be used to authenticate and verify a Teacher's credentials.

As illustrated in the example embodiment of FIG. 7, the Teacher Interactive Study Wall GUI 701 may be configured or designed to provide a Teacher user with access to a variety of functions and/or features of the Interactive Study Wall such as, for example, one or more of the following (or combinations thereof):

Access to tutorials, videos, and other educational content (702)
Access to Interactive Study Wall Leaderboard(s) (706)
Keyword search functionality (708)
Interfaces (e.g., 710, 750) for enabling Teacher user to initiate new posts (e.g., via 710), post comments/questions/replies to existing threads/posts (e.g., via 750), etc.
As illustrated in the example embodiment of FIG. 7, the Interface portions 710 and 750 may include features and/or functionality for enabling the Teacher user to initiate and/or perform one or more of the following operation(s)/action(s) (or combinations thereof):
Select, upload and post attachments (714).
Select, capture, edit, annotate, upload and post images or photos (715).
Create and post equations via equation editor functionality (716).
Record, edit, upload and post video content (712).
Access various types of whiteboard functionality (e.g., 713, 717), which, for example, may be used to create and post drawings, graphs, animated tutorials, etc. For example, as illustrated in the example embodiment of FIG. 7, Teacher Interactive Study Wall GUI 701 includes buttons or icons (e.g., Whiteboard Buttons 713, 753) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.
Post an image or video captured from the user's smartphone (721).
Post an image or video captured from the user's computer, tablet, etc. (719).
In at least one embodiment, Teachers may preview their post before publishing their post on the Interactive Study Wall.
Post/Thread filtering functionality (e.g., 720) for enabling Teacher users to selectively include or exclude display of posts/threads by defining, configuring and/or setting various filtering criteria such as, for example, one or more of the following (or combinations thereof):
Students' Teacher
Students' Section/Class
Students' School
Students' District
Students' Grade Level
Students' Region (e.g. Panhandle, Southern Florida, etc.)

Students' District Consortiums (e.g. NEFEC schools, etc.)
Students' Educational curriculum such as, for example: class/grade/school/textbook/state curriculum information.
Student's profile data such as, for example: User ID, User email address, User IP address, User messaging address, etc.
Students' School Rankings
Students' Gender
Students' Demographics
Students' test scores from previous formative assessments (e.g. benchmarks)
Students' test scores from previous summative assessments (e.g. end of course exams)
Post difficulty level (e.g., as ranked by algorithms)
Post difficulty level (e.g., as ranked by humans)
Number of posts started by Students
Number of comments (replies) made by Students
Number of karma points made by Students
Number of videos watched by Students
Difficulty level of videos watched by Students
Number of "Test Yourself!" questions attempted by Students
Number of "Test Yourself!" questions correctly answered by Students
Percentage of "Test Yourself!" questions correctly answered by Students
Teachers' Section/Class
Teachers' School
Teachers' District
Teachers' Grade Level
Teachers' Region (e.g. Panhandle, Southern Florida, etc.)
Teachers' District Consortiums (e.g. NEFEC schools, etc.)
Teachers' School Rankings
Teachers' Gender
Teachers' Demographics
Post difficulty level (e.g., as ranked by algorithms)
Post difficulty level (e.g., as ranked by humans)
Number of posts started by Students
Number of comments (replies) made by Students
Number of karma points made by Students
Number of videos watched by Students
Difficulty level of videos watched by Students
Number of "Test Yourself!" questions attempted by Students
Number of "Test Yourself!" questions correctly answered by Students
Percentage of "Test Yourself!" questions correctly answered by Students
Number of posts started by Teachers
Number of comments (replies) made by Teachers
Number of karma points awarded by Teachers
Number of videos watched by Teachers
Difficulty level of videos watched by Teachers
Posts/threads which have been identified as being closed or correctly answered
Posts/threads which have been identified as still being open or unanswered,
Etc.

In at least some embodiments, teachers and Study Experts may be provided with functionality for filtering posts based on one or more of the following types of filtering criteria (or combinations thereof):
Classroom,
Teacher,
Grade,
Section,
School,
District,
State,
Etc.

User Award/Incentive Functionality ("Karma points")
As illustrated in the example embodiment of FIG. 7, the Teacher Interactive Study Wall GUI 701 may be configured or designed to display Student Karma Point information including respective Karma Point scores (e.g., 735, 741, 743, 747), which represent that user's current Karma Point score.
In some embodiments, the Online Social Education System may be configured or designed to enable selected teachers to award Karma points to selected student users or selected groups of student users. However, the Online Social Education System may include automated mechanisms for preventing or discouraging teachers from showing favoritism in awarding Karma points to their own students. For example, in one embodiment, the OSES Server may allow teachers to award Karma points to students from other schools, but may prevent teacher from awarding Karma points to students who attend the same school as the teacher.

Figure 8:
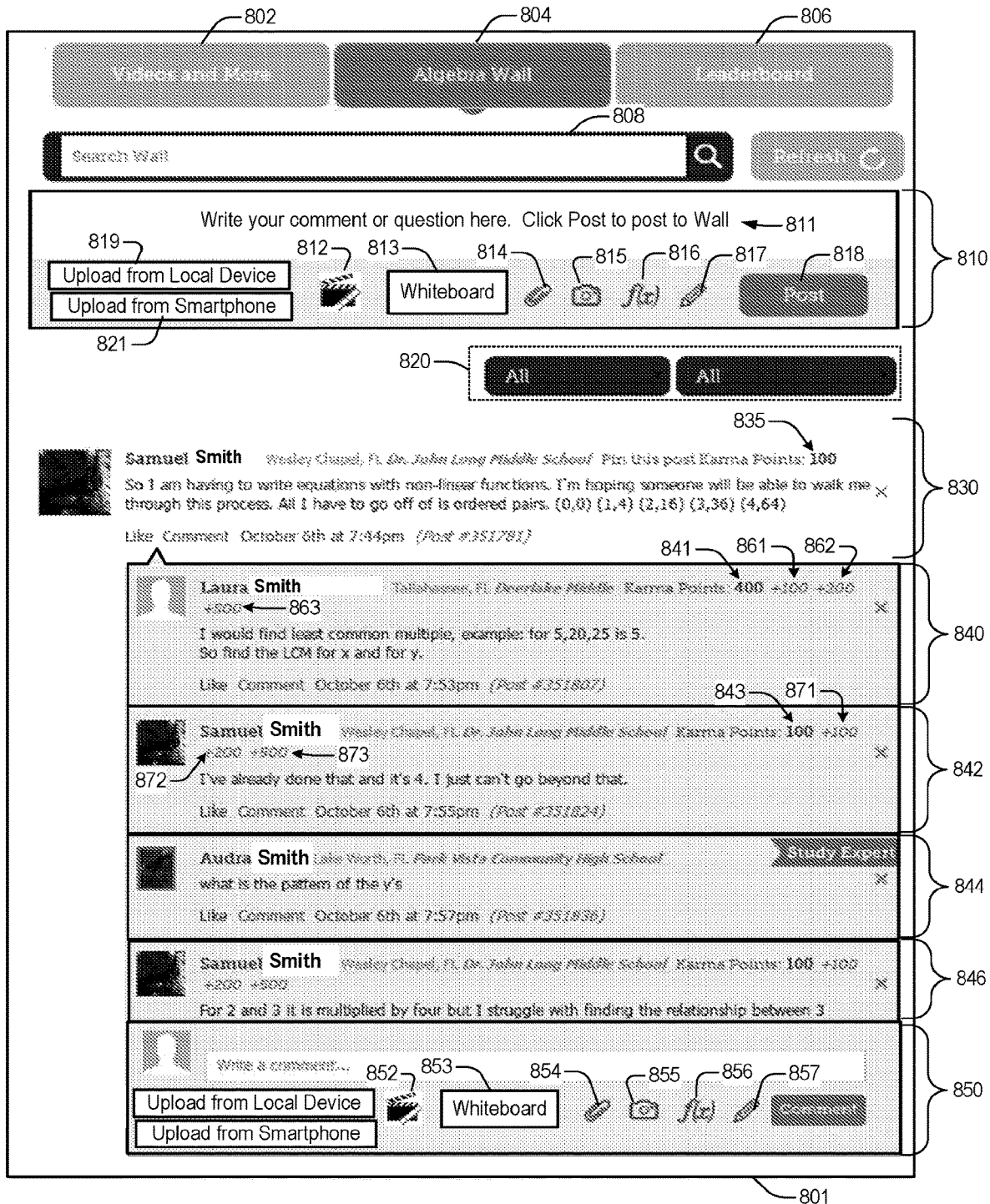

FIG. 8 shows an example screenshot of a Study Expert Interactive Study Wall GUI 801 in accordance with a specific embodiment. According to different embodiments, the Study Expert Interactive Study Wall GUI 801 may be configured or designed to enable school Study Experts and/or other teachers and school educators to perform a variety of activities such as, for example, one or more of those described and/or referenced herein with respect to the Teacher Interactive Study Wall GUI 701 of FIG. 7.

In at least one embodiment, a "Study Expert" as described herein may refer to any third-party person who has been provided with proper authorization/authority (e.g., from the Interactive Study Wall administration) to serve as an "educational moderator/facilitator" of one or more portions of the Interactive Study Wall.

As illustrated in the example embodiment of FIG. 8, the Study Expert Interactive Study Wall GUI 801 may be configured or designed to provide a Study Expert user with access to a variety of functions and/or features of the Interactive Study Wall such as, for example, one or more of the following (or combinations thereof):
Access to tutorials, videos, and other educational content (802)
Access to Interactive Study Wall Leaderboard(s) (806)
Keyword search functionality 808
Interfaces (e.g., 810, 850) for enabling Study Expert user to initiate new posts (e.g., via 810), post comments/questions/replies to existing threads/posts (e.g., via 850), etc.

As illustrated in the example embodiment of FIG. 8, the Interface portions 810 and 850 may include features and/or functionality for enabling the Study Expert user to initiate and/or perform one or more of the following operation(s)/action(s) (or combinations thereof):
Select, upload and post attachments (814).
Select, capture, edit, annotate, upload and post images or photos (815).
Create and post equations via equation editor functionality (816).
Record, edit, upload and post video content (812).

Access various types of whiteboard functionality (e.g., 813, 817), which, for example, may be used to create and post drawings, graphs, animated tutorials, etc. For example, as illustrated in the example embodiment of FIG. 8, Study Expert Interactive Study Wall GUI 801 includes buttons or icons (e.g., Whiteboard Buttons 813, 853) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.

Post an image or video captured from the user's smartphone (821).

Post an image or video captured from the user's computer, tablet, etc. (819).

In at least one embodiment, Study Experts may preview their post before publishing their post on the Interactive Study Wall.

Change the permissions level of an edited image, allowing images to be edited by one or more specified user(s) and/or group(s) of user(s) (e.g., one student, a group of students, teachers associated with a specific grade, teachers associated with a specific school, all students, all teachers, etc.).

Award Karma points (and/or other incentives/rewards) to Student users.

Edit posts/discussion threads.

Mark selected discussion threads as "closed".

The ability to "pin" a post to save it to the top of the wall to ensure maximum visibility Etc.

Post/Thread filtering functionality (e.g., 820) for enabling Study Expert users to selectively include or exclude display of posts/threads by defining, configuring and/or setting various filtering criteria such as, for example, one or more of those described and/or referenced herein.

In at least some embodiments, Study Experts and Study Experts may be provided with functionality for filtering posts based on one or more of the following types of filtering criteria (or combinations thereof):

Classroom,
Teacher,
Grade,
Section,
School,
District,
State,
Subject,
Difficulty level of questions,
Date,
Answered/Unanswered threads,
Posts which have been answered by a lower level moderator but have not been closed by an upper level moderator.
Etc.

User Award/Incentive Functionality ("Karma points")

As illustrated in the example embodiment of FIG. 8, the Study Expert Interactive Study Wall GUI 801 may be configured or designed to display Student Karma Point information including respective Karma Point scores (e.g., 835, 841, 843, 847), which represent that user's current Karma Point score.

Additionally, as illustrated in the example embodiment of FIG. 8, the Study Expert Interactive Study Wall GUI 801 may be configured or designed to include functionality (e.g., 861, 862, 863, 871, 872, 873, etc.) for enabling Study Experts to award different incremental values of additional Karma points (e.g., +100, +200, +500) to one or more student users.

In at least some embodiments, the Interactive Study Wall may be configured or designed to enable Study Experts (and/or other types of moderators) to award different incremental values of additional Karma points (e.g., +100, +200, +500) to one or more student users for facilitating and encouraging learning and user participation.

User Award/Incentive Functionality ("Karma Points")

In at least one embodiment, Karma points may be awarded to users who post questions on the Interactive Study Wall (e.g., as illustrated at 1013, 1014, 115, 1016 of FIG. 10), and/or may be awarded to users who post replies or comments on the Interactive Study Wall (e.g., as illustrated at 861, 862, 863, 871, 872, 873 of FIG. 8).

In some embodiments, when a user has been awarded Karma points for a particular post, the OSES Server may automatically update the user's current and overall Karma point score by adding the current Karma point award to the user's current and overall Karma point score (e.g., corresponding to the user's current Karma point score which existed at the time when the additional Karma points were awarded to the user).

In some embodiments, the Online Social Education System may be configured or designed to include functionality for tracking Karma point award events and their corresponding Interactive Study Wall events (e.g., user posts which received Karma point awards), and for preventing duplication of Karma point awards based on the same Interactive Study Wall event(s).

In at least some embodiments, when a user has been awarded Karma points for a particular post (e.g., by a first Study Expert), the OSES Server may automatically and/or dynamically update or modify one or more of the Interactive Study Wall GUIs (e.g., of the first Study Expert, and of a second Study Expert) to prevent additional Karma points from being awarded to the user for the same post.

Figure 10:
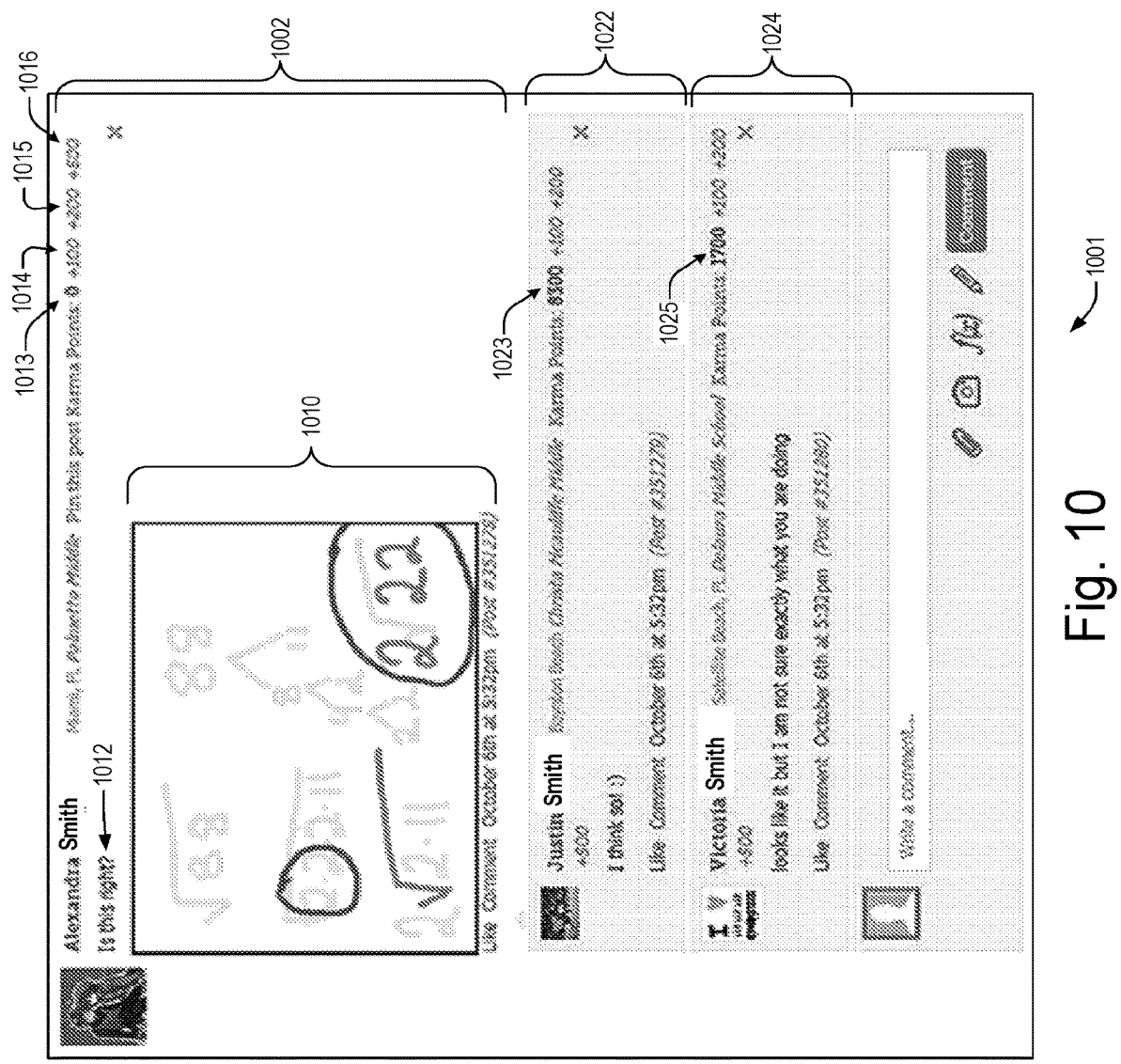

By way of illustration, FIG. 10 illustrate example screenshots of different Study Expert Interactive Study Wall GUIs which help illustrate the features relating to the awarding of Karma points and to the prevention of additional Karma points from being awarded for a given post (e.g. 1002). Referring first to FIG. 10, it is assumed that the user (Alexandra Smith) has posted an initial question 1002 on the Interactive Study Wall, and that a Study Expert is viewing the Interactive Study Wall discussion relating to post 1002 via Study Expert Interactive Study Wall GUI 1001. As illustrated in the example embodiment of FIG. 10, the user's current Karma point score (indicated at 1013) is zero. In this particular example, it is assumed that the user (Alexandra Smith) has not yet been awarded with Karma points for posting this question since the Study Expert Interactive Study Wall GUI 1001 includes Karma point award features/functionality (e.g., 1014, 115, 1016) for enabling the viewing Study Expert to award the user with Karma points associated with post 1002. It is then assumed that the Study Expert takes action to award the user with +100 Karma points for posting question 1002 on the Interactive Study Wall. In one embodiment, the Study Expert may award the user with +100 Karma points for posting question 1002 by clicking on the displayed "+100" object (1013). This action is detected by the OSES Server, which responds by automatically updating the user's current Karma point score by adding the current Karma point award (+100) to the user's current Karma point score (0), resulting in an updated Karma point score of 100. In other embodiments, if the Study Expert had desired to award +200 Karma points or +500 Karma points to the user (instead of +100), the Study Expert could have done so by clicking on the displayed "+200" object (1015) or "+500" object (1016), respectively.

In at least one embodiment, after the user has been awarded +100 Karma points for posting question 1002 on the Interactive Study Wall, the OSES Server may automatically update the Study Expert Interactive Study Wall GUIs (e.g., of any Study Experts who subsequently view the discussion thread relating to post 1002) to prevent additional Karma points from being awarded to the user for the same post. For example, in the specific example embodiment of FIG. 10, it is assumed that the user has already been awarded +100 Karma points for posting question 1002 on the Interactive Study Wall. Accordingly, the user's updated displayed Karma point score will be 100, and the Study Expert Interactive Study Wall GUI 1001 may be modified (e.g., by the OSES Server) to omit, remove, or prevent the display of the Karma point award features/functionality (e.g., such as that displayed 1014, 1015, 1016 of FIG. 10) to thereby to prevent additional Karma points from being awarded to the user for posting question 1002.

In at least some embodiments, the Interactive Study Wall may be configured or designed to enable Study Experts (and/or other types of moderators) to penalize users who post inappropriate questions/comments by causing different incremental values of Karma points to be subtracted from a given user's current Karma point score.

In at least some embodiments, the awarding (and/or subtracting) of Karma points by a given Study Expert may be discretionary, and may be based at least partially upon predefined guidelines, such as, for example, the Karma Points Distribution Guidelines described below.

In at least some embodiments it will be possible to give Karma points through another administrator that is not visible on the Interactive Study Wall and only accessed through an administrator tool page. That is, a Study Expert does not need to be actively viewing the Study Wall to give or take away points.

Example Karma Point Distribution Guidelines

In at least one embodiment, the Online Social Education System may be configured or designed to facilitate implementation and enforcement of a set of Karma Point Distribution Guidelines, which may govern the actions of Study Experts in awarding and distributing Karma points to users of the Interactive Study Wall. In some embodiments, the Online Social Education System may be configured or designed to include functionality for automatically awarding and/or distributing Karma points to Interactive Study Wall users based on predefined sets of rules. However, in at least some embodiments, it is desirable for Study Experts (humans) to review Interactive Study Wall posts and award Karma points in accordance with established Karma Point Distribution Guidelines. One reason for this is that Study Experts inject a human element into the points-incentives-rewards system, so if a student exhibits a new, positive behavior that is not covered explicitly in the guidelines, Study Experts are empowered to award Karma points based on their assessment of the user's behavior and/or contributions and to provide feedback for new potential guidelines. This also helps to build an ongoing and growing culture on the Wall.

Example Karma Point Granularity Groups

According to different embodiments, the value or amount of Karma points (and/or other types of user incentive awards for Interactive Study Wall participation) which are awarded or distributed (e.g., to a given Interactive Study Wall student user), may be based, at least partially, upon consideration of a various factors such as, for example, one or more of the following (or combinations thereof):

Student User's School Level (e.g. Middle School vs. High School)
Student Users' testing level (e.g. $1^{st}$ time test-taker vs. re-takers)
Previous top score earners/prize winners (e.g. iPad winners)
Top 50 of leaderboard karma point earners
Student User's Experience Level (e.g. new users vs. veteran users)
Students who help other students outside of their section, school, and/or district (e.g., such activity may justify increased Karma point awards to the helping student)

Leaderboard Functionality

In at least some embodiments, Karma Points and/or other awards awarded to users of the Interactive Study Wall may be used to generate leaderboard rankings among selected groups of users. In at least some embodiments, the Online Social Education System may include various types of Leaderboard Functionality, which may be configured or designed to display various types of rankings among selected groups of users.

For example, in at least one embodiment, the Interactive Study Wall leaderboard results/rankings may be filtered according to various criteria such as, for example, one or more of the following (or combinations thereof):
class;
grade level;
students in my class;
students in my school;
students in my district;
school;
school district;
geographic region;
district middle schools;
district high schools;
district elementary schools;
user experience level (e.g., novice vs. advanced user);
user demographics such as, for example, sex, age, location, etc.
etc.
Leaderboard Functionality may be configured or designed to provide the ability for students to compete against their peers (classmates, school mate, etc.).
Interactive Study Wall leaderboard shows middle school vs. high school rankings depending on the viewing user's grade level (e.g. middle school student will see middle school leaderboard results).
Personalized leaderboard results/rankings may be automatically and/or dynamically displayed to a given user, based on the identity of the viewing user (and/or other criteria associated with that user);
Prizes can be awarded by school, class, period, teacher, district, state, etc. In some embodiments, prizes can be awarded by teacher, school, or by the school district.
Leaderboard Functionality provides additional incentive for users to proactively participate in conversations and other interactions of the Interactive Study Wall.
In some embodiments, prizes may be awarded to students with the relatively highest Karma points earned during a specified time interval (e.g., one week, 7 days, one month, 30 days, school quarter, school semester, school year, etc.)

In at least some embodiments, Leaderboard Functionality and awarding of prizes may be configured in such as way so as to encourage collaboration among student users.

In at least some embodiments, Leaderboard Functionality and awarding of prizes may be configured in such as way so as to encourage competition among student users.

In at least some embodiments, Leaderboard Functionality and awarding of prizes may be configured in such as way so as to encourage collaboration among student users of the same school, while also encouraging competition among student users of different schools.

Online Discussion Thread Whiteboard Functionality

Several aspects of the present application relate to the provisioning or integration of discussion thread whiteboard functionality in online learning environments such as discussion forums, discussion threads, chat rooms, discussion walls, Interactive Study Walls, etc. (collectively referred to as "collaborative online discussion mediums") Example embodiments of features relating to this aspect are illustrated, for example, in FIGS. 6-10.

Figure 9:
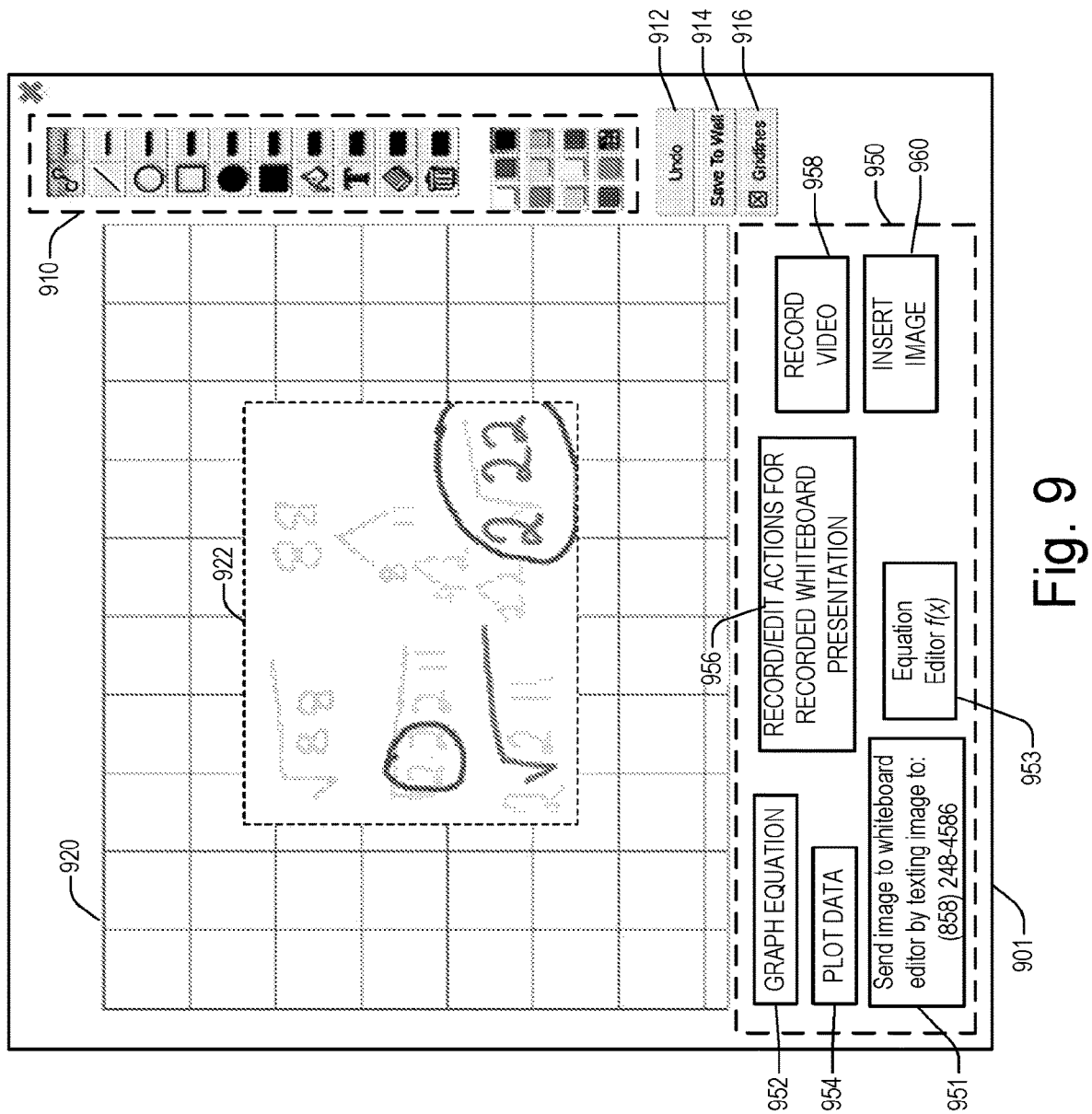

For example, as illustrated in the example embodiment of FIG. 6, Student Interactive Study Wall GUI 601 includes buttons or icons (e.g., Whiteboard Buttons 613, 653) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.

FIG. 9 shows an example screenshot of an Interactive Whiteboard GUI 901 in accordance with a specific embodiment. As illustrated in the example embodiment of FIG. 9, the Interactive Whiteboard GUI 901 includes a variety of different whiteboard tools (e.g., 910, 920, 950) for enabling users to perform a variety of activities such as, for example, one or more of the following (or combinations thereof):

Create/draw/edit notes, pictures, and/or diagrams (e.g., via whiteboard editing tools 910).

Create/draw/edit graphs (e.g., via freehand, using pre-set grid lines, etc.).

Create data tables

Plot graphs based upon data points, equations, etc. (e.g., via Graph Equation functionality 952, Plot data functionality 954, etc.).

Capture/upload/edit/annotate images (e.g., via Insert Image functionality 960, via mobile device, email, MMS (951), etc.);

Record/upload/edit videos (e.g., via Record Video functionality 958, via Record/Edit Actions functionality 956, via mobile device, email, MMS, etc.).

Scan/upload/edit/annotate documents (e.g., via mobile device, email, MMS, reference library pre-populated by the system, etc.).

Record and upload annotated/animated whiteboard diagrams.

Write out complex equations (e.g., via Equation Editor functionality 953).

Draw formulas.

Draw molecular structures, which may or may not be pre-populated by the system.

And/or other types of graphical illustration, editing, annotating operations/activities.

In the specific example embodiment of FIG. 9, it is assumed that a Student user desires to submit a post on the Interactive Study Wall relating to a specific mathematical problem. The Student user accesses an instance of the Interactive Whiteboard GUI 901 to graphically illustrate (e.g., at 922) a portion of steps for solving the mathematical problem. In this particular example, it is assumed that the user accesses the whiteboard drawing tools 910 to draw various equations 922 on the whiteboard canvas 920. The user then intends to post the whiteboard drawing into a new discussion thread, which requests other users to review/confirm/comment on whether (or not) the Student user's work/proposed solution is correct. After drawing/annotation is completed, the user can choose to save the edited whiteboard canvas (or whiteboard drawing) and/or post directly to the online discussion thread (e.g., Interactive Study Wall), which causes the whiteboard drawing to be inserted into a new (or existing) discussion thread, as shown, for example, in at 1010 of FIG. 10. The whiteboard may also be used by a student/study expert/teacher to aid in the answering of another student's/Study Expert's/teacher's question.

In at least some embodiments, the user may also be provided with the option to add or attach additional commentary/text to the whiteboard drawing before and/or after posting to the discussion thread. The whiteboard drawing (with or without the additional text/commentary, as the user elects) may then be posted directly to the identified discussion thread, with no interruption in the flow of the discussion. Thus, for example, as illustrated in the example embodiment of FIG. 10, the Interactive Study Wall Discussion Thread GUI 1001 shows that the Student user (Alexandra Smith) has posted a new discussion thread which includes the whiteboard drawing 1010 (created via the Interactive Whiteboard GUI 901) and an associated comment/question 1012 (e.g., "Is this right?"). Other online users of the Interactive Study Wall may view the discussion thread post, and (if desired) submit comments/replies (e.g., as indicated, for example, at 1022 and 1024).

According to different embodiments, users may interact with the various discussions or threads of the Interactive Study Wall both synchronously and/or asynchronously. In some embodiments, users may reply to the entire thread generally, or to a comment specifically.

In some embodiments, the OSES whiteboard functionality may be configured or designed to enable or provide different types of whiteboard functionalities and/or privileges to different users who are collaborating together via the Interactive Study Wall and/or other OSES discussions/threads/forums. In some embodiments, at least a portion of such permissions/restrictions in functionalities, editing capabilities, and/or privileges may be dynamically configured by users via one or more Interactive Study Wall GUIs. For example, in some embodiments, some instances of Interactive Whiteboard GUIs may be configured or designed to include functionality for enabling users to configure different levels of permissions/restrictions/privileges for different users (and/or groups of users) with respect to accessing and/or editing posted content at one or more OSES discussions/threads/forums. In some embodiments, some instances of the Interactive Whiteboard GUI may include functionality for configuring different levels of permissions/restrictions/privileges for different users (and/or groups of users). In some embodiments, permissions/restrictions/privileges for accessing and/or editing posted content at one or more OSES discussions/threads/forums may be automatically configured (e.g., by the OSES Server), based on one or more criteria such as, for example, one or more of the following (or combinations thereof):

Class/type of User (e.g., Student, Teacher, Study Expert)
        Students' Educational curriculum such as, for example: class/grade/school/state standard/state curriculum information.
        Student's profile data such as, for example: User ID, User email address, User IP address, User messaging address, etc.
    And/or other types of criteria described and/or referenced herein.

For example, in one embodiment, one or more user(s) may be provided with access to editing privileges (e.g., for editing posted images and/or text), while the other users in the discussion may be provided with only viewing privileges (and may be prevented from having access to editing privileges). In some embodiments, one or more user(s) may be granted permissions for allowing the identified user(s) to grant/remove/modify/configure editing privileges for one or more other users. In some embodiments, more than one user (e.g., multiple different users) may be provided with whiteboard editing privileges, and may concurrently (e.g., in real-time) (or asynchronously) draw, annotate and/or edit images, drawings and/or other objects displayed on the whiteboard canvas. In embodiments where multiple users are granted whiteboard editing privileges, visual indicators may be optionally enabled to identify and associate specific edits, annotations, revisions with the respective user(s) who performed such actions/operations.

Interactive Study Wall Filtering Functionality

As described above, at least some Online Social Education System(s) may be configured, designed to provide Interactive Study Wall Filtering Functionality for enabling personalization of users' Interactive Study Wall interactions, such as, for example, filtering posts to specific students (e.g. based on level of student, student's district, school, course enrollment, etc.). In some embodiments, filtering personalization for one or more students/users may be based, at least partially, on one or more of the following criteria (or combinations thereof):

posts for which a student/user has flagged as being of interest (e.g., user has clicked on "like" button);
    posts with which a student/user has actively engaged/interacted;
    student performance (e.g., how well student performs on practice tools);
    student inputs/self-assessment;
    tags/classifications associated with one or more Interactive Study Wall posts (e.g., high difficulty, medium difficulty, low difficulty, geometry, algebra, fractions, etc.)

In some embodiments, the OSES Server may be configured or designed to present a filtered Student Interactive Study Wall GUI which has been customized and/or personalized to display Interactive Study Wall posts which are determined by the system to be relevant to the user (student) who is viewing the Student Interactive Study Wall GUI. The Interactive Study Wall dynamic filtering functionality enables personalization of a user's Interactive Study Wall interactions, such as, for example, filtering posts to specific students (e.g. based on level of student, student's district, school, course enrollment, etc.).

Various features relating to Personalization on of Wall/Adaptive Learning/Interactive Discussion Forums may include, but are not limited to, one or more of the following (or combinations thereof):

Discussion boards may be automatically and dynamically personalized dependent on the needs and/or interests of user/viewer.

Automated Adaptive Learning and Personalization of User's Interactive Study Wall. In at least one embodiment, this may include showing specific posts to specific students (e.g., based on level of student, student's district, school, course enrollment, etc.). In some embodiments the automated adaptive learning and personalization of a user's Interactive Study Wall may be based, at least partially, posts which the user has "liked". In this way, the Online Social Education System is able to dynamically learn what subject matter a student like, and may dynamically learn or determine the educational curriculum levels: (1) in which the student has demonstrated an adequate understanding or proficiency of specific subject matter, and (2) in which the student has not yet demonstrated an adequate understanding or proficiency of specific subject matter. For example, in one embodiment, the Online Social Education System may evaluate the student based on his or her performance on practice tool or test, and may use the evaluation results to dynamically select, modify, and/or filter selected posts which are displayed on the user's personalized Interactive Study Wall. For example, if the Online Social Education System determines that a given user is less proficient in nonlinear functions, the system may dynamically filter the posts displayed on the user's Interactive Study Wall to cause more posts relating to nonlinear functions to be displayed on the user's Interactive Study Wall.

In some embodiments, may also be based on "pre-test" that asks students to self-assess their confidence level on given problems. In some embodiments, may also be based on "self-assessment" such as, for example, student checking off what they understand/don't understand.

Interactive Study Wall users can mark posts as "high/medium/low" to identify the perceived level of difficulty or complexity with a given post, which may be shared with other users, and may also be utilized by the Online Social Education System.

In this way, the Online Social Education System may improve some aspects of students' academic performance and, may create a sense of connectedness that promotes active learning.

Although other social networks may provide features for enabling users to "like" selected posts, one important distinction between such social networks and the Online Social Education System is that, in the Online Social Education System, the user's interests and needs are continually shifting and changing as the user continues to learn and digest new educational curriculum. For example, if a user "likes" a baking-related post on Facebook, Facebook system may show the user more posts about baking, and it is likely that the user will probably still like baking 3 months later. In contrast, a student user of the Interactive Study Wall may "like" a post relating to algebraic equations one month (e.g., while the student is studying algebraic equations in class), but may no longer be interested in viewing posts relating to algebraic equations three months later, for example, because the student has moved on to studying other subject matter. Accordingly, the Online Social Education System is configured or designed to take into account that the student users are continually learning, and are moving through different curriculum in their classrooms. In this way, the Online Social Education System is able to provide dynamically changing, personalized content for each respective user or groups of users (e.g., of a given classroom, grade, etc.) which is substantially relevant to the specific curriculum which the user is currently studying, and relevant to the current needs and interests of the user. For example:

Students mastering certain topics—posts relating to those topics are filtered out from the user's Interactive Study Wall "feed".

Students identified as having issues with certain topic—posts relating to those topics are included in the user's the user's Interactive Study Wall "feed".

Students identified as having similar "Learning Profiles" may view posts from similar learning profile students.

Students, teachers, and/or other users across different geographic regions may use the Interactive Study Wall to collaborate with each other, and the Interactive Study Wall may be configured or designed to automatically and/or dynamically filter posts displayed on each respective user's Interactive Study Wall "Feed" so that only relevant and/or appropriate posts are displayed to each respective user, based on various criteria such as, for example, one or more of the following (or combinations thereof):
class;
grade level;
school;
teacher;
school district;
geographic region;
user experience level (e.g., novice vs. advanced user);
user's current education curriculum;
etc.

In at least some embodiments, Interactive Study Wall may also provide functionality for enabling users to define or configure various filtering rules and/or filtering parameters.

In at least some embodiments, Interactive Study Wall may also provide functionality for enabling users to search for key words of post.

In at least some embodiments, Interactive Study Wall may also provide functionality for recommending to a given user one or more video tutorials, where such recommendations may be based, at least partially upon the subject matter or relevancy of posts which have been (or are being) viewed by that user.

Video Presentation and Digital Compositing Functionality

According to different embodiments, at least a portion of the various types of educational video presentation procedure(s) described herein may be implemented at one or more client systems(s), at one or more server systems (s), and/or combinations thereof.

In at least one embodiment, one or more of the educational video presentation procedure(s) described herein may be operable to utilize and/or generate various different types of data and/or other types of information when performing specific tasks and/or operations. This may include, for example, input data/information and/or output data/information. For example, in at least one embodiment, the educational video presentation procedure(s) may be operable to access, process, and/or otherwise utilize information from one or more different types of sources, such as, for example, one or more local and/or remote memories, devices and/or systems. Additionally, in at least one embodiment, the educational video presentation procedure(s) may be operable to generate one or more different types of output data/information, which, for example, may be stored in memory of one or more local and/or remote devices and/or systems. Examples of different types of input data/information and/or output data/information which may be accessed and/or utilized by the educational video presentation procedure(s) may include, but are not limited to, one or more of those described and/or referenced herein.

In at least one embodiment, a given instance of one or more of the educational video presentation procedure(s) may access and/or utilize information from one or more associated databases. In at least one embodiment, at least a portion of the database information may be accessed via communication with one or more local and/or remote memory devices. Examples of different types of data, which may be accessed by the educational video presentation procedure(s), may include, but are not limited to, one or more of those described and/or referenced herein.

According to specific embodiments, multiple instances or threads of the educational video presentation procedure(s) may be concurrently implemented and/or initiated via the use of one or more processors and/or other combinations of hardware and/or hardware and software. For example, in at least some embodiments, various aspects, features, and/or functionalities of the educational video presentation procedure(s) may be performed, implemented and/or initiated by one or more of the various systems, components, systems, devices, procedures, processes, etc., described and/or referenced herein.

According to different embodiments, one or more different threads or instances of the educational video presentation procedure(s) may be initiated in response to detection of one or more conditions or events satisfying one or more different types of minimum threshold criteria for triggering initiation of at least one instance of the educational video presentation procedure(s). Various examples of conditions or events which may trigger initiation and/or implementation of one or more different threads or instances of the educational video presentation procedure(s) may include, but are not limited to, one or more of those described and/or referenced herein.

According to different embodiments, one or more different threads or instances of the educational video presentation procedure(s) may be initiated and/or implemented manually, automatically, statically, dynamically, concurrently, and/or combinations thereof. Additionally, different instances and/or embodiments of the educational video presentation procedure(s) may be initiated at one or more different time intervals (e.g., during a specific time interval, at regular periodic intervals, at irregular periodic intervals, upon demand, etc.).

In at least one embodiment, initial configuration of one or more instances of the educational video presentation procedure(s) may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the educational video presentation procedure may correspond to and/or may be derived from the input data/information.

Figure 11:
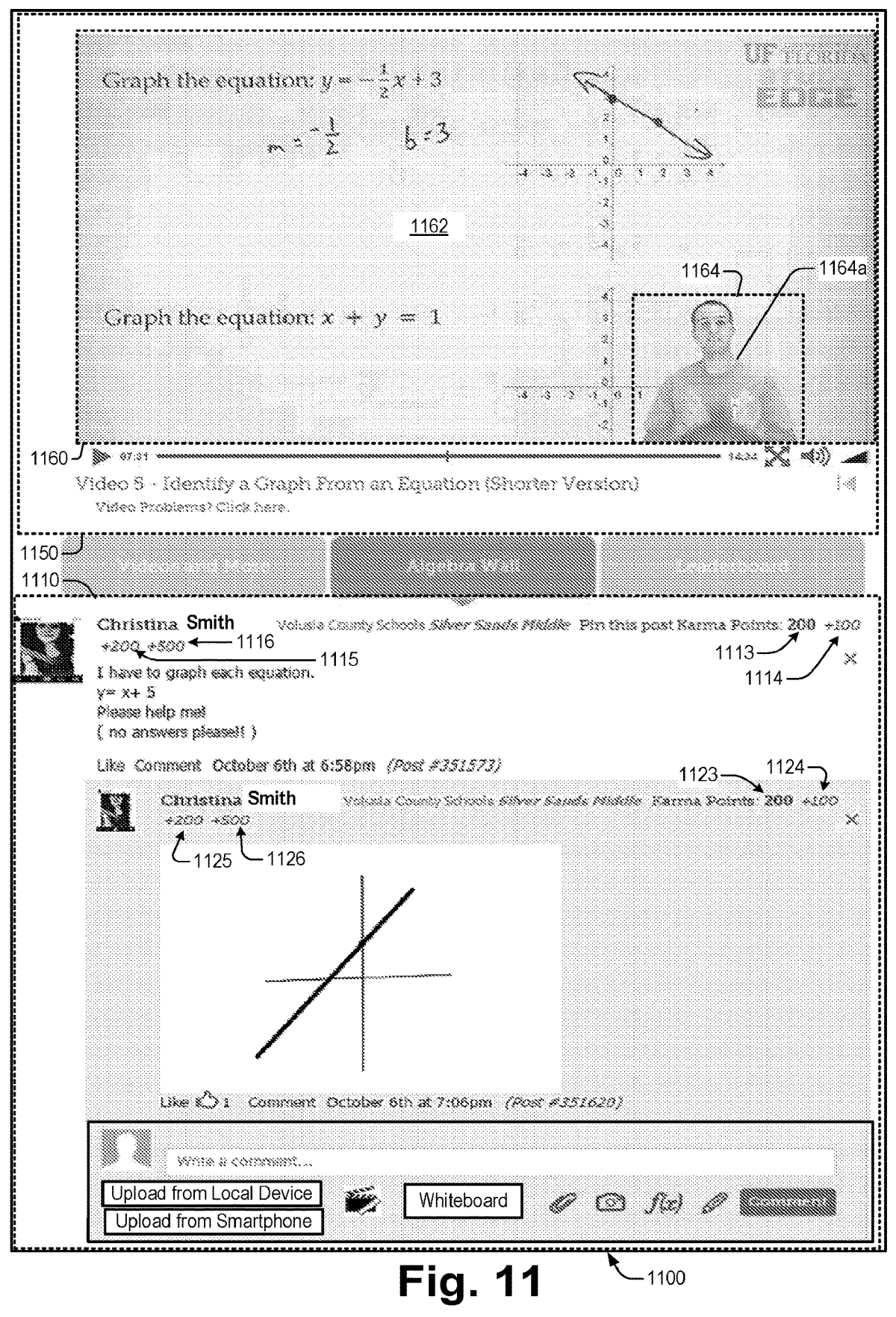

FIG. 11 shows an example screenshot of an Interactive Study Video Discussion Thread GUI 1100 in accordance with a specific embodiment. As illustrated in the example embodiment of FIG. 11, the Interactive Study Video Discussion Thread GUI 1101 may include, but are not limited to, one or more of the following (or combinations thereof):

Video Presentation portion 1110, which may be configured or designed to display one or more educational/tutorial videos relating to specific subject matter selected by the user (e.g., "Identify A Graph From An Equation")

Discussion Thread portion 1112, which may be configured or designed to enable users to post questions and/or comments relating to the video being presented in the Video Presentation portion 1110.

As illustrated in the example embodiment of FIG. 11, a student user has posted (at 1122) an initial question relating to the video tutorial (e.g., "Identify A Graph From An Equation"), requesting assistance in graphing the equation "y=x+5". In this particular example, it is assumed that the user subsequently accesses the OSES whiteboard functionality to create a drawing of a graph showing how the equation "y=x+5" may be graphed on an X-Y Axis, which is then posted (e.g., at 1132) as a comment/reply in the discussion thread.

Figure 12:
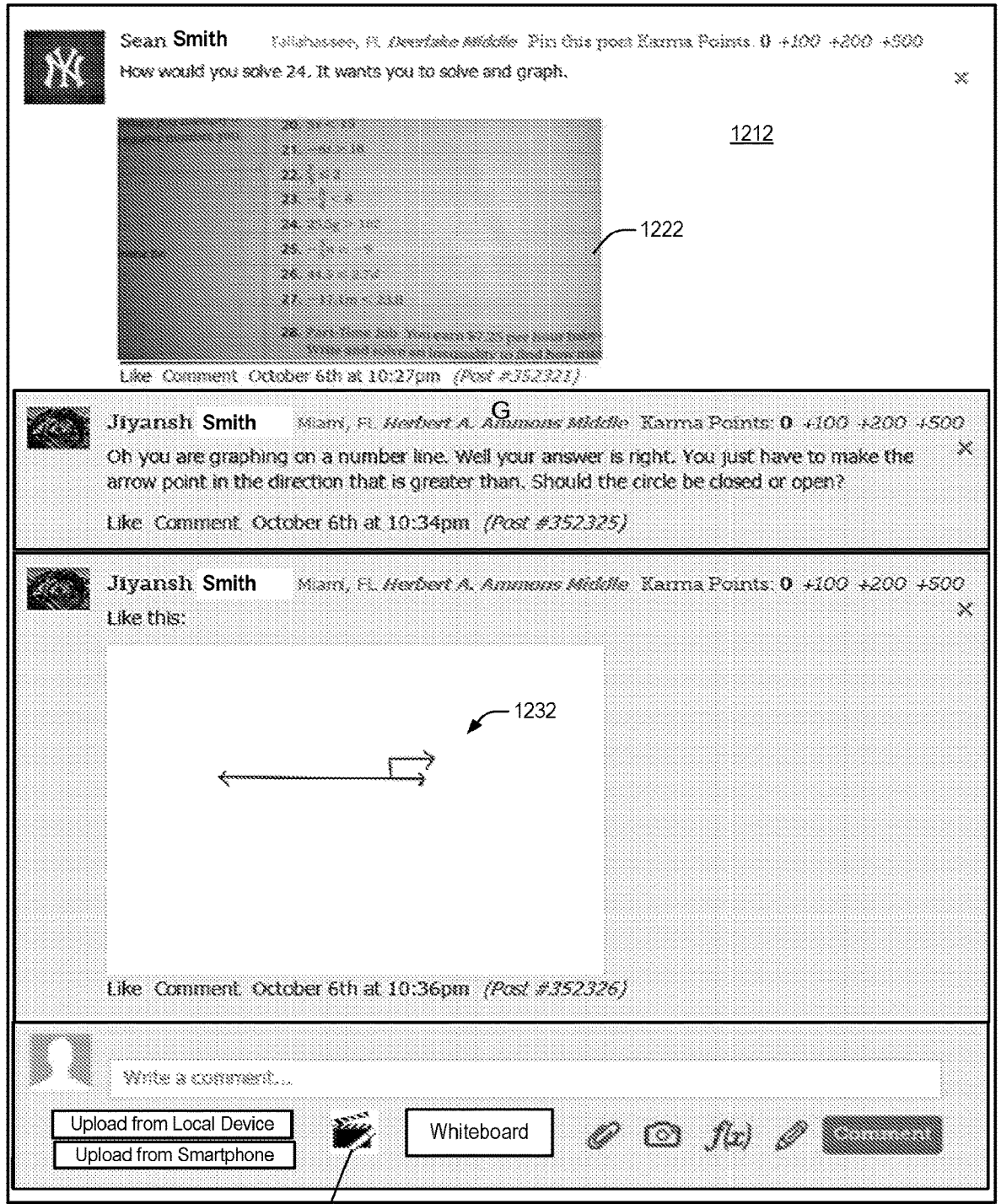
Figure 13:
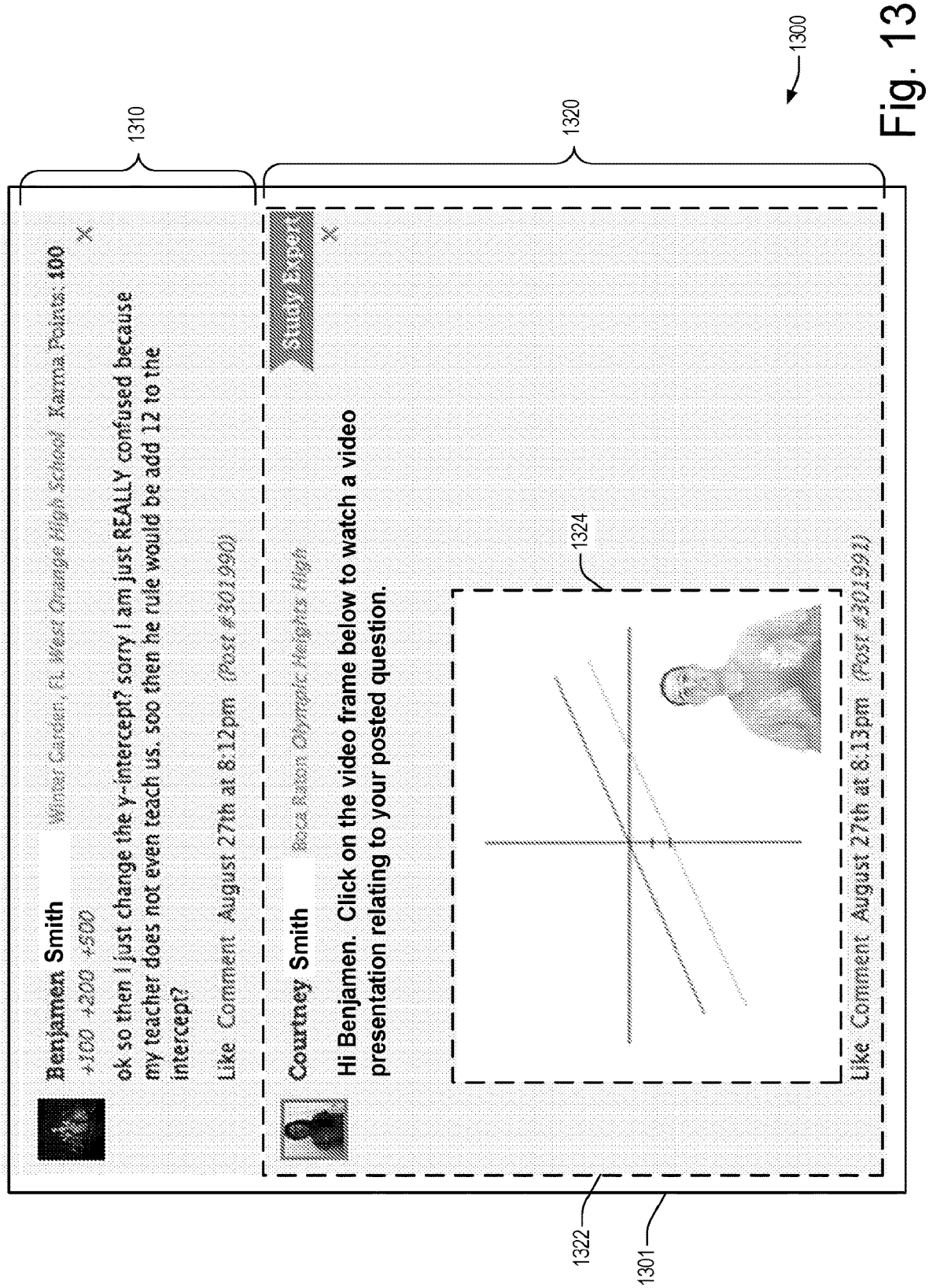

FIGS. 12 and 13 show example screenshots of different Interactive Study Wall GUI embodiments. In the specific example embodiment of FIG. 12, it is assumed that a first student user (e.g., Sean Smith) posts a question (1212) on the Interactive Study Wall, requesting assistance and how to solve problem 24 in the accompanying image 1222. In this particular example, it is assumed that the image 1222 represents a photo of a page from an algebra workbook, which was captured by the user (e.g., via the user's smartphone) and uploaded to the OSES Server. In one embodiment, the user can upload a photo or image to the Interactive Study Wall directly from the corresponding mobile app. In another embodiment, a user can text or email the photo or image to the OSES Server, and the OSES Server may automatically post the received image/photo to the Interactive Study Wall. In this particular example, it is assumed that a second user (e.g., Jayansh Smith) accesses the OSES whiteboard functionality to create a graphical drawing of an annotated number line showing how problem 24 may be graphed, and then posts the graphical drawing (1232) as a comment/reply in the discussion thread. In other embodiments (not shown), users may access the video recording functionality of the Online Social Education System (e.g., via video icon 1252) in order to record and post a video-based reply to the first student user's question.

In the example embodiment of FIG. 13, the Interactive Study Wall GUI 1300 may be configured or designed to include functionality for capturing and posting screenshots or selected frames (e.g., 1324) of educational video presentations to the Interactive Study Wall (e.g., as part of posted questions and/or comments). In at least some embodiments, the posted video frame(s) (1324) may be linked to a particular scene or segment of an associated educational video presentation. When a user clicks on the posted video frame (1324), the OSES Server may respond by causing the identified scene or segment of the associated educational video presentation to be played at the user's system.

Many of today's online educational videos do not capture student attention for long (or at all), and often come across as being impersonal or mechanical. Such educational videos typically have to choose between showing an instructor, speaking to a camera (lecture style), or featuring the problem at hand, with instruction, if any is given, as a voiceover (documentary style).

For example, FIGS. 14-15, and 30-31 illustrate example screenshots of conventional educational video presentation display techniques. It will be appreciated that the various video presentation and digital compositing techniques described herein provide a variety of additional features, benefits and advantages over conventional online educational video presentation techniques. For example, many conventional online educational video presentation techniques may generally be categorized into one or more the following types:

Documentary Style (no visual Presenter). For example:
Display of writing on a page with no visual Presenter and/or with a disembodied voice narrating.
An educational video presentation, which displays a sequence of slides accompanied by a voice only narration.

Figure 14:
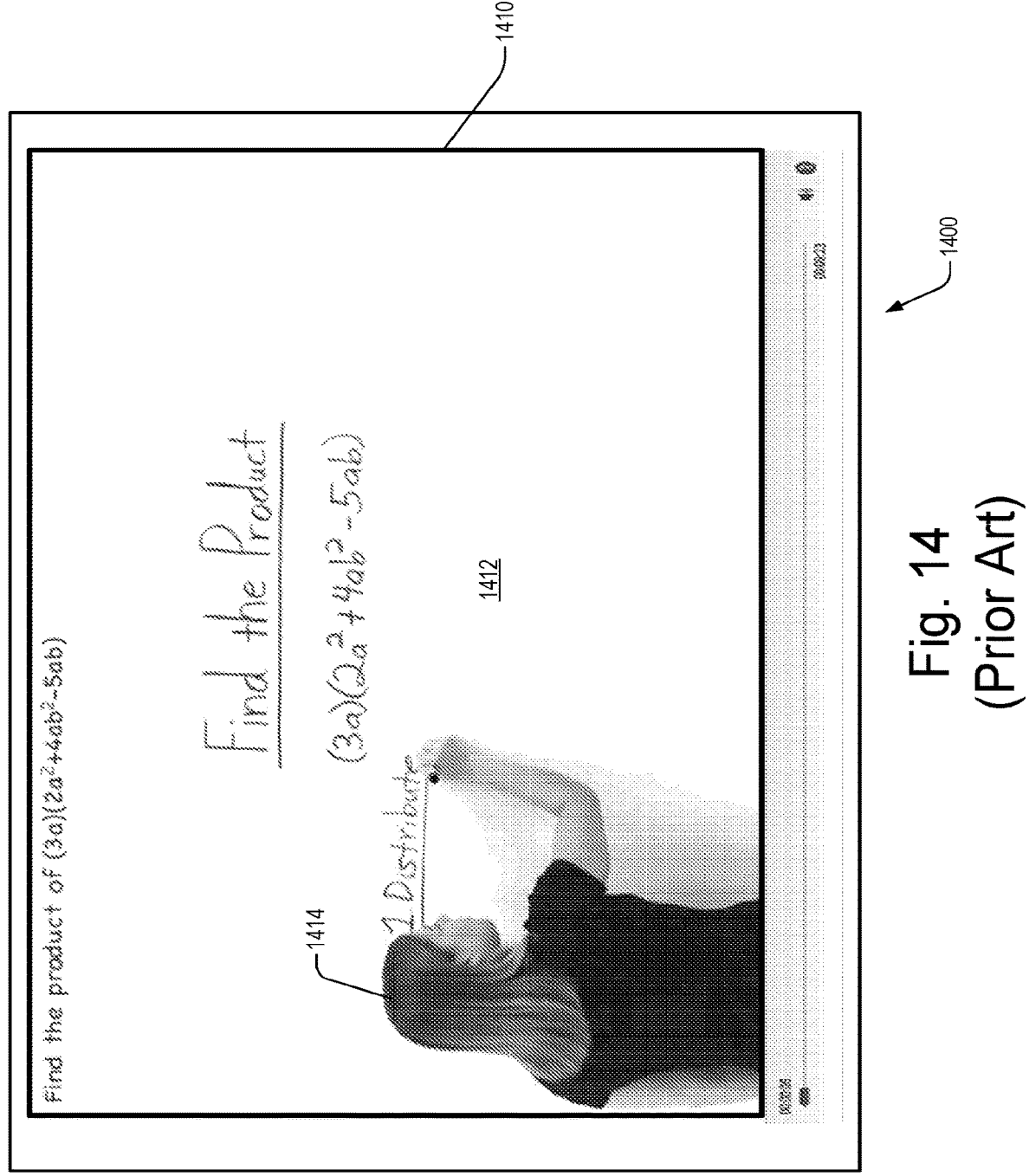
FIGS. 14-15, and 30-31 illustrate example screenshots of conventional educational video presentation display techniques.
Figure 30:
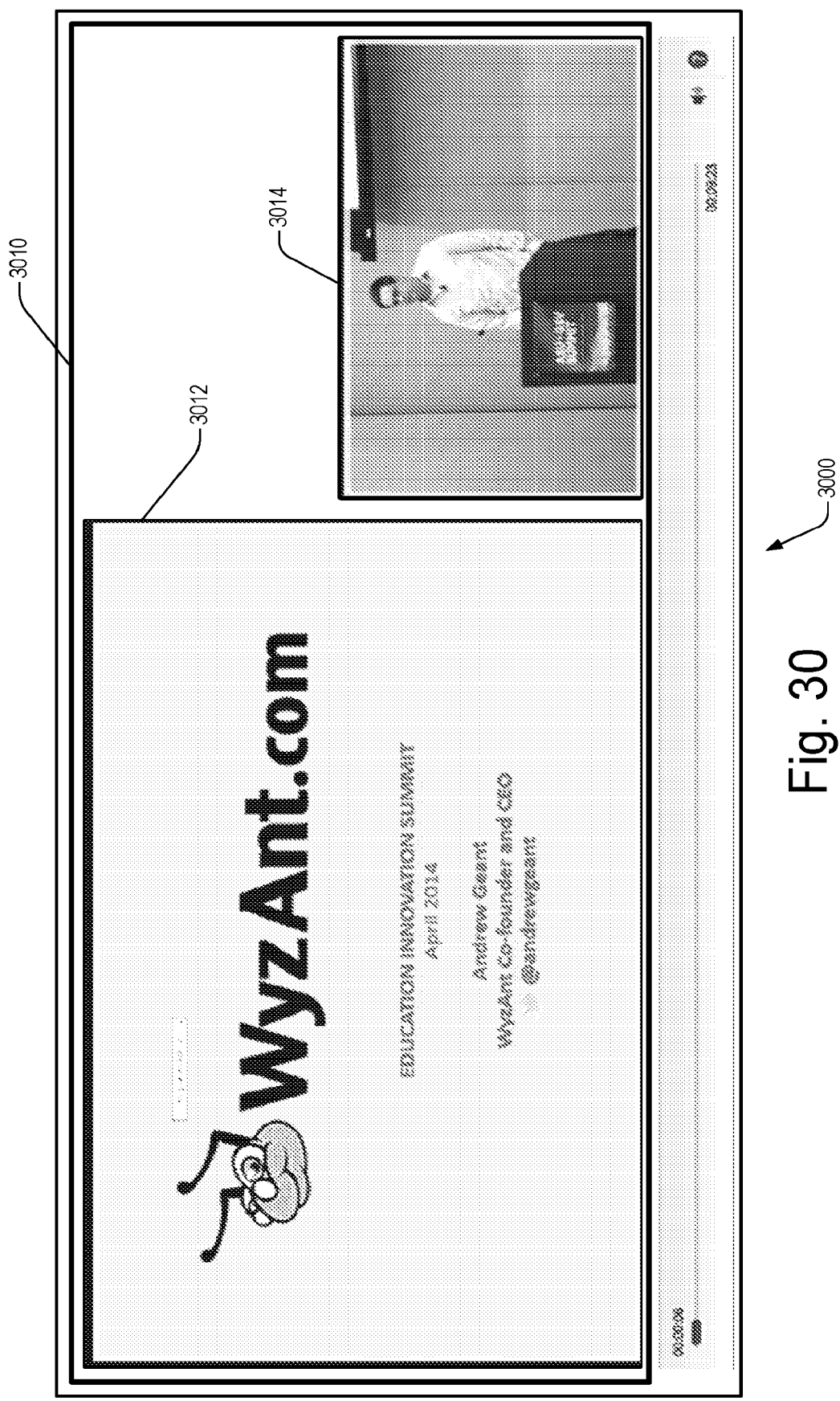
Figure 31:
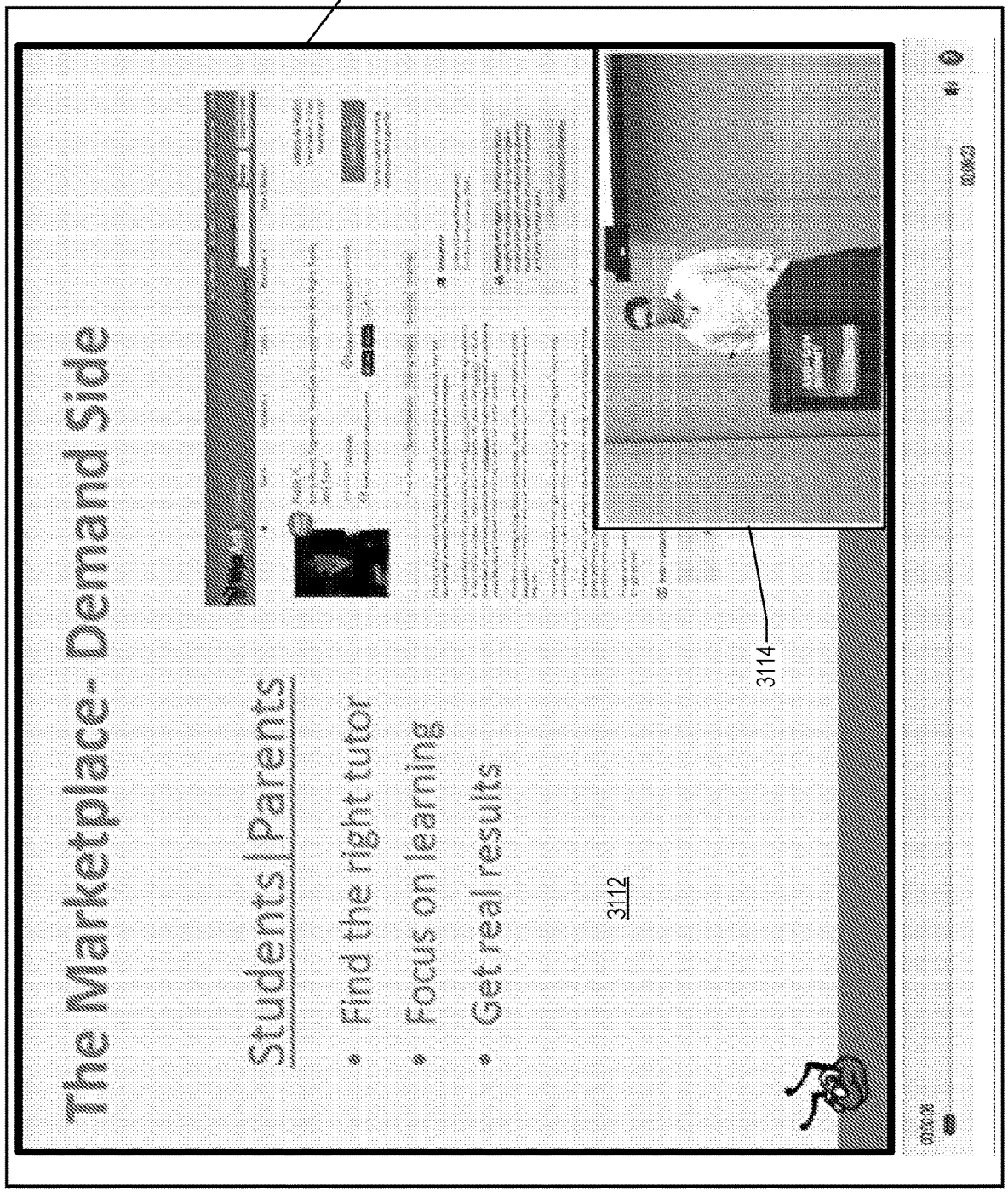

Lecture Style (includes visual Presenter). For example:
An educational video presentation in which a Presenter is standing in front of a physical whiteboard (see, e.g., FIGS. 14, 15). In order to write presentation notes during such presentations, the Presenter must turn his or her back to the viewer/camera (e.g., as illustrated in FIG. 14), obstructing the board and breaking eye contact with viewer/camera, often when vital instruction is taking place.
An educational video presentation in which a video display of the Presenter is shown in a separate box or window, which is embedded into the educational video presentation. In some embodiments the Presenter window may be displayed adjacent to a document display window of the educational video presentation (e.g., as illustrated in FIG. 30). In other embodiments, a rectangular Presenter window may be superimposed (e.g., using conventional Picture-in-Picture techniques) over a portion of the document display window, thereby obscuring portions of the document display window to the viewer (e.g., as illustrated in FIG. 31).

Figure 15:
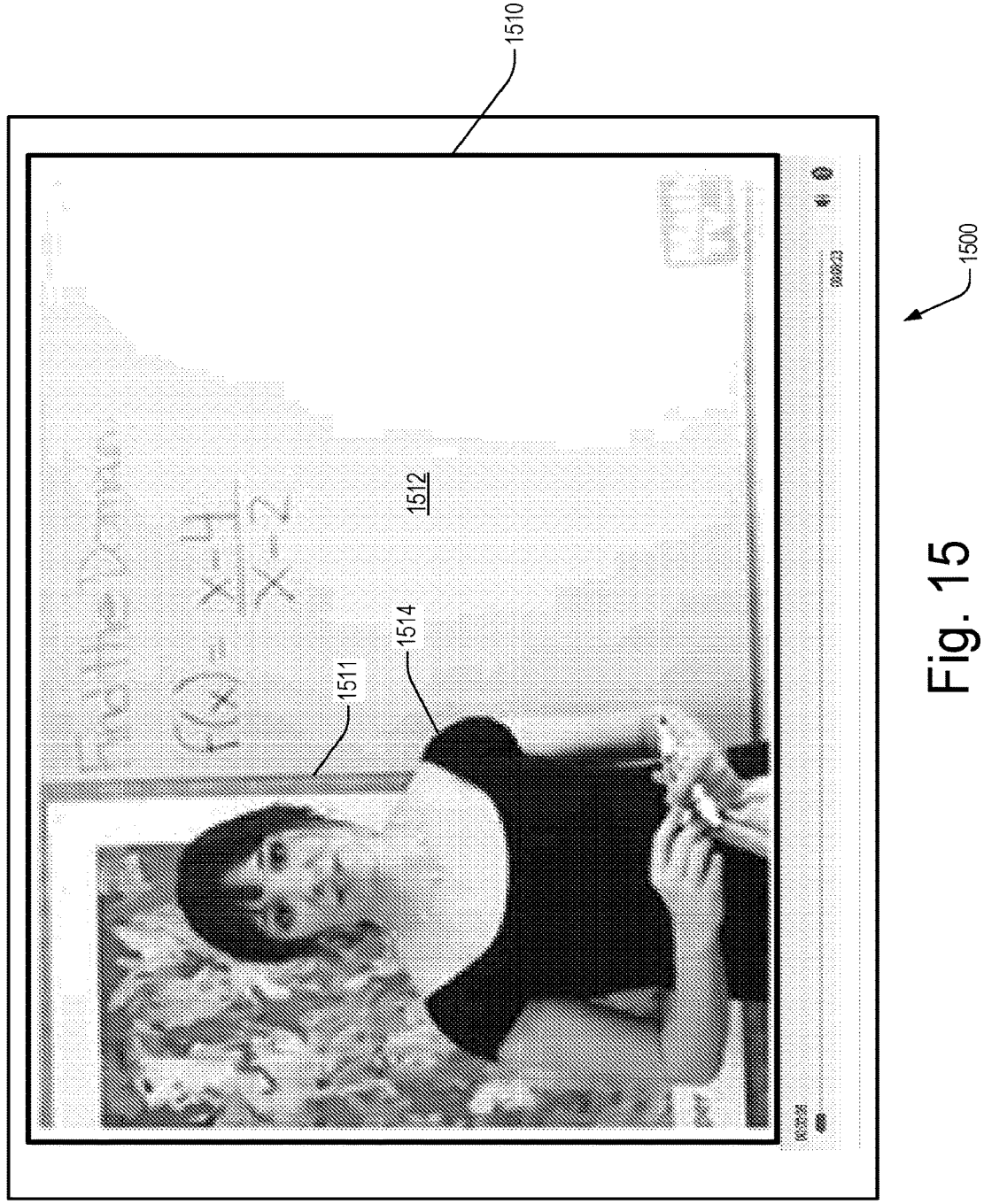

As illustrated in the example educational video presentation screenshot of FIG. 15, the Presenter 1514 is standing in front of a whiteboard 1512, and distracting, non-relevant background (e.g., the poster) is visible to the viewer. Note the distracting and unnecessary background behind the Presenter. Additionally, in the example educational video presentation of FIG. 15, the Presenter needs to turn her back to viewers when writing notes on the background whiteboard 1512. In contrast, at least some of the video presentation and digital compositing techniques described herein may be configured or designed to distill both video feed sources (e.g., background whiteboard presentation video feed and Presenter video feed) such that only the most essential part of each source video feed is displayed (e.g., a Chroma key composited video feed of the Presenter is presented over the displayed presentation whiteboard content in a manner which reduces and/or eliminates display of unwanted background distractions/images/content).

In the example educational video presentation screenshot of FIG. 14, the Presenter 1414 is standing in front of a physical whiteboard 1412. In order to write presentation notes during video presentations, the Presenter 1414 must turn her back to the viewer/camera, obstructing portions of the whiteboard 1412, and breaking eye contact with viewer/camera. Additionally, there is no way for Presenter to change the background (e.g., it is always the whiteboard). In contrast, using the video presentation and digital compositing techniques described herein, the Presenter is able to write presentation notes (e.g., in real-time) without having to turn his or her back to the camera/viewers, and is also able to dynamically change (e.g., in real-time) the background graphics/content without breaking eye contact with the camera or moving off screen.

In some educational video presentation embodiments, a transparent layer of glass may be interposed between the Presenter and the camera and used by the Presenter to write notes during the presentation, which are viewable to the user. While this may help mitigate the need for the Presenter to turn his/her back to the camera when writing notes, the visual effect (e.g., from the perspective of the viewer) may be somewhat undesirable for various reasons. For example, the presentation notes are displayed in front of the Presenter, thereby obscuring visibility of the Presenter. The glare of the glass may also be detrimental to the viewability of a given problem. Additionally, this type of presentation technique requires additional processing procedures to be implemented (e.g., in non-real time) to cause the presentation notes to appear properly to the viewer (e.g., without the use of such additional processing procedures, the presentation notes/characters would appear backwards or reversed to the viewer). For example, in many such educational video presentation embodiments, the instructor is not performing the presentation note writing in real-time. Rather, someone else (other than the Presenter) typically performs the presentation note writing in non-real time, during post video editing operations. In contrast, the video presentation and digital compositing techniques described herein enable a single person (e.g., the Presenter) to conduct the video presentation and note writing in real-time, without requiring post-production editing operations to be performed.

FIGS. 30 and 31 show example screenshots of other types of conventional educational video presentation display techniques in which a video display of the Presenter is shown in a separate box or window, which is embedded into the educational video presentation. For example, as illustrated in the example embodiment of FIG. 30, the Presenter window 3014 may be displayed adjacent to a document display window 3012 of the educational video presentation 3010. This configuration may be undesirable as it typically requires viewers to simultaneously view two different windows (e.g., 3012, 3014) in order to view the video presentation while reducing the size of both video feeds, thereby making viewing more difficult on a standard size computer screen. Alternatively, as illustrated in the example embodiment of FIG. 31, a rectangular Presenter window 3114 may be superimposed (e.g., using conventional Picture-in-Picture techniques) over a portion of the document display window 3110, thereby obscuring portions of the document display content (e.g., 3112) to the viewer.

It is noted that none of the conventional educational video presentation display techniques is conducive to learning, particularly math-related learning. For example, in educational videos, providing math instruction via the documentary style, students may be required to view problems and equations (presented in the educational video) in order to follow along fully, and are therefore unable to simultaneously or concurrently observe the visual cues of the Presenter. Such issues are detrimental to the online learning experience, particularly in situations involving concepts that need to be illustrated in order to be understood and/or discussed.

In some embodiments, the video presentation technology of the Online Social Education System may be configured or designed to provide one or more of the following features, functions, benefits (or combinations thereof):

Ability to simultaneously watch video and post questions to Interactive Study Wall about the video (or segment or portion thereof).

Picture-In-Picture Video Presentation (e.g., 1164, FIG. 11) provides the ability for video Presenter (1164*a*) to maintain substantially continuous eye contact with camera/user, while concurrently or simultaneously providing the ability for the viewer to observe the Presenter's written notes, comments, etc. (e.g., via whiteboard presentation portion 1162).

Online Social Education System PIP functionality preserves eye contact in videos.

Eye Contact is a way to create increased trust and confidence for students, through the use of maintaining eye contact throughout a video.

Eye Contact also allows students to pick up on physical cues or for instructor to use physical gestures to illustrate a concept.

Online Social Education System PIP functionality allows for best of both worlds: students can see problem as instructor is working out/describing problems, while receiving visual cues and support from teacher on side of screen.

In some embodiments, the Online Social Education System PIP feature may be presented as an overlay layer over the whiteboard background 1162. Users/viewers may be provided with capability of dynamically moving the PIP Presenter Box 1164 (within the GUI) in order to view any whiteboard content which may have been obscured by the PIP Presenter Box 1164.

In some embodiments, the Online Social Education System PIP feature may provide users/viewers with the ability to selectively toggle to full-face screen (of the Presenter 1164*a*) as needed or desired.

Using the Online Social Education System PIP functionality, the Presenter 1164*a* may maintain continuous eye contact with the camera, and does not need to turn his back to the camera to write on the notes (1162), which is displayed behind the Presenter. The Presenter is able to write on the notes, which is captured by an overhead camera, then displayed to a monitor screen in the eye-line of the Presenter and in line with the face-capturing video camera Thus, the Presenter can look directly ahead to write on the notes. This gives the effect of the Presenter looking directly at the audience when he is writing.

In at least one embodiment, the Online Social Education System may be configured or designed to implement a video presentation technique in which the notes is displayed behind the speaker concurrently while the speaker maintains continuous eye contact with the camera/viewer (e.g., via the PIP Presenter Box 1164).

In one embodiment, one person (e.g., the Presenter) maintains the eye contact with the camera while presenting the subject matter, and writing notes in the video tutorial. In such embodiments, the video may be entirely self-directed with no post-editing needed. In at least some embodiments, the Presenter's notes may be simultaneously or concurrently displayed in whiteboard background 1162 while the Presenter is presenting the material to the viewer via PIP Presenter Box 1164. In some embodiments, in order to enable the Presenter to maintain substantially continuous eye contact with the camera, a separate monitor may be placed adjacent to the recording video camera, and may be configured to display (e.g., to the Presenter, during the presentation, and in real-time) the content of the whiteboard background 1162. This allows the Presenter to take notes without ever looking down at notes.

In some embodiments, a single person (e.g., the Presenter) may perform a live video presentation (e.g., in real-time), concurrently handling both the (human) Presenter video-feed portion of presentation, and the notes/whiteboard video-feed portion of the presentation. In other embodiments, 2 (or more) people may be used to perform a live video presentation (which may be recorded and displayed as an Interactive Study Wall video tutorial)—one person being the primary Presenter (in the video), and the other person (e.g., not shown in the video) being in charge of writing the notes/annotations, etc. which are displayed on the projection behind the Presenter.

FIGS. 16A-E illustrate example screenshots of various GUIs which may be used for facilitating activities relating to one or more of the video presentation and digital compositing aspects disclosed herein.

Figure 16A:
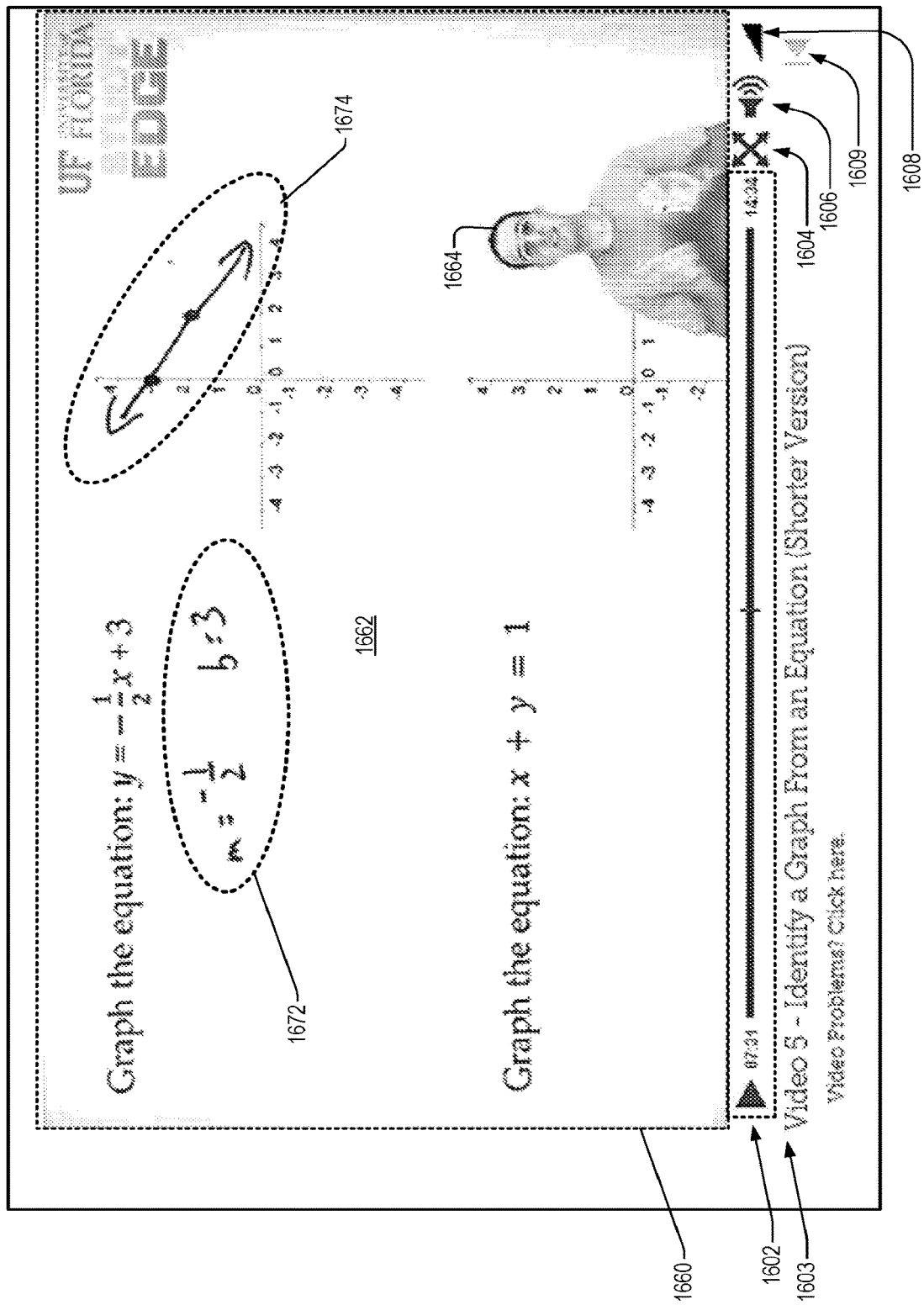
Figure 16B:
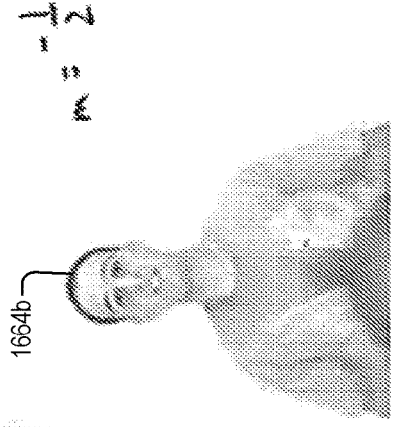

FIG. 16A shows an example screenshot of a Video Presentation GUI 1600 in accordance with a specific embodiment. As illustrated in the example embodiment of FIG. 16, the Video Presentation GUI 1601 may include, but are not limited to, one or more of the following (or combinations thereof):

Presentation GUI portion 1660, which may be configured or designed to display one or more educational/tutorial videos relating to specific subject matter selected by the user (e.g., "Identify A Graph From An Equation"). As illustrated in the example embodiment of FIG. 16A, the Presentation GUI portion 1660 may be configured or designed to concurrently display presentation whiteboards, notes, and/or other presentation content (e.g., 1662), and video feed(s) (e.g., 1664) of the person (e.g., Presenter) who is leading, delivering or presenting the video presentation.

Video playback/control GUI portion 1602.

Presentation title (1603).

Text description of the video presentation.

Transcript of the audio portion of the video presentation.

Etc.

In at least some embodiments, the displayed image (e.g., 1664) associated with the Presenter video feed may be interchangeably referred to as the "Presenter video feed" or "Presenter image". In at least some embodiments, the displayed presentation content 1662 (such as, for example, PowerPoint slides, electronic whiteboard(s), images of a physical documents, iPad/tablet displays, graphics, etc.) associated with the presentation content video feed may be interchangeably referred to as "presentation content" or "whiteboard content" or "presentation whiteboard content" or "notes/document/annotation content".

As illustrated in the example embodiment of FIG. 16A, the Presentation GUI portion 1660 may be configured or designed to be displayed as a "picture-in-picture" (PiP) video presentation, which, for example, may collectively and simultaneously display: (i) a video feed of the Presenter (1664), and (ii) a video feed of related presentation content (e.g., whiteboard content 1662), which, for example, may be synchronized with the Presenter video feed. According to different embodiments, examples of the different types of content which may be displayed as part of the presentation content video feed may include, but is not limited to, one or more of the following (or combinations thereof):

manual/hand drawn notes;
whiteboard canvas(es);
annotations;
text;
animations;
pictures, images or other graphical content;
videos;
spreadsheets;
documents/content generated by computer software (such as, for example, Microsoft Word, Microsoft Power Point, etc.);
etc.

In some embodiments, a Chroma key compositing technique may be employed to cause the video feed of the Presenter (1664) to be displayed (e.g., via an overlay layer) over (or in front of) the displayed video presentation notes/whiteboard feed (e.g., as illustrated in FIG. 16A).

Unlike conventional video presentation techniques, the displayed presentation content (whether it be a PowerPoint slide, an electronic whiteboard, an image of a physical document, an iPad display, graphics, etc.) is not projected onto a screen behind the Presenter, but rather, is presented via separate display layer (e.g., in real-time), concurrently with the display of the Presenter video feed.

For example, as illustrated in the example embodiment of FIG. 16A, the Presenter video feed 1664 is overlaid or superimposed (e.g., via a separate overlay layer) over the displayed presentation content portion 1662. Additionally, as illustrated in the example embodiment of FIG. 16A, a Chroma key compositing technique is used to enable the Presenter video feed 1664 to display only the superimposed image of the Presenter, without displaying any of the background scene (e.g. background scene behind the Presenter), and without displaying any other distracting images, objects or other content. In this way, the video presentation and digital compositing techniques described herein provide the benefit of significantly reducing or eliminating the "visual clutter" and unpleasant contrast, which typically accompanies conventional picture-in-picture displays.

In some embodiments, the video feed of the Presenter (1664) may be configured or designed to be displayed (e.g., at the end user's system) via an overlay layer (or overlay window) (e.g., 1664), which is dynamically adjustable (e.g., by the end user) in size, position, transparency, etc. For example, as illustrated in the example embodiment of FIG. 16B, the user may select and move the Presenter image 1664b to a new desired location within the Video Presentation GUI portion 1660, and may also resize the Presenter image to make it larger or smaller. In at least some embodiments, such operations may be performed during active playback or streaming of the video presentation.

Figure 16C:
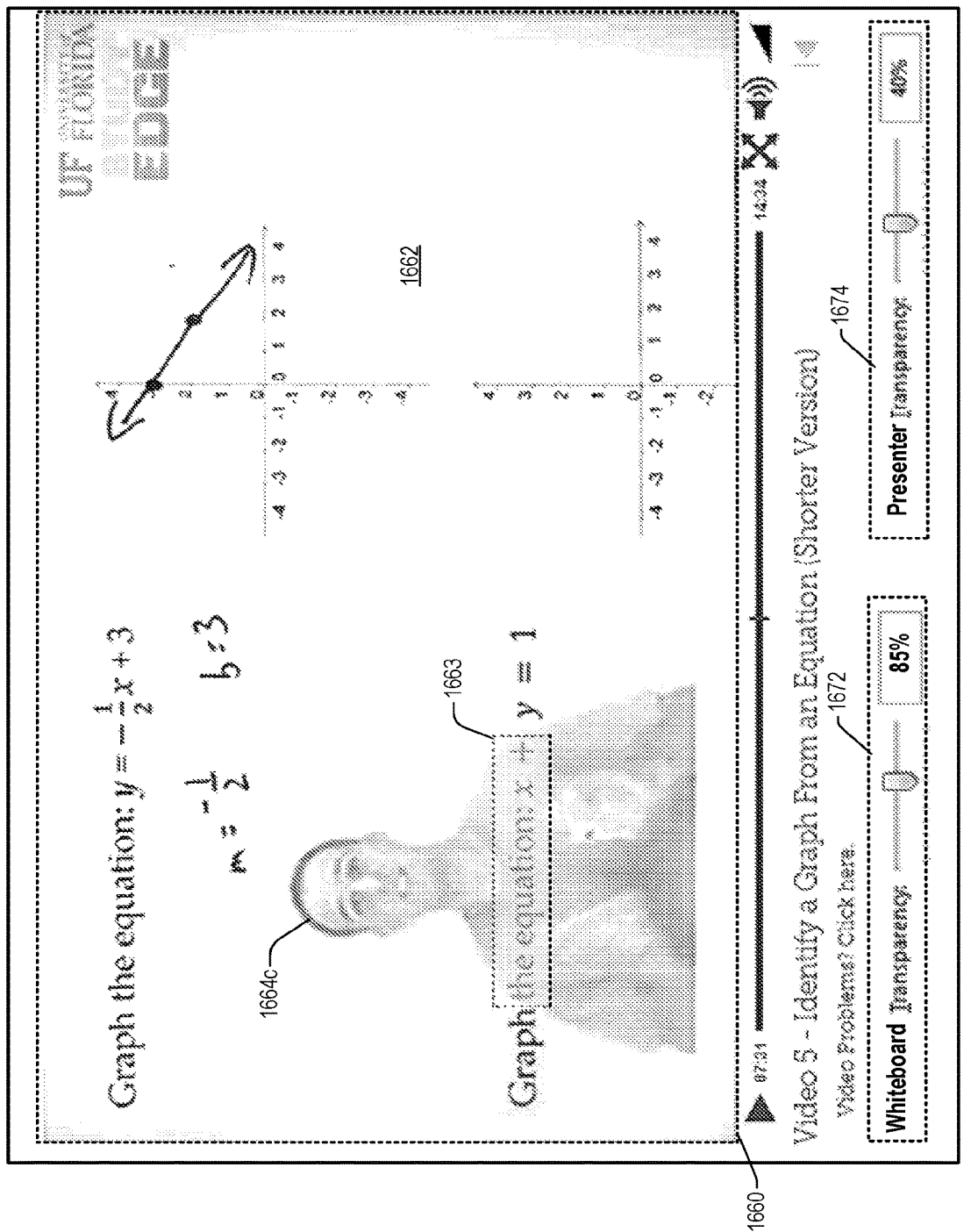

As illustrated in the example embodiment of FIG. 16C, the Video Presentation GUI may be configured or designed to include functionality for enabling the user to dynamically and selectively adjust the amount of transparency of the displayed Presenter video feed (e.g., 1664c) and/or the displayed presentation content feed (e.g., whiteboard content 1662). In some embodiments, separate controls (e.g., 1672, 1674) may be provided for enabling a user to separately and independently adjust the transparency characteristics of the displayed Presenter video feed (e.g., 1664c) and/or the displayed presentation content feed (1662). In some embodiments, functionality may be provided for enabling a user to dynamically adjust the transparency characteristics of any overlapped regions (e.g., 1663) between the displayed Presenter video feed (e.g., 1664c) and the displayed presentation content (1662). For example, as illustrated in the example embodiment of FIG. 16C, region 1663 represents one such portion of overlapped region. In at least one embodiment, the Video Presentation System may be configured or designed to detect and identify region(s) of overlap (e.g., 1663) between the displayed Presenter video feed and displayed textual or graphical content of the presentation whiteboard feed, and in response, may automatically and dynamically adjust the transparency characteristics of either (or both feeds) in order to content from both feeds to be simultaneously visible within the overlap region, and to prevent the content from one feed of securing the visible content from the other feed (as illustrated, for example, at 1663).

In some embodiments, as illustrated in the example embodiment of FIG. 16D, the Video Presentation GUI may be configured or designed to resize (e.g., reduce and/or enlarge) the video presentation display window 1660*d*, and to enable the displayed content from the Presenter video feed (1664*d*) and/or the presentation whiteboard feed (1662*d*) to be moved to desired positions/locations within the resized video presentation display window 1660*d*.

Figure 16E:
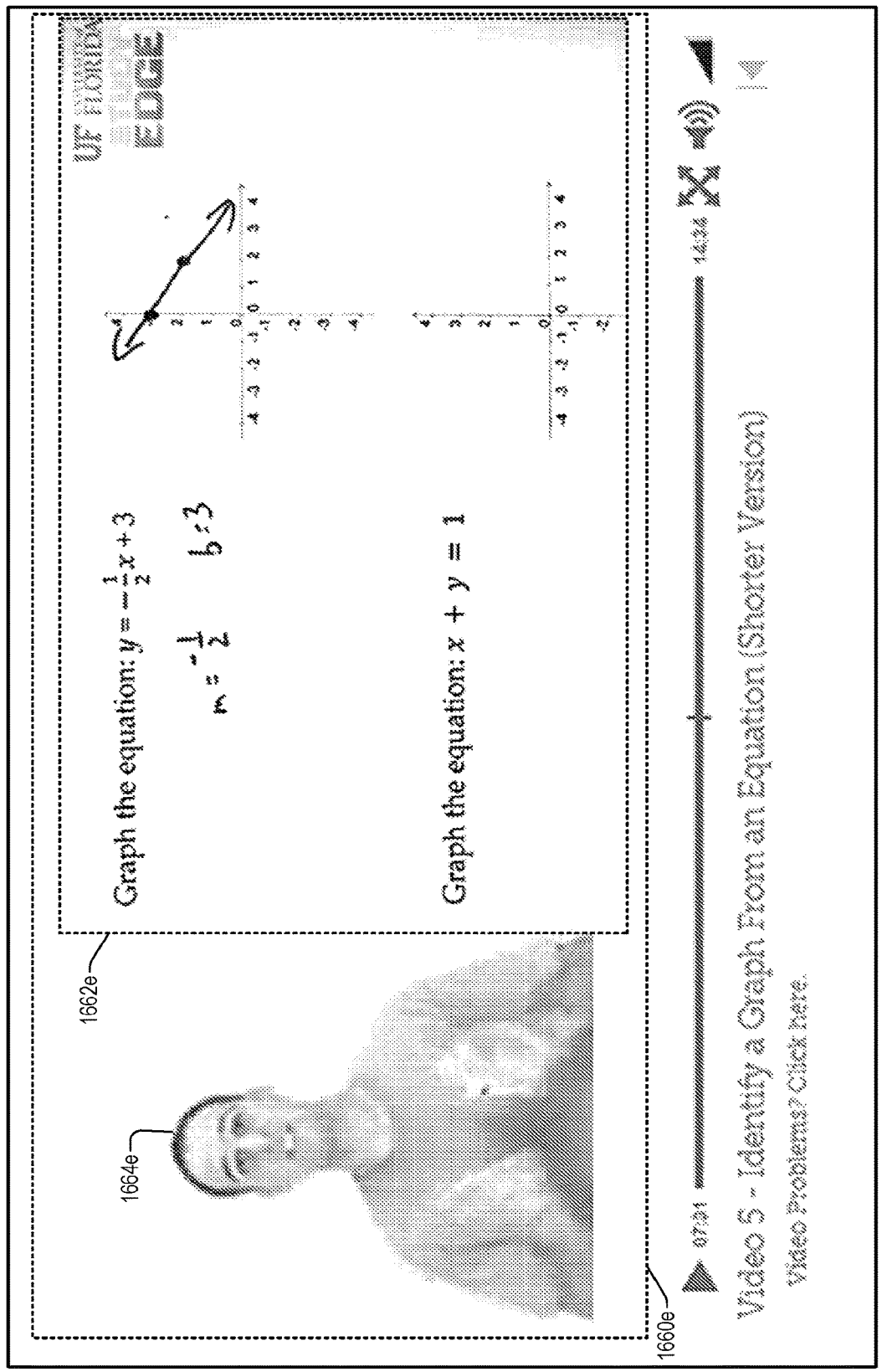

In some embodiments, as illustrated in the example embodiment of FIG. 16E, the Video Presentation GUI may be configured or designed to resize (e.g., reduce and/or enlarge):

the video presentation display window 1660*e*,
the Presenter video feed (1664*e*) region; and/or
the presentation whiteboard feed (1662*e*) region.

Additionally, the Video Presentation GUI may be configured or designed to enable the Presenter video feed (1664*e*) region and/or the presentation whiteboard feed (1662*e*) region to be moved to desired positions/locations within the resized video presentation display window 1660*e*.

FIGS. 17-25 illustrate different example components and configurations, which may be utilized for implementing one or more of the video presentation and digital compositing aspects disclosed herein.

Figure 17:
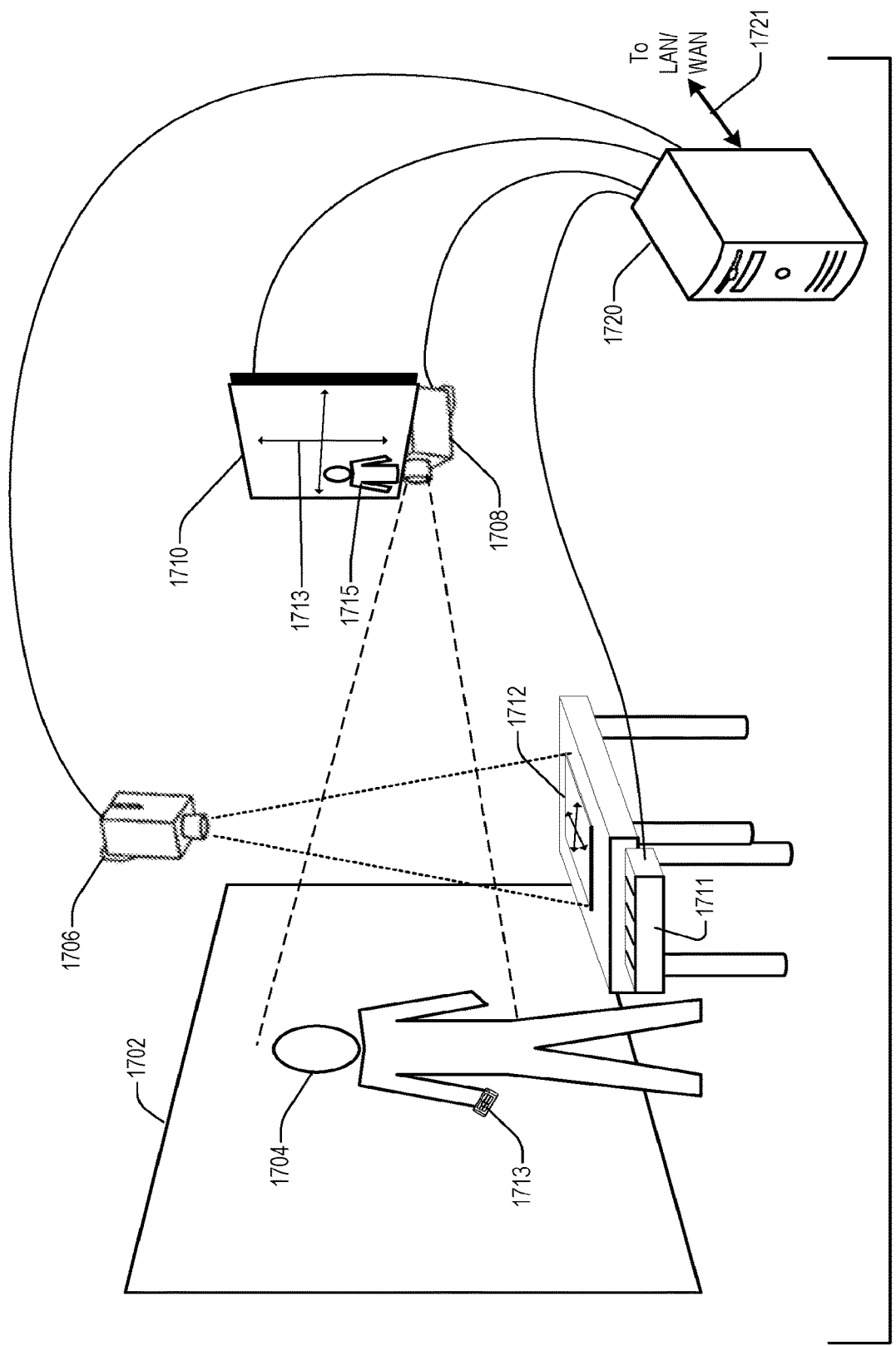
FIGS. 17-25 illustrate different example components and configurations, which may be utilized for implementing one or more of the video presentation and digital compositing aspects disclosed herein.

FIG. 17 shows an example embodiment of a system configuration 1700 which may be used for conducting and/or recording a video presentation session. As illustrated in the example embodiment of FIG. 17, the Presenter 1704 is physically positioned in front of the green screen background, so as to facilitate the use Chroma key compositing techniques for compositing (layering) the Presenter video feed and the presentation whiteboard video feed.

In at least one embodiment, the recording of the video presentation (including both the Presenter video feed, and the presentation whiteboard video feed) may occur entirely synchronously and in real-time, with no post editing needed. For example, in one embodiment, as the Presenter stands in front of the green screen 1702, he can see the presentation whiteboard video feed displayed on the Confidence Monitor 1710. However, unlike conventional teleprompters, (which only displays a text transcription of the Presenter's audio dialog), the Presenter may configure the Confidence Monitor (e.g., via remote controller 1711) to display a digitally composite video feed of the Presenter video feed and presentation whiteboard video feed (e.g., as illustrated in the example embodiment of FIG. 25). In this way, the Presenter is able to observe (e.g., in real-time) the composite video feed showing his image overlaid in front of the presentation whiteboard content (e.g., as the video presentation may appear to end users), and is able to angle his body movement(s) accordingly for interacting with portions (e.g., graphs, text, images, etc.) of the displayed presentation whiteboard content.

In at least one embodiment, the remote controller unit (e.g., 1711) may be located within easy reach of the Presenter (e.g., but not within view of Camera 1 or Camera 2), to enable the Presenter to selectively and dynamically change (e.g., in real-time) the presentation background (e.g., displayed in the composite presentation video feed) between whiteboard, notes, graphics, animations, slide presentation, etc., and in a seamless manner (e.g., without the Presenter having to change his position or noticeably move).

As illustrated in the example embodiment of FIG. 17, the video presentation system configuration 1700 may include, but are not limited to, one or more of the following feature(s)/component(s) (or combinations thereof):

Green screen background 1702 (or other color background, which is compatible for use with Chroma key compositing).

A first video recording device (e.g., Camera 1, 1708), which may be used to capture and generate a video feed of the Presenter 1704.

A second video recording device (e.g., Camera 2, 1706), which may be used to capture and generate a video feed of the presentation whiteboard (1712), notes, annotations, documents, etc.

A video recording/presentation server (e.g., 1720), which, for example, may be configured or designed to:

Record (e.g., in real-time) the Presenter video feed.

Record (e.g., in real-time) the presentation whiteboard video feed.

Perform (e.g., in real-time) Chroma key compositing operations for compositing the Presenter video feed and the presentation whiteboard video feed.

Generate (e.g., in real-time) display output for displaying (or streaming) the Presenter video feed, the presentation whiteboard video feed, and/or composite video feeds.

Etc.

Figure 23:
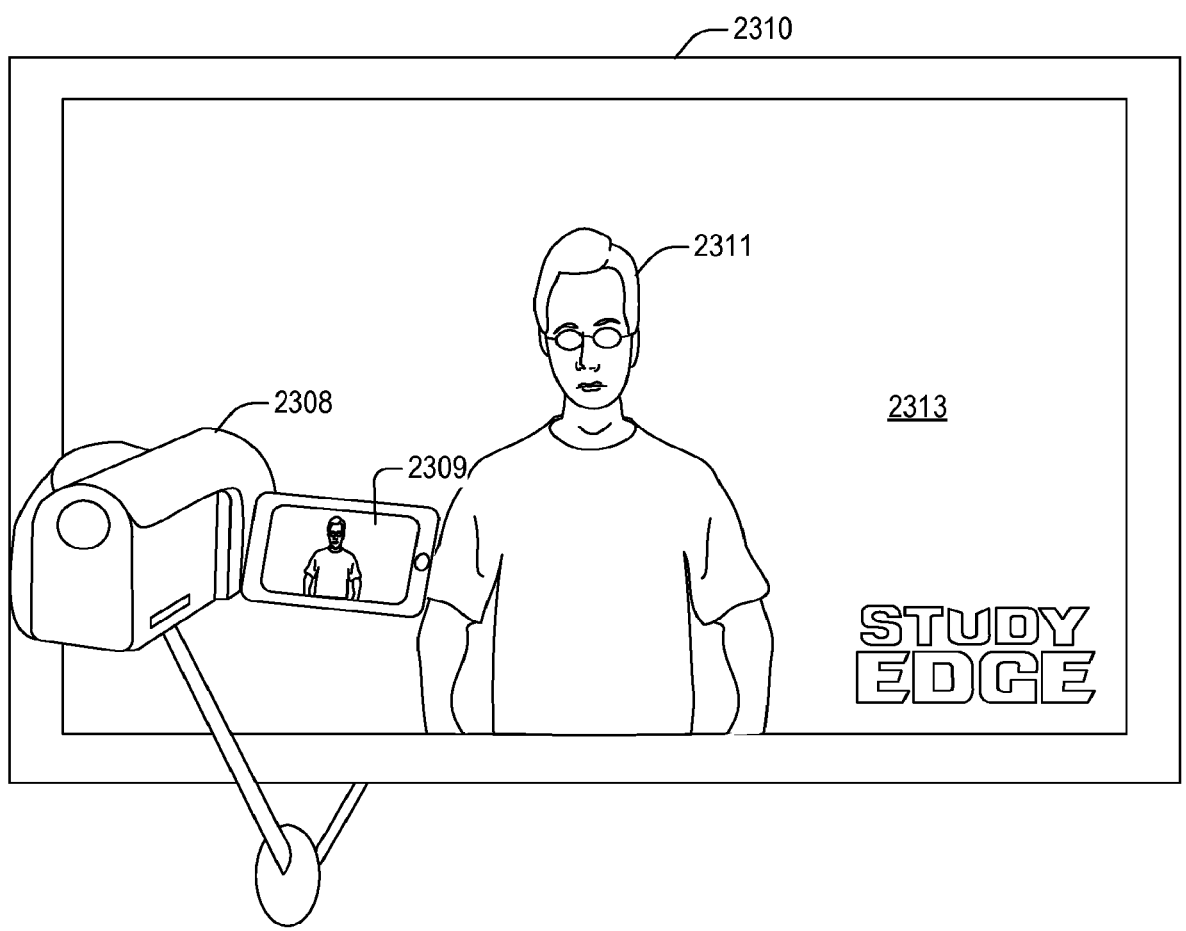
Figure 24:
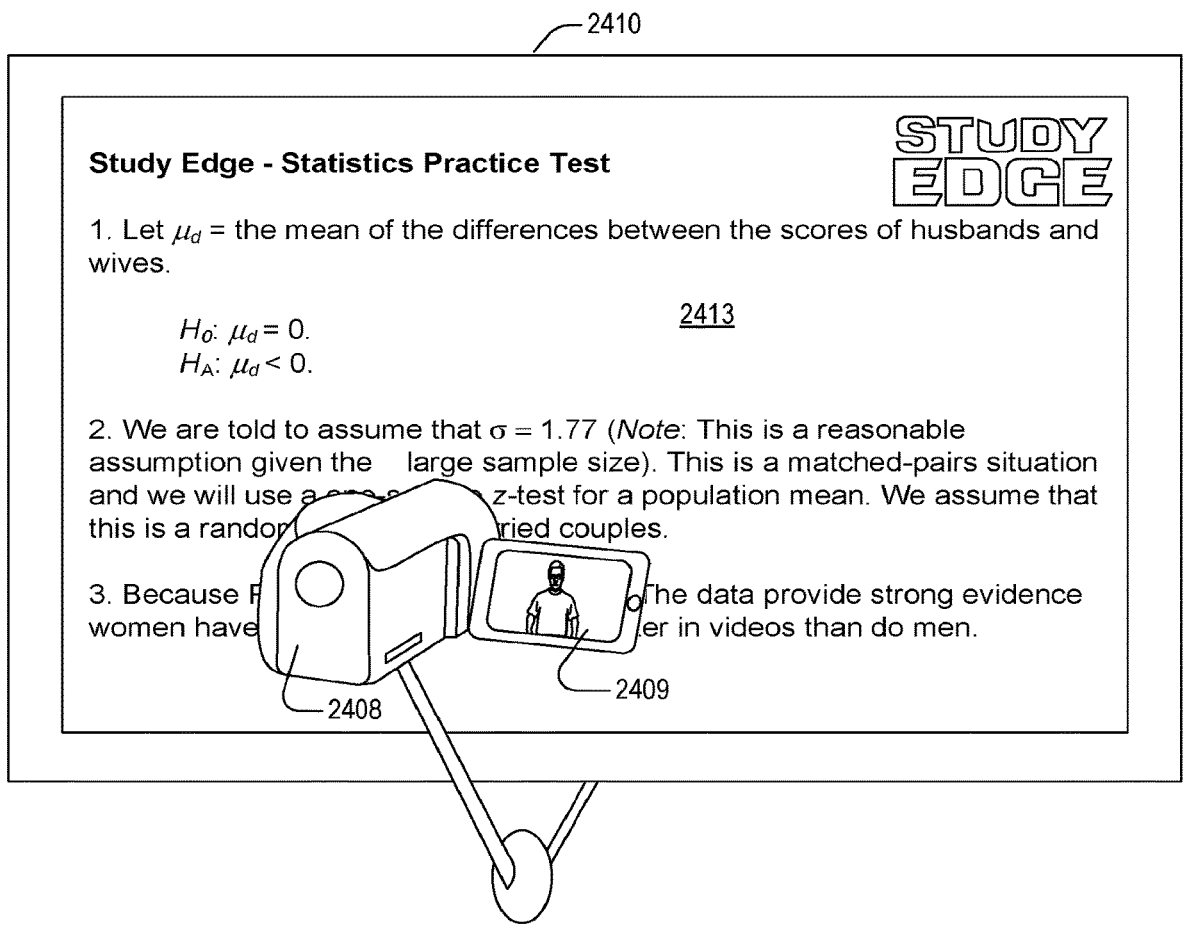
Figure 25:
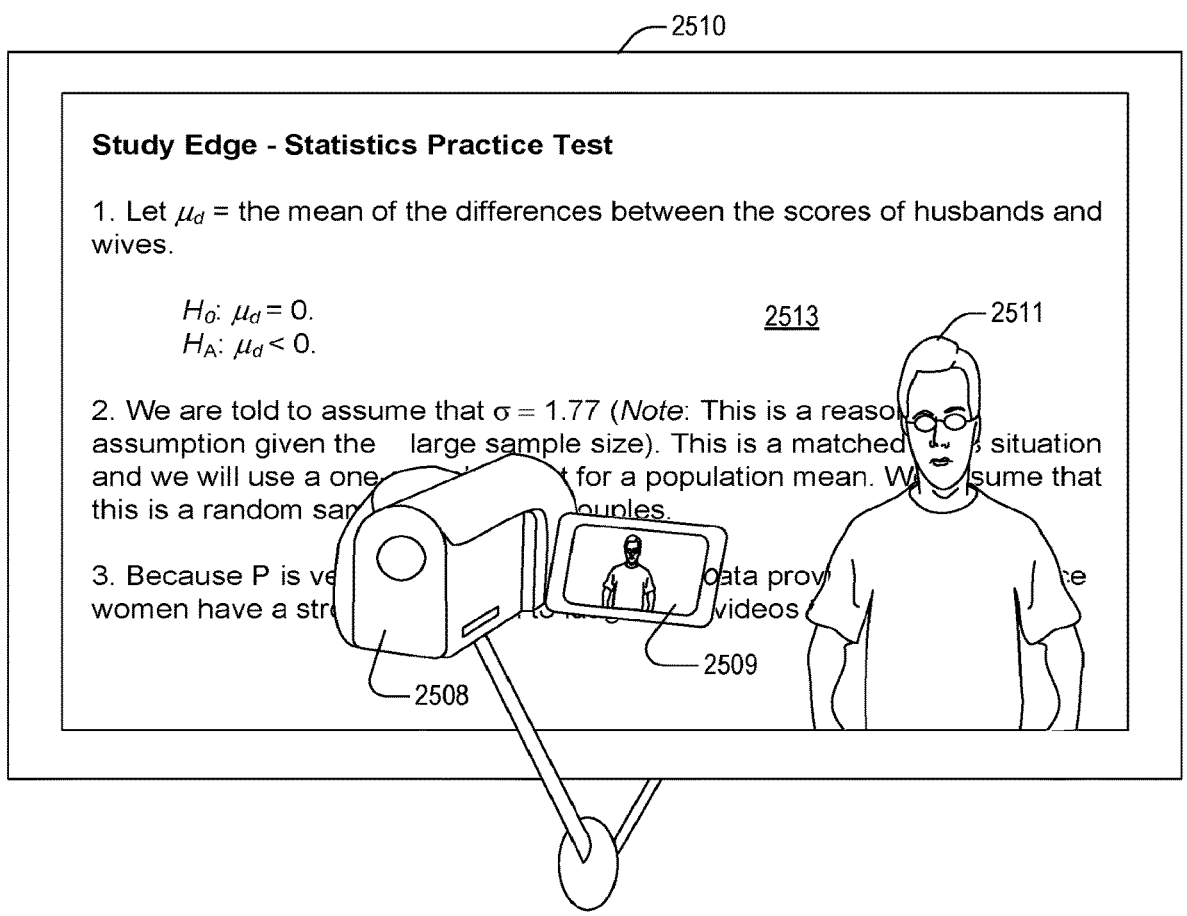

Confidence Monitor (e.g., 1710). In at least one embodiment, the Confidence Monitor may be viewable to the Presenter during the recording of the video presentation, and may be positioned adjacent to (or directly behind) Camera 1, in order to facilitate the Presenter maintaining eye contact with Camera 1. In at least some embodiments, the Confidence Monitor may be configured or designed to display a variety of content such as, for example, one or more of the following (or concurrent combinations thereof):

the Presenter video feed (as illustrated for example, in FIG. 23 (e.g., 2311, 2309), and FIG. 25 (e.g., 2509, 2511));

the presentation whiteboard video feed (as illustrated for example, in FIG. 24 (e.g., 2413), and FIG. 25 (e.g., 2513));

one or more digitally composite video feed(s) of the Presenter video feed and presentation whiteboard video feed (as illustrated, for example, in FIG. 25 (e.g., 2511, 2513));

and/or other content.

In some embodiments (e.g., as illustrated in FIG. 25) the Presenter may dynamically configure the Confidence Monitor to selectively display (e.g., in real-time) the presentation whiteboard content (e.g., 2513) (e.g., which may be implemented using paper, PowerPoint, graphics, etc.) as well as the Presenter video feed (e.g. 2511). This display configuration enables the Presenter to maintain eye contact with the viewer/camera, while simultaneously enabling the Presenter to view his image relative to the presentation whiteboard content, allowing the Presenter to point to desired portions of the presentation whiteboard content (e.g., based on what the Presenter desires to emphasize in real time).

A remote controller 1711, which, for example, may be configured or designed to include functionality for enabling the Presenter to initiate or perform (e.g., in real-time) a variety of operations relating to the video presentation such as, for example, one or more of the following (or combinations thereof):

control recording and playback of the video presentation;

causing the Confidence Monitor to display (or not display) the Presenter video feed;

causing the Confidence Monitor to display (or not display) the presentation whiteboard video feed;

causing the Confidence Monitor to display one or more digitally composite video feed(s) of the Presenter video feed and presentation whiteboard video feed;

causing the streamed output video feed of the video presentation to display (or not display) the Presenter video feed;

causing the streamed output video feed of the video presentation to display (or not display) the presentation whiteboard video feed;

causing the streamed output video feed of the video presentation to display a digitally composite video feed of the Presenter video feed and presentation whiteboard video feed;

change the position of the PIP frame;

and/or other types of remotely controllable operations.

A Remote Annotation Device 1713, which, for example, may be configured or designed to include functionality for enabling the Presenter to selectively annotate (e.g., in real-time) portions of the displayed presentation whiteboard content without breaking eye contact with the Presenter camera (e.g., Camera 1). According to different embodiments, the remote annotation device may be implemented using a wireless device (such as, for example, a wireless mouse pointer, a smartphone, etc.), which includes functionality for tracking (e.g., in real-time) the Presenter's hand location and/or hand movements. In some embodiments, the remote annotation device may include one or more buttons which may be assigned different types of functionalities such as, for example, one or more of the following (or combinations thereof):

Annotate Enable/Disable button;

Undo button;

Clear Annotations Button;

Switch annotation color button;

Etc.

For example, in one embodiment, when the Presenter clicks on an "annotate enable" button on the remote annotation device, "annotation mode" is enabled, and visual annotations are created and displayed as part of the background presentation (or presentation notes) based on the Presenter's hand movements/gestures which occur while the annotate enable button is activated/depressed. In some embodiments, the Remote Annotation Device may be configured or designed to track the Presenter's hand movements/gestures, and wirelessly communicate the tracked hand movement/gesture information to the video recording server 1721 (or other computing device), which may then process and convert the tracked hand movement/gesture information into annotations which are displayed as presentation whiteboard annotations. Examples of video presentation whiteboard annotations which may be added by Presenter (e.g., via Remote Annotation Device 1713) are illustrated at 1672 and 1674 of FIG. 16A. In at least some embodiments, the presentation whiteboard annotations may be displayed to the Presenter (e.g., in real-time) via the Confidence Monitor 1710. In this way, the Presenter is able to insert (e.g., during the presentation and in real-time) presentation whiteboard annotations (and/or perform other whiteboard activities such as draw/manipulate text, graphics) via interaction with the Remote Annotation Device while simultaneously maintaining eye contact with the camera/viewer.

In other embodiments, the Remote Annotation Device may be implemented using an iPad, tablet, or other portable device which includes a touch screen, and which is configured or designed to enable the Presenter to insert (e.g., during the presentation and in real-time) presentation whiteboard annotations (and/or perform other whiteboard activities such as draw/manipulate text, graphics) via interaction with the Remote Annotation Device touch screen, and while simultaneously maintaining eye contact with the camera/viewer.

In some embodiments, using one or more of the video presentation and digital compositing techniques described herein, the Presenter may simply write on a piece of paper (e.g. write notes on a physical piece of paper or page with pen/marker/pencil), while simultaneously maintaining eye contact with the camera/viewer. According to different embodiments, the Presenter can also use the Remote Annotation Device (or other remote control device) to control presentation of text, graphics, images, etc.

In some embodiments, the video presentation and digital compositing system may include sensors (e.g., motion sensors, Xbox Kinect™ sensors, etc.) to monitor track, and interpret the Presenter's hand movements and/or gestures, and automatically implement one or more actions in response, such as, for example:

advance to next slide;

go back to previous slide;

display graphics;

insert annotations;

advance to next page;

go back to previous page;

pause slide presentation;

resume slide presentation;

display annotations;

hide annotations;

transition different components within a page;

etc.

Figure 18:
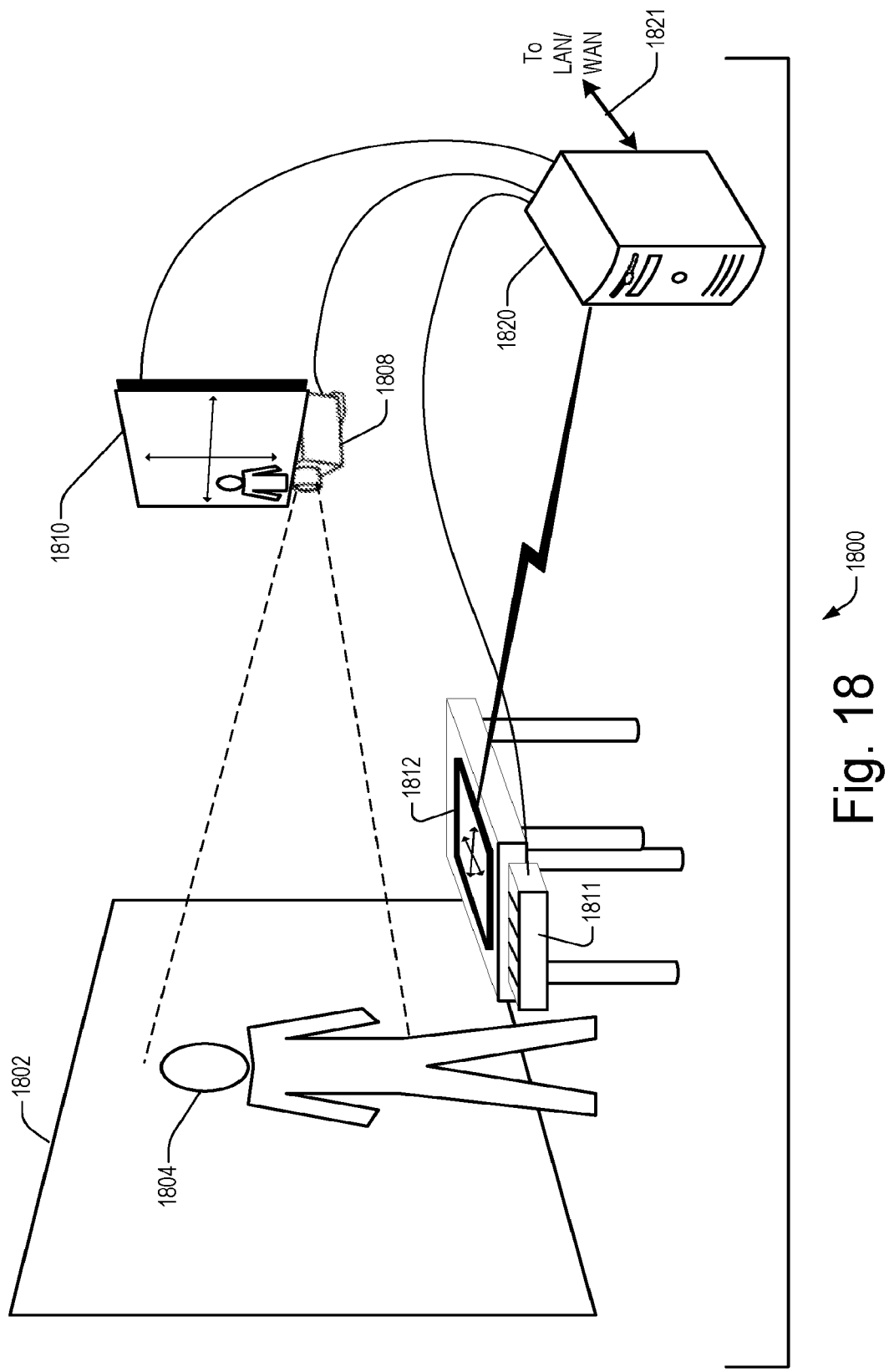

FIG. 18 shows an example embodiment of an alternate system configuration 1800 which may be used for conducting and/or recording a video presentation session. As illustrated in the example embodiment of FIG. 18, the Presenter 1804 is physically positioned in front of the green screen background 1802, so as to facilitate the use Chroma key compositing techniques for compositing (layering) the Presenter video feed and the presentation whiteboard video feed.

As illustrated in the example embodiment of FIG. 18, the video presentation system configuration 1800 may include, but are not limited to, one or more of the following feature(s)/component(s) (or combinations thereof):

Green screen background 1802 (or other color background, which is compatible for use with Chroma key compositing).

A first video recording device (e.g., Camera 1, 1808), which may be used to capture and generate a video feed of the Presenter 1804.

A video recording/presentation server (e.g., 1820) having functionality similar to that described in FIG. 17.

An electronic whiteboard 1812 (such as, for example, an iPad, computer tablet, smartphone, etc.), which may be configured or designed enable the Presenter to generate digital content (e.g., notes, annotations, images, text, documents, etc.) to be displayed as part of the presentation whiteboard feed. According to different embodiments, the electronic whiteboard may be configured or designed to communicate with the video recording/presentation server via wired and/or wireless interface(s).

Confidence Monitor (e.g., 1810) having functionality similar to that described in FIG. 17.

A remote controller 1811 having functionality similar to that described in FIG. 17.

A Remote Annotation Device having functionality similar to that described in FIG. 17.

Figure 19:
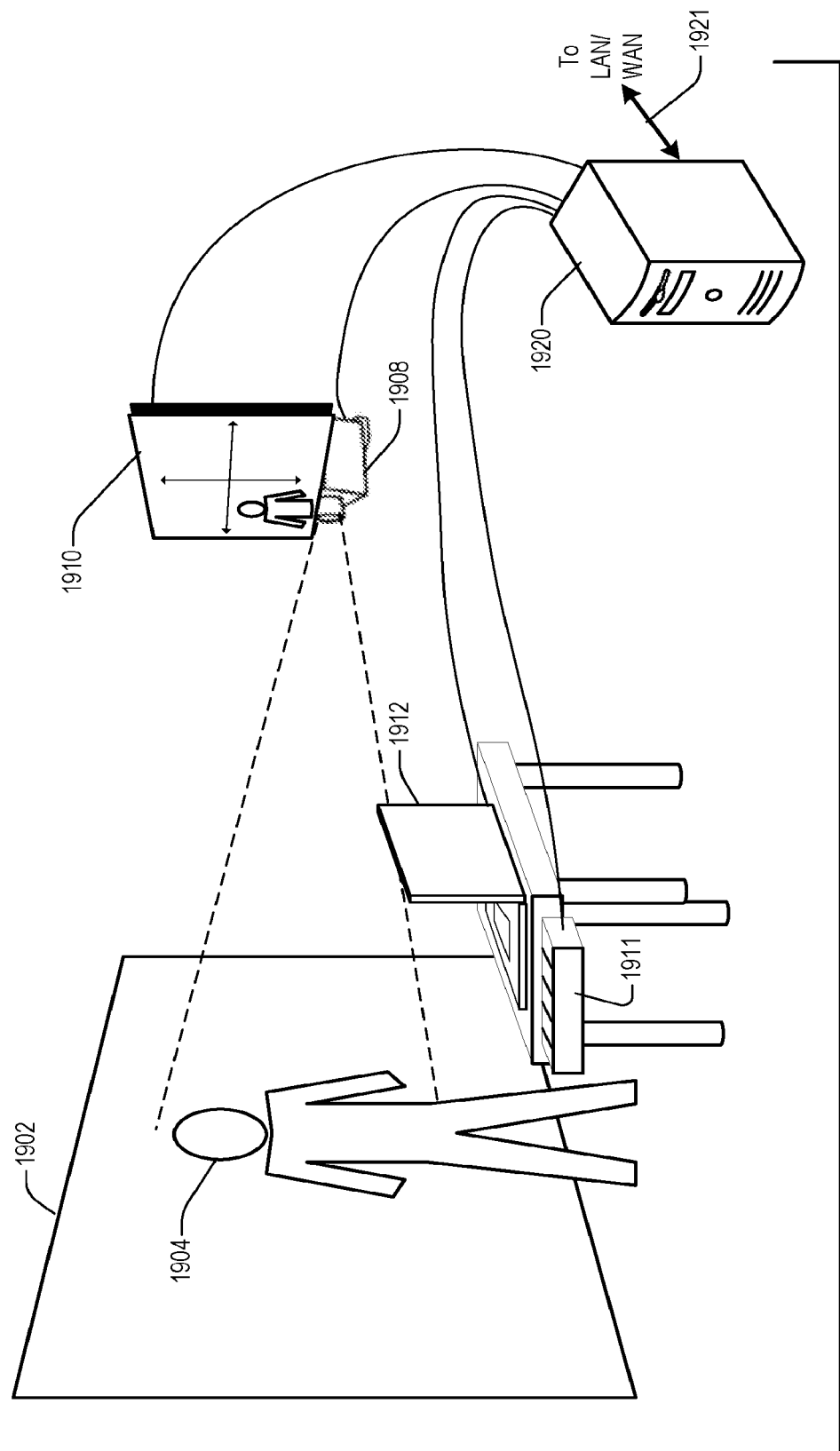

FIG. 19 shows an example embodiment of a system configuration 1900 which may be used for conducting and/or recording a video presentation session. As illustrated in the example embodiment of FIG. 19, the Presenter 1904 is physically positioned in front of the green screen background, so as to facilitate the use Chroma key compositing techniques for compositing (layering) the Presenter video feed and the presentation whiteboard video feed.

As illustrated in the example embodiment of FIG. 19, the video presentation system configuration 1900 may include, but are not limited to, one or more of the following feature(s)/component(s) (or combinations thereof):

Green screen background 1902 (or other color background, which is compatible for use with Chroma key compositing).

A first video recording device (e.g., Camera 1, 1908), which may be used to capture and generate a video feed of the Presenter 1904.

A video recording/presentation server (e.g., 1920) having functionality similar to that described in FIG. 17.

An electronic whiteboard 1912 (such as, for example, a notebook computer), which may be configured or designed enable the Presenter to generate digital content (e.g., notes, annotations, images, text, documents, slides, etc.) to be displayed as part of the presentation whiteboard feed. According to different embodiments, the electronic whiteboard may be configured or designed to communicate with the video recording/presentation server via wired and/or wireless interface(s).

Confidence Monitor (e.g., 1910) having functionality similar to that described in FIG. 17.

A remote controller 1911 having functionality similar to that described in FIG. 17.

A Remote Annotation Device having functionality similar to that described in FIG. 17.

FIGS. 20-25 illustrate various images of an example embodiment of a video presentation studio.

Figure 20:
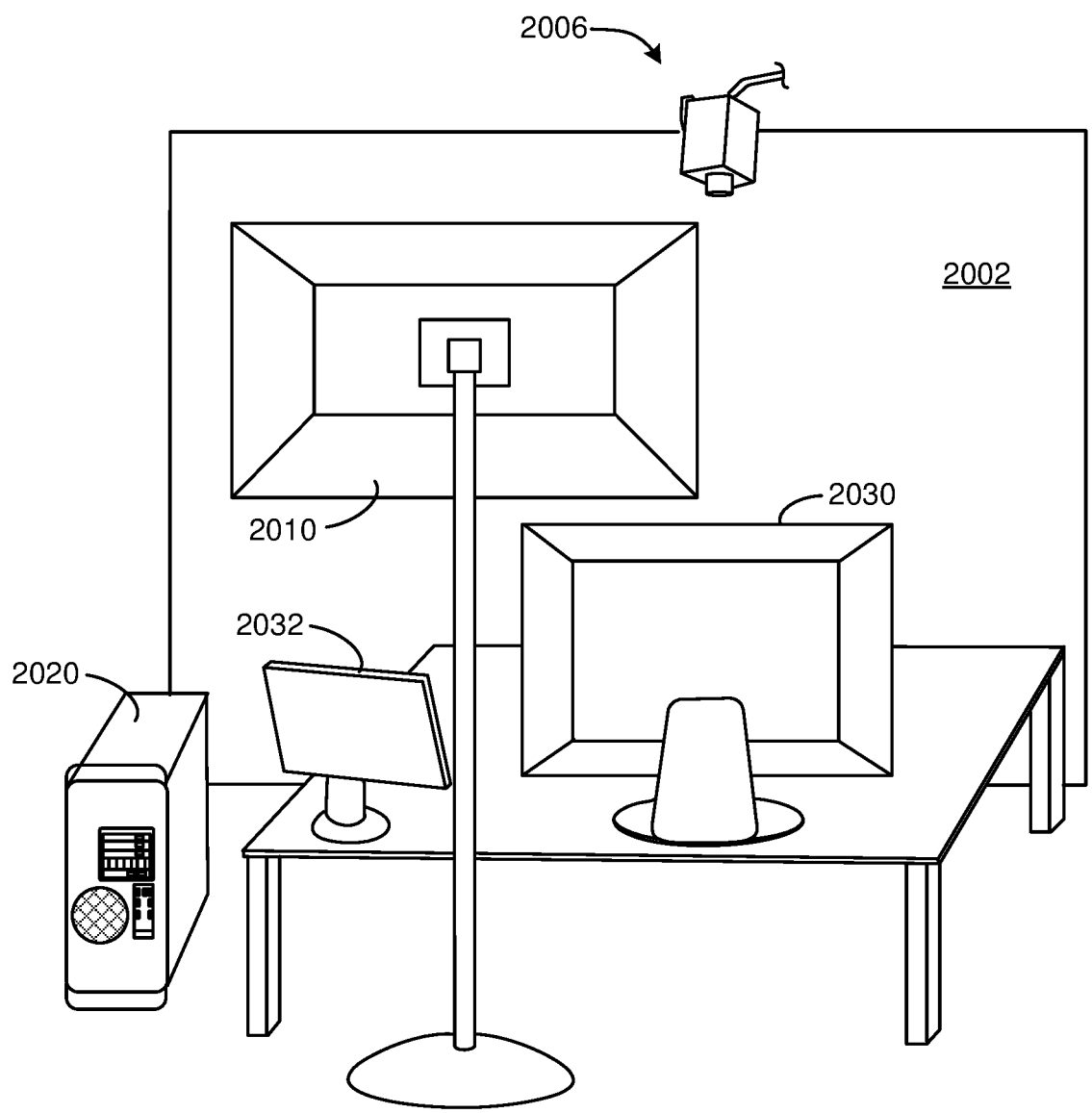

FIG. 20 shows a view of a portion of the video presentation studio as viewed from a position behind Confidence Monitor 2010.

Figure 21:
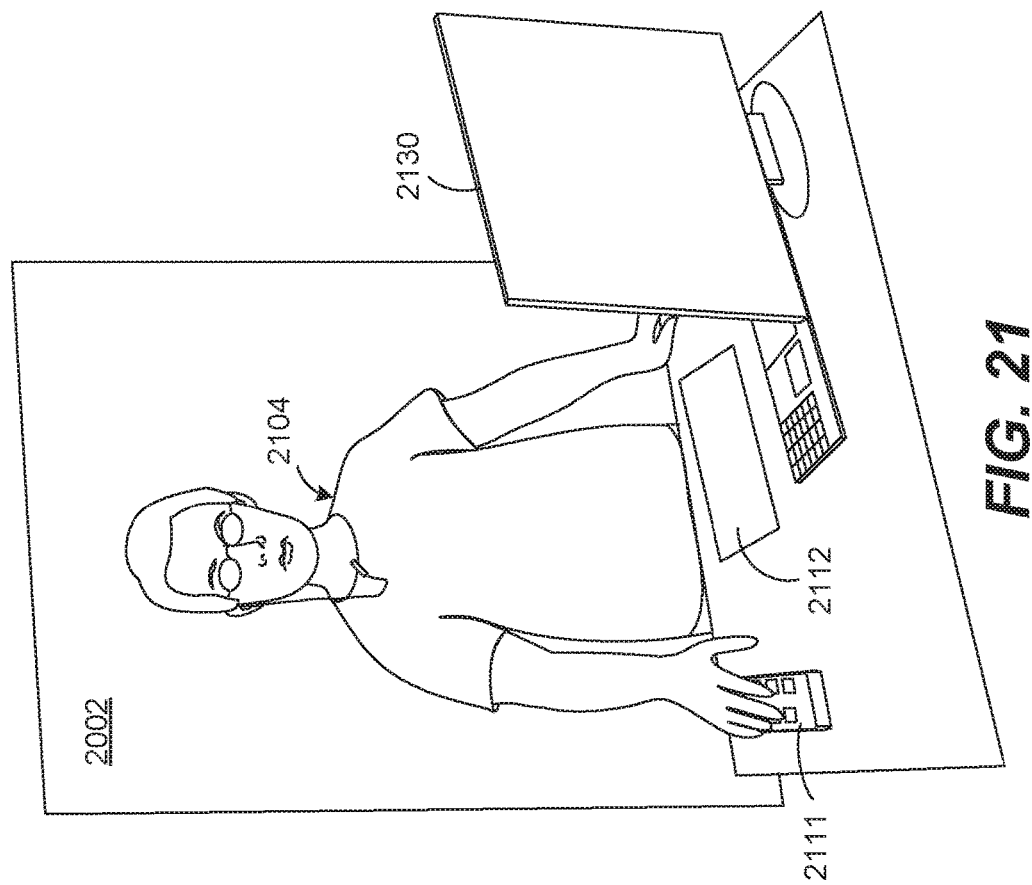

FIG. 21 shows a view of a portion of the video presentation studio as viewed from a position in front of the Confidence Monitor.

Figure 22:
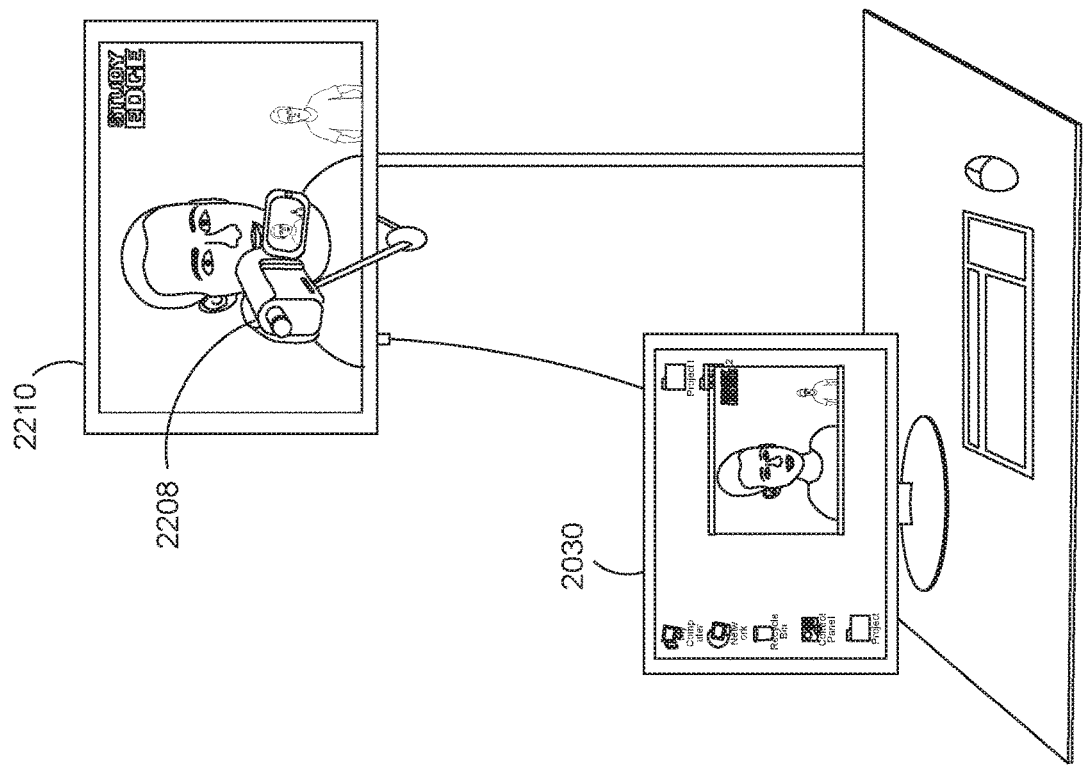

FIG. 22 shows a view of a portion of the video presentation studio as viewed from the Presenter's perspective.

FIG. 23 shows a view of the Confidence Monitor screen 2310, which, in this example, is configured to display the Presenter video feed, which, for example, includes an image of the Presenter 2311 and a blank (e.g., white) background generated in real-time using a Key Chroma compositing technique. In the specific example embodiment of FIG. 23, the Presenter video feed is generated from the images captured by the video camera device 2308.

FIG. 24 shows a view of the Confidence Monitor screen 2410, which, in this example, is configured to display the presentation whiteboard feed 2413, which, for example, includes images captured by the presentation whiteboard camera device (e.g., Camera 2006, FIG. 20).

FIG. 25 shows a view of the Confidence Monitor screen 2510, which, in this example, is configured to display a composite feed which includes both the presentation whiteboard content (e.g., 2513) and the Presenter video feed (e.g. 2511).

Additionally, as illustrated in the example embodiment of FIGS. 20-25, the video presentation studio may include, for example, one or more of the following (or combinations thereof):

Green screen background (e.g., 2002, FIG. 20) or other color background, which is compatible for use with Chroma key compositing.

A presentation whiteboard camera (e.g., 2006) configured to capture and generate a video feed of the presentation whiteboard content (e.g., 2112, FIG. 21), such as, for example, notes, annotations, documents, etc.

A Presenter camera (e.g., 2208, FIG. 22), which may be used to capture and generate a video feed of the Presenter.

A video recording/presentation server (e.g., 2020, FIG. 20) having functionality similar to that described in FIG. 17.

Confidence Monitor (e.g., 2010, FIG. 20; 2210, FIG. 22) having functionality similar to that described in FIG. 17.

A remote controller (e.g., 2111, FIG. 21) having functionality similar to that described in FIG. 17.

One or more additional monitors (e.g., 2030, FIG. 22) which may be configured or designed to display various types of content to the Presenter, such as, for example, one or more of those described herein.

And/or other features/components such as one or more of those described and/or referenced herein.

Transition Operations and Eye Contact

Figure 32:
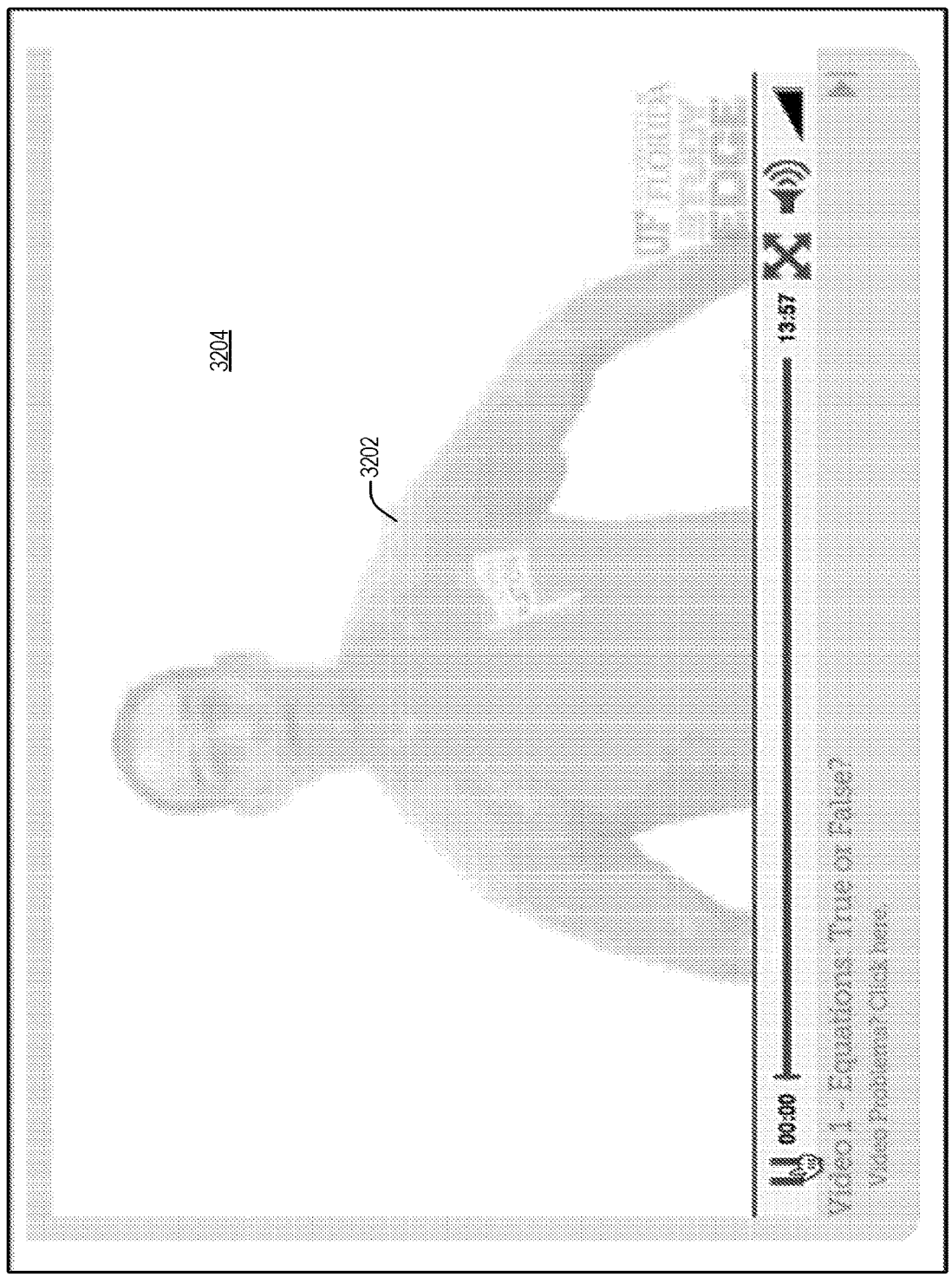
FIGS. 32-41 show a sequence of example screenshots illustrating various transition features which are enabled via the various video presentation and digital compositing techniques disclosed herein.

FIGS. 32-41 depict a sequence of example screenshots (e.g., derived from different video frames of a video presentation) illustrating various presentation transition features which may be implemented via one or more of the video presentation and digital compositing techniques disclosed herein. In the example scenario relating to FIGS. 32-41, it is assumed that an end user (e.g., viewer, student, etc.) is viewing an on-demand playback of a streamed composite video presentation which was previously delivered and recorded live by a Presenter (e.g., 3202, FIG. 32) at a video presentation production studio using a Chroma key composite video production technique. It is further assumed in this example that the Presenter is implementing and controlling (e.g., by himself, and in real-time while delivering the live presentation) a sequence of video presentation transitions including those depicted in the example transition sequences of video presentation screenshots of FIGS. 32-41. As illustrated in the example screenshots of FIGS. 32-41, at least some of the depicted video presentation transitions may include, but are not limited to, one or more of the following (or combinations thereof):

Fade-in Presenter image. An example of this type of transition is illustrated in FIG. 32, which shows an image of the Presenter 3202 fading in to the visible video presentation. In at least some embodiments, the Presenter may initiate the "Fade-in Presenter image" operation concurrently while delivering or recording the live presentation via use of a remote control device such as, for example, remote controller 1711 (FIG. 17).

Figure 41:
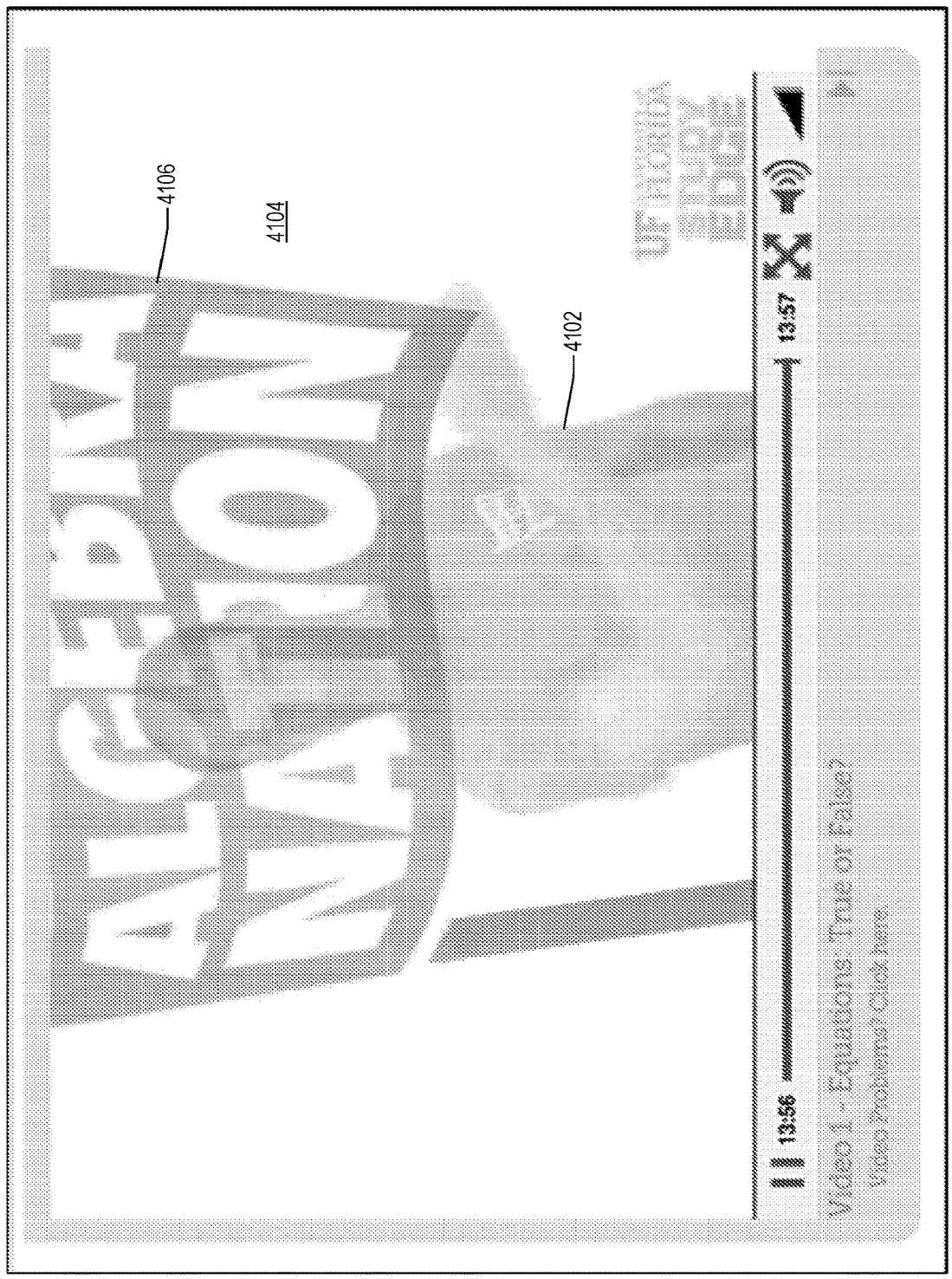

Fade-out Presenter image. An example of this type of transition is illustrated in FIG. 41, which shows an image of the Presenter 4102 fading out of the visible video presentation. In at least some embodiments, the Presenter may initiate the "Fade-out Presenter image" operation concurrently while delivering or recording the live presentation via use of a remote control device such as, for example, remote controller 1711 (FIG. 17).

Figure 34:
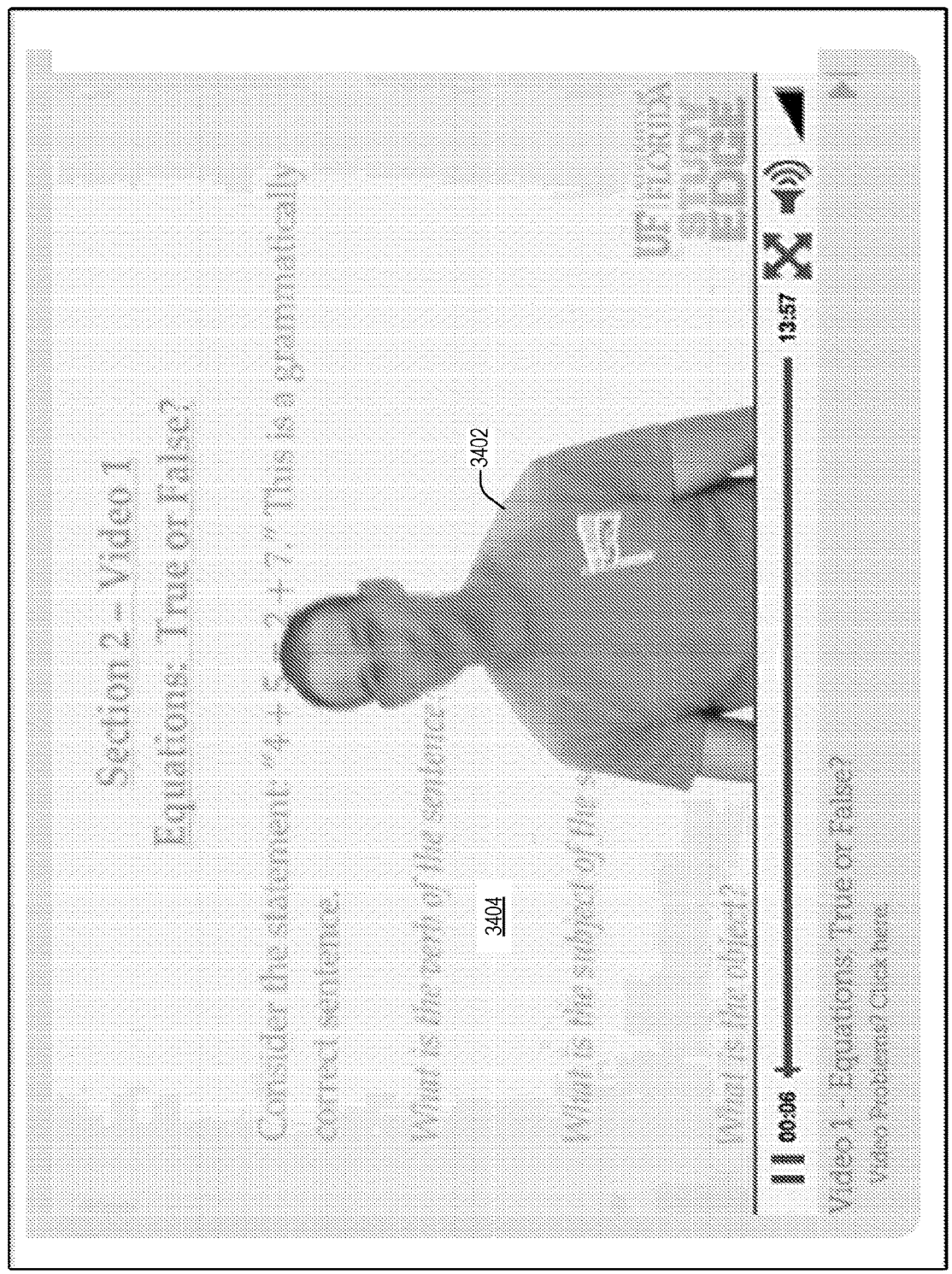

Fade-in presentation whiteboard content. An example of this type of transition is illustrated in FIG. 34, which shows the presentation whiteboard content 3404 fading in to the visible video presentation. In at least some embodiments, the Presenter may initiate the "Fade-in presentation whiteboard content" operation concurrently while delivering or recording the live presentation via use of a remote control device such as, for example, remote controller 1711 (FIG. 17).

Figure 39:
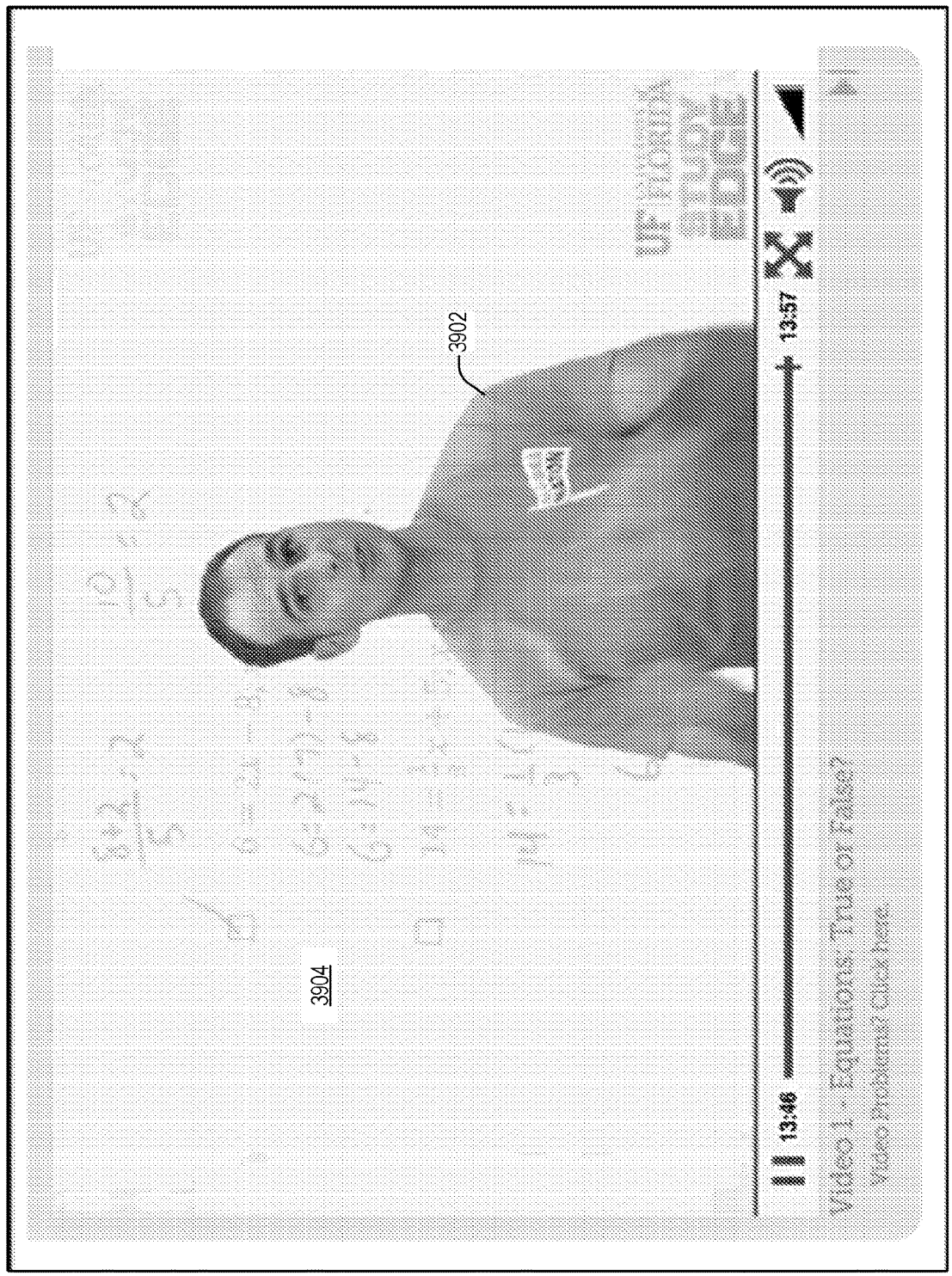

Fade-out presentation whiteboard content. An example of this type of transition is illustrated in FIG. 39, which shows the presentation whiteboard content 3904 fading out from the visible video presentation. In at least some embodiments, the Presenter may initiate the "Fade-out presentation whiteboard content" operation concurrently while delivering or recording the live presentation via use of a remote control device such as, for example, remote controller 1711 (FIG. 17).

Figure 33:
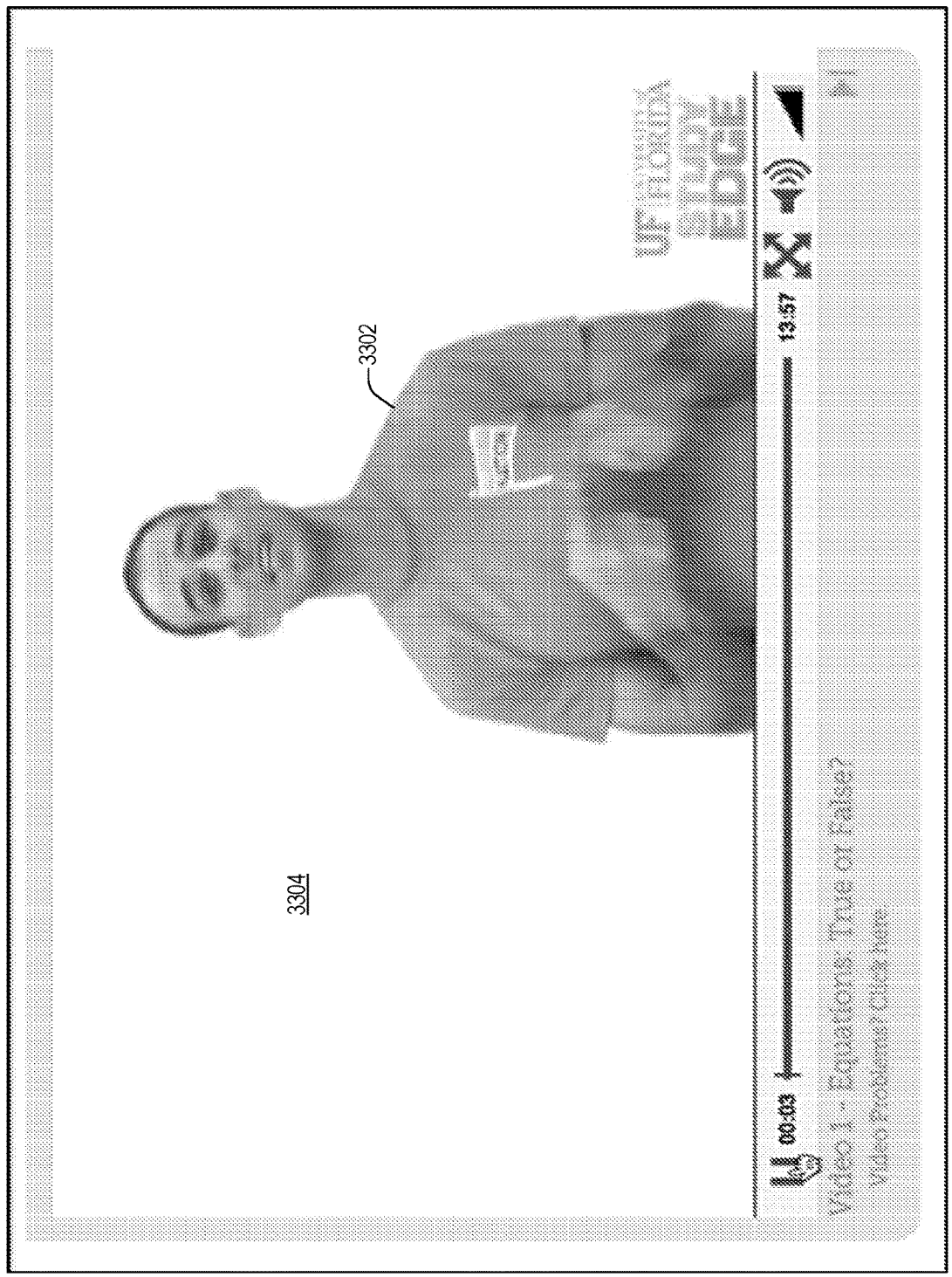
Figure 35:
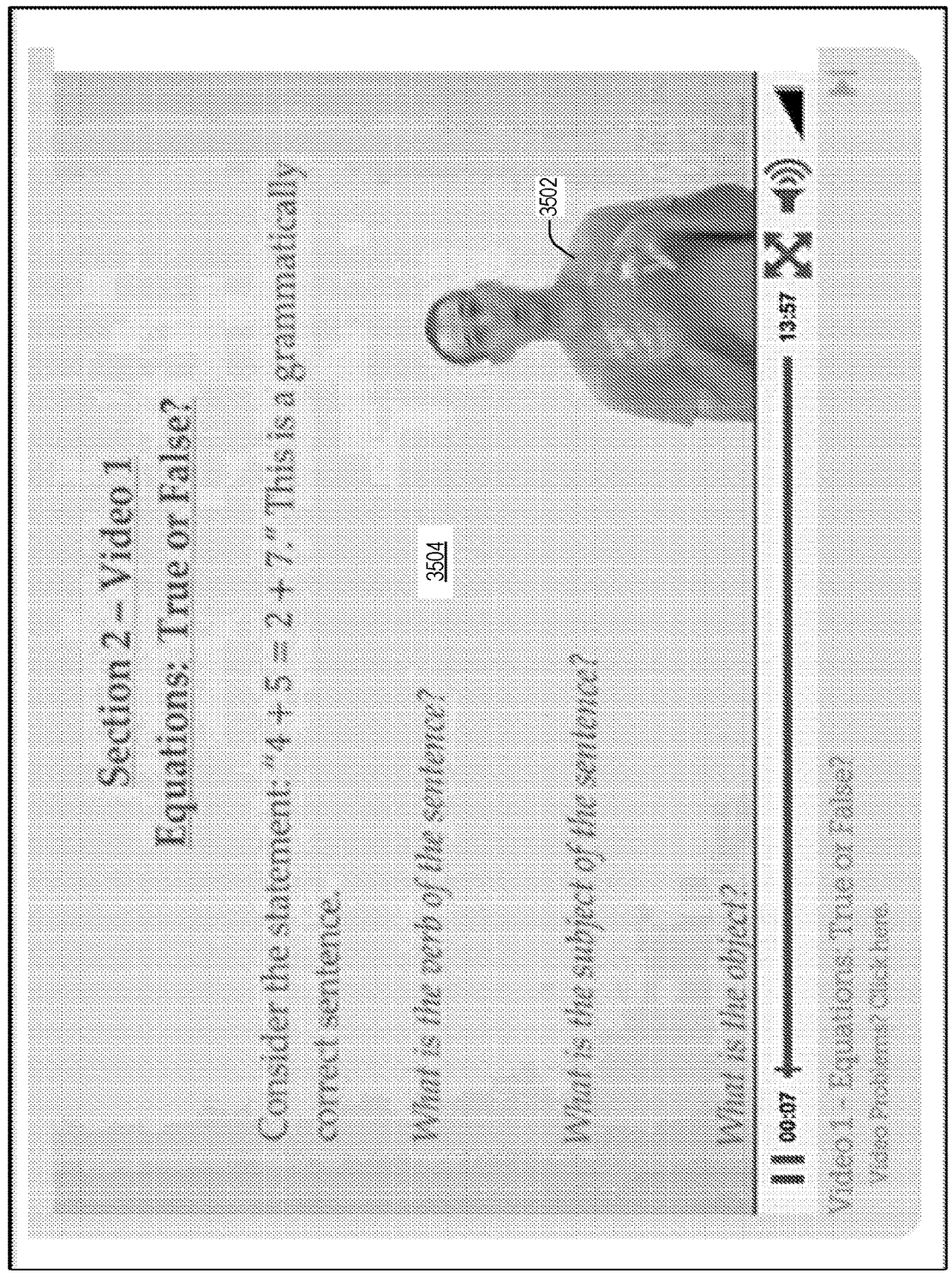

Shrink Presenter image. An example of this type of transition is depicted in the sequence of screenshots of FIGS. 32-36, which show a relatively large image of the Presenter (e.g., 3202, FIG. 32) progressively shrinking in size to a relatively small image of the presenter (e.g., 3602, FIG. 36) as the video presentation progresses (e.g., as illustrated in FIGS. 33, 34, 35). In at least some embodiments, the Presenter may initiate the "Shrink Presenter image" operation concurrently while delivering or recording the live presentation via use of a remote control device such as, for example, remote controller 1711 (FIG. 17).

Enlarge Presenter image. An example of this type of transition is depicted in the sequence of screenshots of FIGS. 37-41, which show a relatively small image of the Presenter (e.g., 3602, FIG. 36) progressively growing in size to a relatively large image of the presenter (e.g., 4102, FIG. 41) as the video presentation progresses (e.g., as illustrated in FIGS. 37, 38, 39, 40). In at least some embodiments, the Presenter may initiate the "Enlarge Presenter image" operation concurrently while delivering or recording the live presentation via use of a remote control device such as, for example, remote controller 1711 (FIG. 17).

Fade-in Graphic. An example of this type of transition is illustrated in FIG. 41, which shows the graphic 4106 fading in to the visible video presentation. In at least some embodiments, the Presenter may initiate the "Fade-in Graphic" operation concurrently while delivering or recording the live presentation via use of a remote control device such as, for example, remote controller 1711 (FIG. 17).

Fade-out Graphic. In one embodiment, the "Fade-out Graphic" command may cause a selected graphic to fading out from the visible video presentation. In at least some embodiments, the Presenter may initiate the "Fade-out Graphic" operation concurrently while delivering or recording the live presentation via use of a remote control device such as, for example, remote controller 1711 (FIG. 17).

FIG. 32—In this example screenshot, a relatively large image of the Presenter 3202 is shown fading in to the video presentation. The presentation whiteboard content 3204 (displayed in the background, behind the Presenter) is currently configured to be blank (e.g., white background).

FIG. 33—In this example screenshot, the relatively large image of the Presenter 3302 is fully visible (e.g., 100% opaque) in front of the blank presentation whiteboard content 3304 (displayed in the background).

FIG. 34—In this example screenshot, it is assumed that the Presenter has initiated (e.g., during recording of the live presentation) a "Shrink Presenter Image" operation to be performed to cause the visible image of the Presenter to shrink in size. In some embodiments, the final shrunken size of the Presenter's image may be predefined or predetermined. In at least some embodiments, the Presenter may initiate the "Shrink Presenter Image" operation concurrently while delivering or recording the live presentation via use of a remote control device such as, for example, remote controller 1711 (FIG. 17). Additionally, as illustrated in this example screenshot, the presentation whiteboard content 3404 is shown fading in to the visible video presentation.

FIG. 35—In this example screenshot, the presentation whiteboard content 3504 is now fully visible (e.g., 100% opaque), and the image of the Presenter 3502 has been shrunken and moved to the bottom right corner of the visible video presentation.

Figure 36:
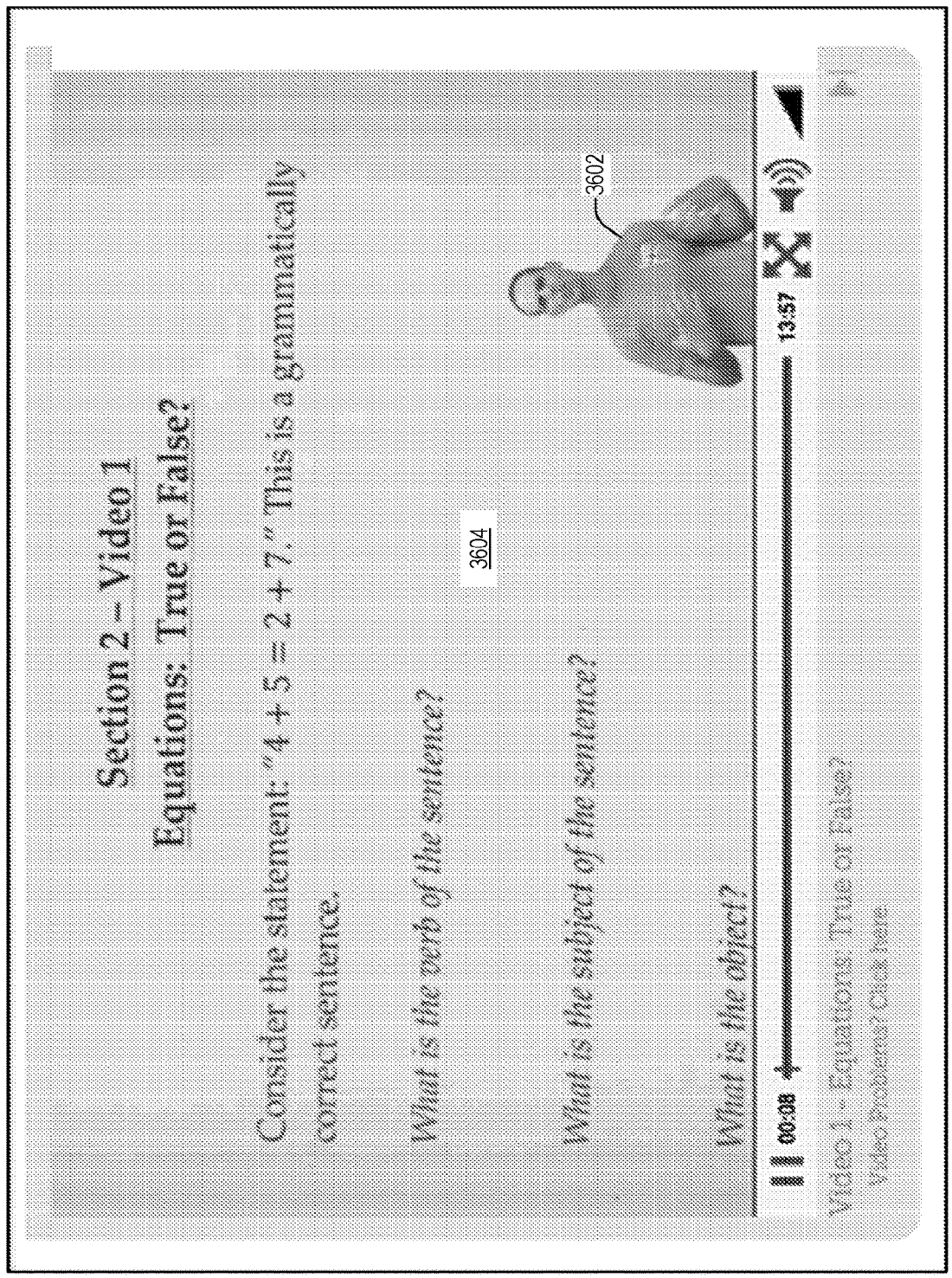

FIG. 36—In this example screenshot, it is assumed that the image of the Presenter 3602 has been shrunken to a predefined minimum size, and has been repositioned to a selected or predetermined location or region (e.g., bottom right corner region) within the viewable portion of the video presentation.

Figure 37:
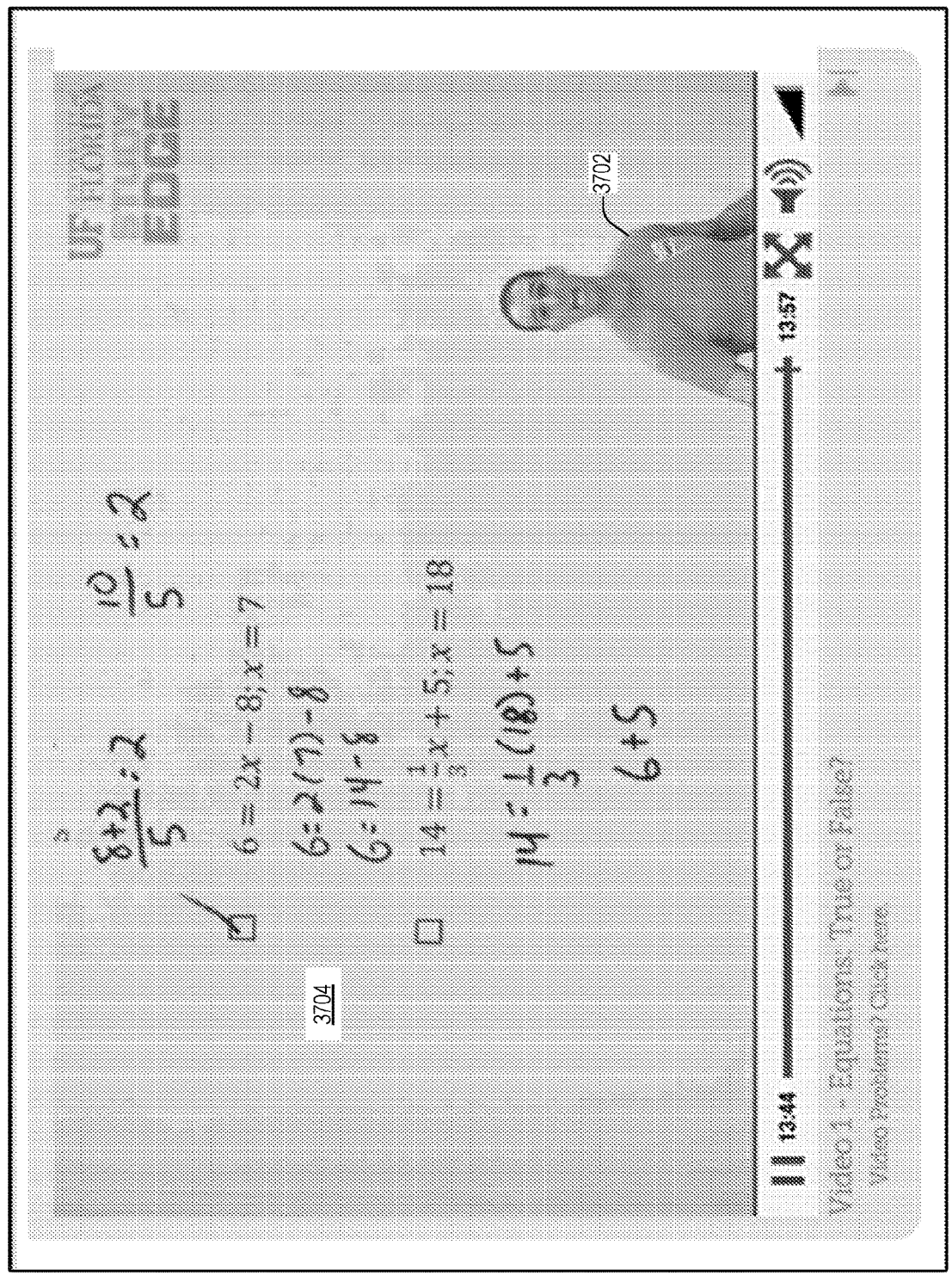

FIG. 37—In this example screenshot, it is assumed that the Presenter has initiated (e.g., during recording of the live presentation) a "Enlarge Presenter Image" operation to be performed to cause the visible image of the Presenter to enlarge in size. In some embodiments, the final enlarged size of the Presenter's image may be predefined or predetermined. In at least some embodiments, the Presenter may initiate the "Enlarge Presenter Image" operation concurrently while delivering or recording the live presentation via use of a remote control device such as, for example, remote controller 1711 (FIG. 17). Additionally, as illustrated in this example screenshot, it is assumed that the Presenter has initiated an action or operation (e.g., during the recording of the live presentation) to cause the whiteboard presentation content 3704 to display an image of several work problems which have been manually annotated by the Presenter (e.g., during the recording of the live presentation).

Figure 38:
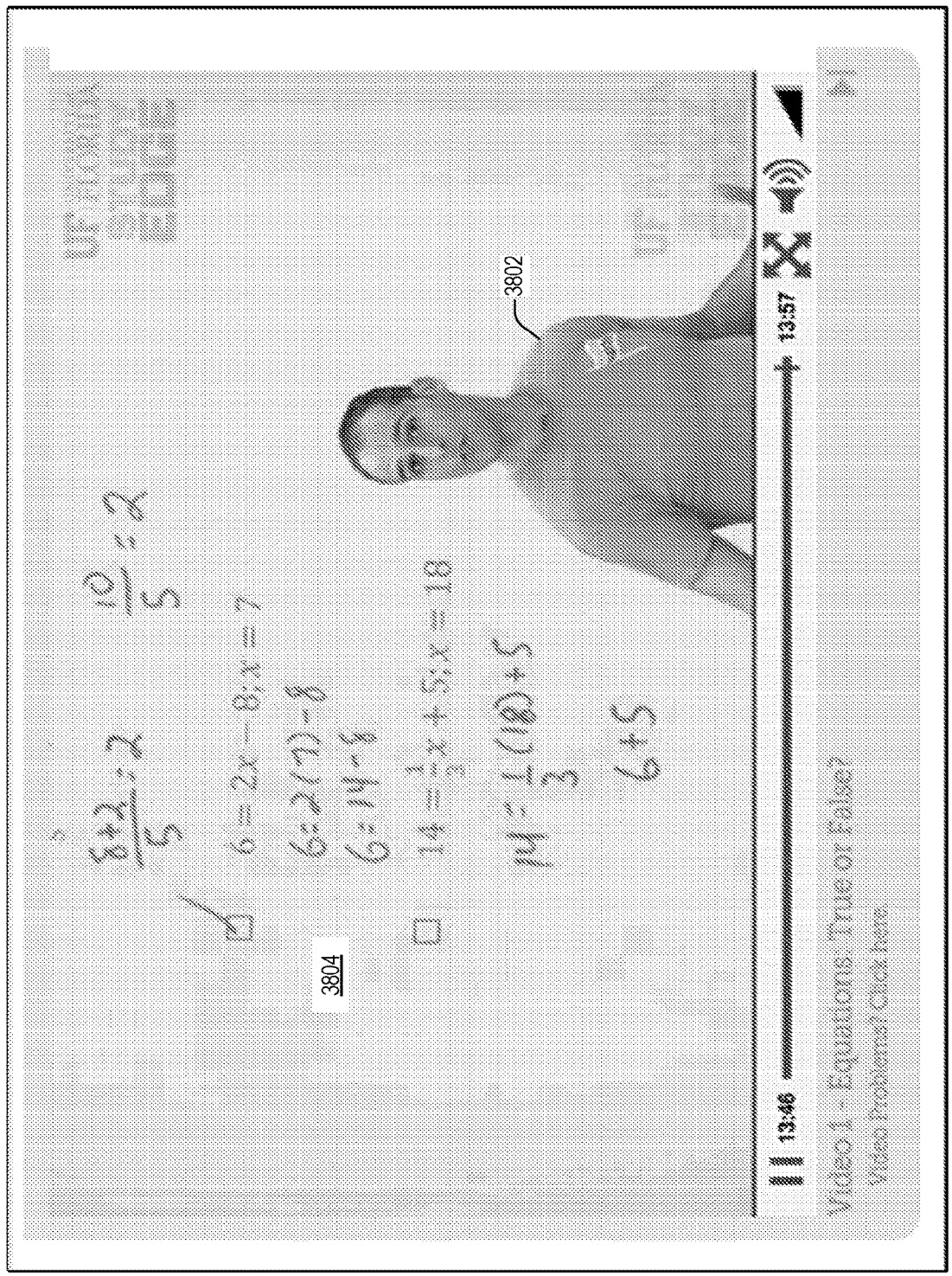

FIG. 38—In this example screenshot, it is assumed that the Presenter has initiated (e.g., during recording of the live presentation) a "Fade-out presentation whiteboard content" operation to be performed to cause the visible presentation whiteboard content to fade-out as the video presentation progresses. In at least some embodiments, the Presenter may initiate the "Fade-out presentation whiteboard content" operation concurrently while delivering or recording the live presentation via use of a remote control device such as, for example, remote controller 1711 (FIG. 17).

FIG. 39—In this example screenshot, as the video presentation progresses, the displayed Presenter image 3902 continues to enlarge in size, and the displayed location of the Presenter image continues to be migrated from the bottom right corner to the center of the visible video presentation. Additionally, the visible presentation whiteboard content 3902 continues to fade-out as the video presentation progresses.

Figure 40:
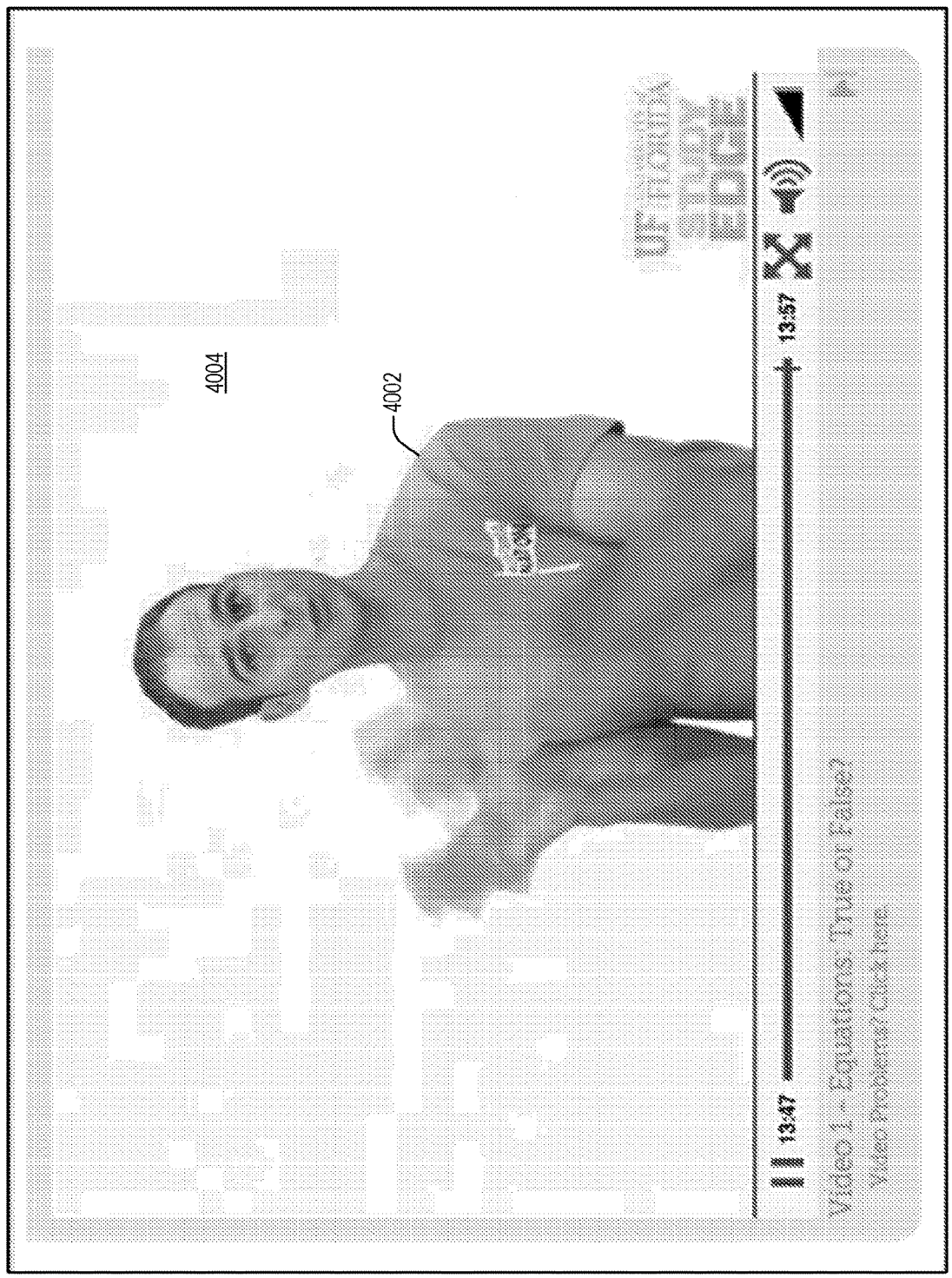

FIG. 40—In this example screenshot, as the video presentation progresses, the displayed Presenter image 402 continues to enlarge in size, and the displayed location of the Presenter image continues to be repositioned toward the center of the visible video presentation. Additionally, the presentation whiteboard content 4004 is now blank (e.g., white background).

FIG. 41—In this example screenshot, it is assumed that the Presenter has initiated (e.g., during recording of the live presentation) a "Fade-out Presenter Image" operation to be performed to cause the visible image of the Presenter 4102 to fade-out as the video presentation progresses. Additionally, it is assumed that the Presenter has initiated (e.g., during recording of the live presentation) a "Fade-in Graphic" command, thereby causing a selected graphic (e.g., 4106) to gradually fade in as the video presentation progresses in time.

It is to be noted that, throughout the various transition operations which are initiated by the Presenter during the recording of the live presentation, the Presenter continuously maintains eye contact with the viewer (e.g., as depicted in the example screenshots of FIGS. 32-41). As discussed above, the Presenter's ability to maintain substantially continuous eye contact with camera/viewer while recording the live presentation for future streaming (or while delivering the live presentation for real-time streaming) is one of the advantageous features of the video presentation and digital compositing techniques disclosed herein. As noted above, the Presenter's maintaining of eye contact throughout a video presentation is a way to create increased trust and confidence for students/viewers. Such eye contact also enables students to pick up on physical cues, and facilitates the Presenter when using physical gestures to illustrate a concept. Eye contact with the student helps to build the student's confidence, and helps to keep bored students more engaged and paying attention. Additionally, as noted above, using the various video presentation production techniques disclosed herein, the Presenter may maintain continuous eye contact with the camera during the recording of the live presentation, even while writing or annotating on notes which are displayed as part of the presentation whiteboard content in the video presentation.

Another advantageous feature of the video relates to the Presenter's ability to concurrently initiate and control (e.g., by his/her own self, and in real-time) video presentation transitions (e.g., such as those illustrated in the sequence of example screenshots of FIGS. 32-41) while the presenter is performing/recording the live presentation, without the need for assistance from one or more other persons, and/or without the need for performing any post-video production.

Additionally, the feature of providing the Presenter with the ability to dynamically modify (e.g., shrink and/or enlarge) the relative size of the Presenter's image in the video presentation at his/her will (e.g., during recording of the live presentation, and without the need to perform post-editing operations) allows the Presenter to create emphasis on presented topic(s)/subject matter by the very act of shrinking or enlarging his/her viewable image in the video presentation.

For example, in one example embodiment, the Presenter may cause (during recording of the live video presentation) the video presentation to begin with just a logo or graphic. Then, the Presenter may cause (during recording of the live video presentation) the logo/graphic to fade out, and may further cause the Presenter's image to fade in on "full screen" (e.g., as shown in FIG. 32). The Presenter may be introducing important material during this time, and the entire focus of the video presentation is on the Presenter. The Presenter may then go into the lesson itself, and may cause the Presenter's visible image (in the video presentation) to dynamically shrink down to smaller size, where presentation notes are viewable behind the Presenter. The viewer can now see the notes that the Presenter is annotating and referencing along with the nonverbal cues/gesticulations of the Presenter. At this point, both the notes and the Presenter are available to the audience. Should the Presenter want to emphasize a certain point during the notes discussion, the Presenter can dynamically enlarge (e.g., in real-time) his/her image so the Presenter now occupies the whole screen once more, cueing the audience that this is a key point in the presentation and forcing the audience to pay special attention. It is to be noted that this specific, purposeful enlarging/shrinking of the Presenter's image (e.g., as a way of indicating emphasis) is only made possible using embodiments of the video presentation production studio set up as described herein.

Other Benefits/Features/Advantages

According to different embodiments, the video presentation and digital compositing techniques described herein may be configured, designed, and/or operable to provide, enable and/or facilitate implementation of a variety of different features, functionalities, benefits and/or advantages.

For example, using the video presentation and digital compositing techniques described herein, the educational video presentation may be conducted entirely by the Presenter in real time. There is no need for a director, nor need for a 2nd person (e.g., "scribe") to write notes as Presenter narrates. Nor is there any need to perform postproduction activities such as, for example, video editing and/or merging.

Moreover, because of how educational video presentation studio is set up, the Presenter can perform a variety of activities on the fly (e.g., in real-time, while video presentation is being recorded) such as, for example:

change camera angles,
position himself/herself at different parts of the screen,
change his transparency levels,
add annotations to the whiteboard presentation,
etc.

By the end of the filming session, the educational video presentation is ready to be uploaded, streamed and/or distributed. In other embodiments, the educational video presentation may be live streamed rather than recorded.

Via the use of Chroma key compositing (e.g., "green screen") technology, the presentation whiteboard content (e.g., images, PowerPoint slides, a live image from a document camera, an electronic/computerized display, graphics, etc.) is not projected onto a physical screen behind the Presenter, but rather combined (e.g., in real-time) with the camera stream recording the Presenter. This advantageously avoids the undesirable scenario of needing to display two separate viewing boxes (e.g., 3012, 3014), as illustrated, for example, in FIG. 30. Additionally, instead of simply overlaying two videos on top of another (e.g., as illustrated in FIG. 31), the educational video presentation of the present application may utilize Chroma key compositing technology to superimpose only the Presenter's image (e.g., without distracting background) over selected regions/portions of the presentation whiteboard.

Using the various video presentation and digital compositing techniques described herein, the video presentation (and recording thereof) may be performed entirely synchronously and in real-time, with no post-editing needed. For example, as illustrated in the example embodiment of FIG. 17, as the Presenter 1704 stands in front of the green screen 1702, he can view (e.g., in real-time) the presentation whiteboard content (e.g., 1713) as it is displayed (e.g., in real-time) on the Confidence Monitor 1710, which, for example, is positioned in front of the Presenter and directly adjacent to the camera 1708 recording the Presenter. Additionally, unlike conventional teleprompters (which displays only text), the Presenter may concurrently view an image himself (e.g., 1715) and the presentation whiteboard content (1713) on the Confidence Monitor (e.g., as viewed by the viewer/end user), thereby enabling the Presenter to angle/adjust his body movement(s) accordingly (e.g. to avoid blocking out portions of the presentation whiteboard content, to point to selected portions of the presentation whiteboard content, to interact with graphics/slides, etc.).

Additionally, using the various video presentation and digital compositing techniques described herein, the Presenter can selectively, dynamically, and seamlessly change (e.g., in real-time) the display of presentation whiteboard content from notes, to graphics, to presentation, etc., without the Presenter having to change his position or noticeably move.

Further, via use of the various video presentation and digital compositing techniques described herein, a viewer/end user is able to focus on one screen and view both the presentation whiteboard content and the Presenter simultaneously. In this way, the viewer is able to make eye contact with the Presenter and view the Presenter's facial expressions, while concurrently being able to view the notes, annotations, and/or other displayed content of the background presentation whiteboard.

Many embodiments of the video presentation and digital compositing techniques described herein are distinct from currently existing video presentation embodiments, which utilize two separate windows (e.g., one window for the notes/presentation, and another window for the Presenter, as illustrated for example in FIG. 30). In these less desirable, existing video presentation embodiments, viewers have to watch notes or a presentation on the left, for instance, and the speaker on the right. As a result, the viewer's eye never quite knows where to "rest", and the size of each image typically needs to be reduced significantly to share the screen space.

In contrast, using the various video presentation and digital compositing techniques described herein a clean image of the Presenter may be seamlessly superimposed over background whiteboard content, notes, PowerPoint slides, etc., thereby avoiding the need for displaying an awkward rectangle of the Presenter (and distracting background) in a corner that blocks part of the presentation material (e.g., as illustrated in FIG. 31). Accordingly, in at least some embodiments of the video presentation and digital compositing techniques described herein, a viewer/user is able to view the entire educational video presentation via a single window. Further, when the Presenter gestures to selected portions of the background presentation whiteboard content, it seamlessly appears as if Presenter is in a room with the presentation whiteboard directly behind.

In at least some embodiments, there is no display of distracting, non-relevant background, since, for example, the only background content which is displayed is the presentation whiteboard content. In contrast, what exists in the market shows the Presenter and distracting elements like a lamp, plants, and even a copy room. The mobile market is increasingly popular; people view videos on smartphones or tablets. Our method allows our videos to be optimized for such limited screen sizes.

One of the advantageous features of the video presentation and digital compositing techniques described herein relates to the ability for viewers to clearly view Presenter's hand (and/or hand+pointer) pointing to specific locations, images, slides, text, annotations, and/or other portions of the displayed presentation whiteboard content. Not only is it helpful that the Presenter can actually point to something physical, it allows viewers (e.g., students) to mimic the same writing/notes on their own paper. This also provides a "connection" between the Presenter and viewer that further erodes the "4th wall" between the viewer and the viewed. That is, the viewer's (e.g., student's) ultimate medium is paper and pen, and educational video presentation may be deliberately configured or designed to facilitate the student's note taking activities, which are based on the content being presented in the educational video presentation.

In contrast, many currently existing video presentation embodiments are not configured or designed to facilitate the student's note taking activities. For example, currently existing video presentation embodiments may utilize transparent glow boards, physical whiteboards, etc. However, viewers/students are not annotating on such mediums while viewing the educational video presentation. For example, if a student (viewing an educational video presentation) watches a Presenter use a laser pointer to point at content presented via PowerPoint slide, the student then has to translate in his brain what that means on his own paper. Alternatively, if a student is watching an educational video presentation and taking notes using pen and paper, and if the Presenter uses a pen to point to notes on a physical paper (which is displayed as part of the presentation whiteboard content), this requires less mental processing/translation on the part of the student, and helps facilitate the student note taking activities.

Accordingly, it will be appreciated that many embodiments of the video presentation and digital compositing techniques described herein are configured or designed to bring into alignment differences which may exist between students and teachers using older technology of paper and print (e.g. workbook) and those (teachers/Presenters) using newer technology (e.g. online educational video presentations), in order to facilitate the scaling and teaching of educational curriculum.

Mobile Device Video Presentation and Digital Compositing Techniques

As described in greater detail herein, the various video presentation and digital compositing techniques described herein may also be adapted for use and implementation on various types of mobile devices such as, for example, smart phones, tablets, laptop computers, iPads, and/or other similar types of mobile or portable electronic devices.

FIGS. 42-51 show example screenshots and system diagrams which may be utilized for implementing one or more of the mobile device based video presentation and digital compositing aspects disclosed herein.

Figure 51:
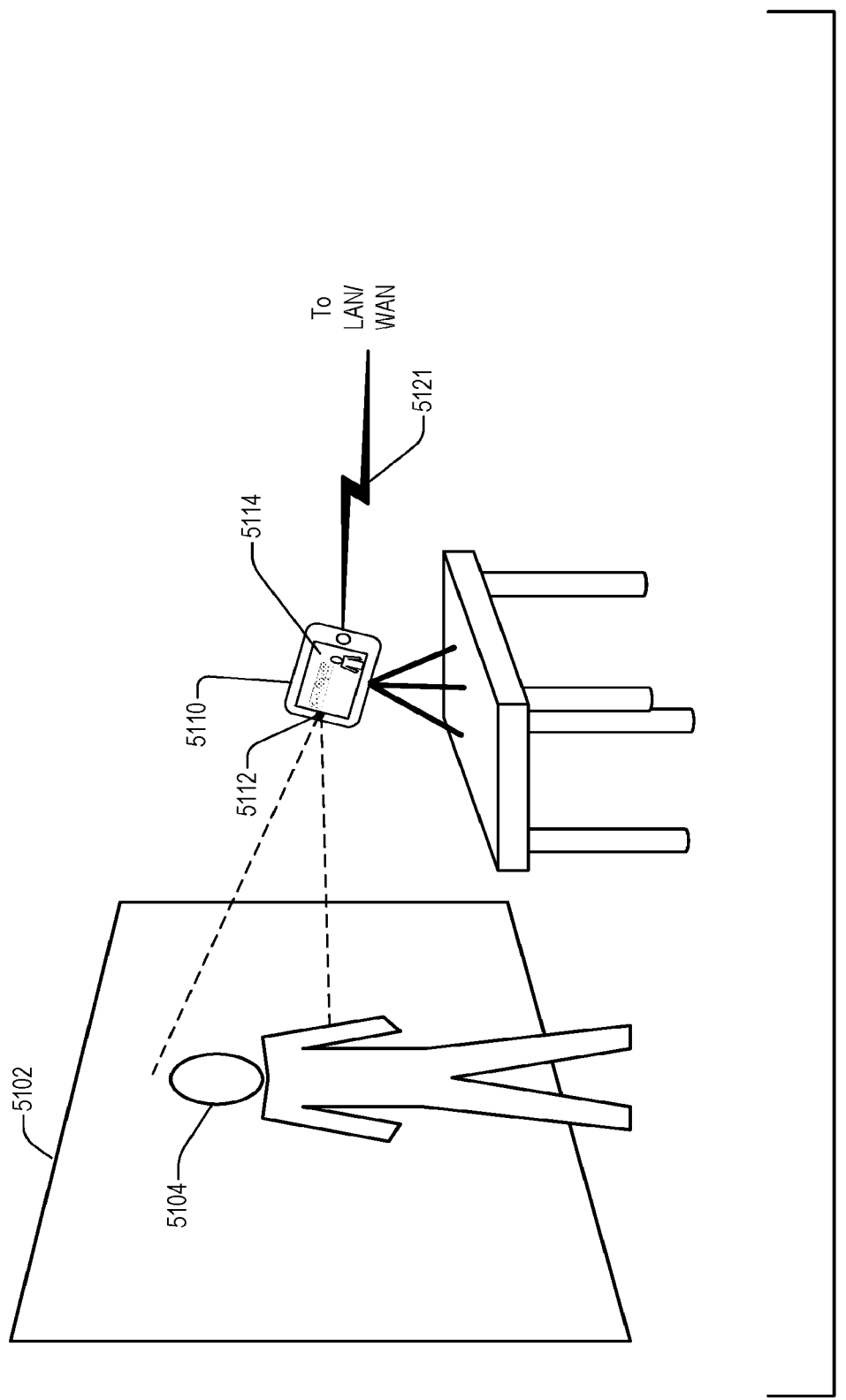
Figure 52:
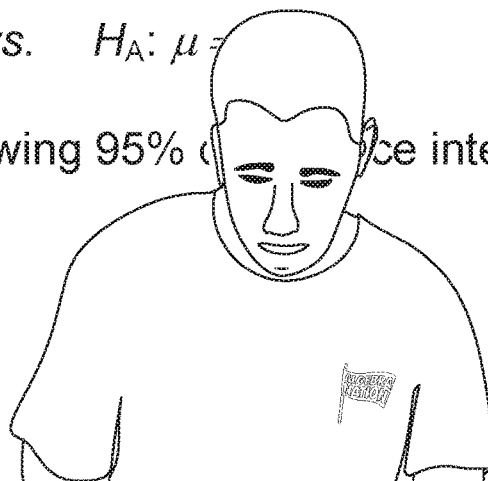
FIG. 52 shows a video presentation in which an image of a presenter looking downward is superimposed over whiteboard content.
Figure 53:
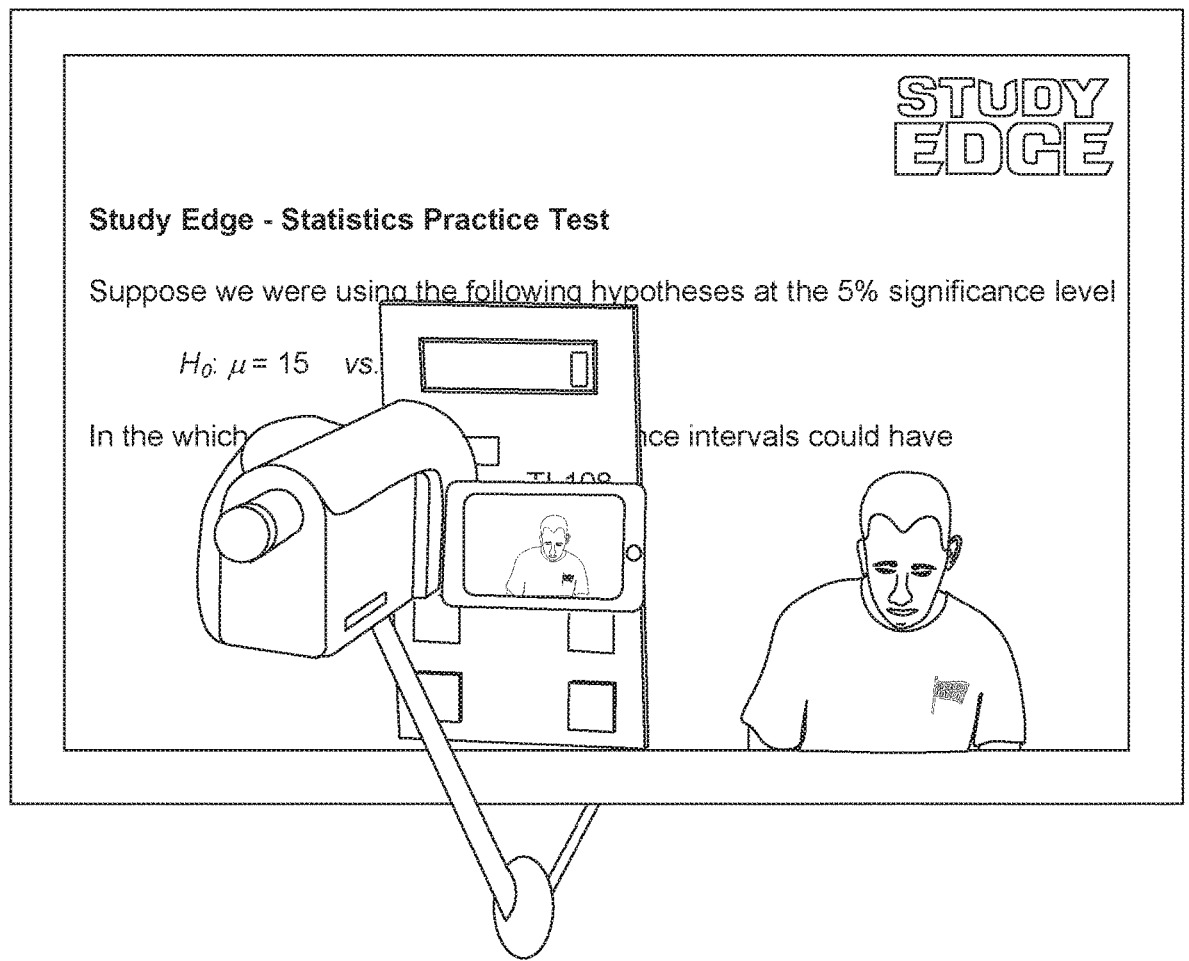
FIG. 53 shows a confidence monitor screen in which an image of a presenter looking downward is superimposed over whiteboard content, in front of which is a presenter camera.
Figure 54:
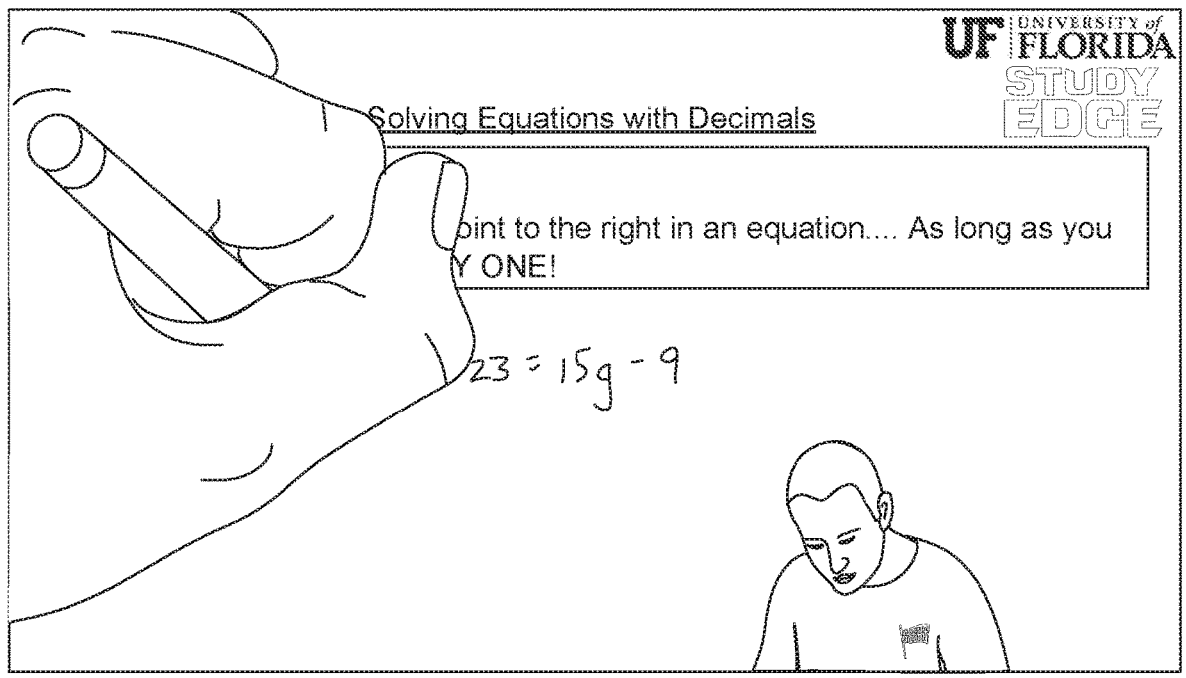
FIG. 54 shows a video presentation in which an image of a presenter looking downward is superimposed over whiteboard content on which the presenter is writing with his hand.
Figure 55:
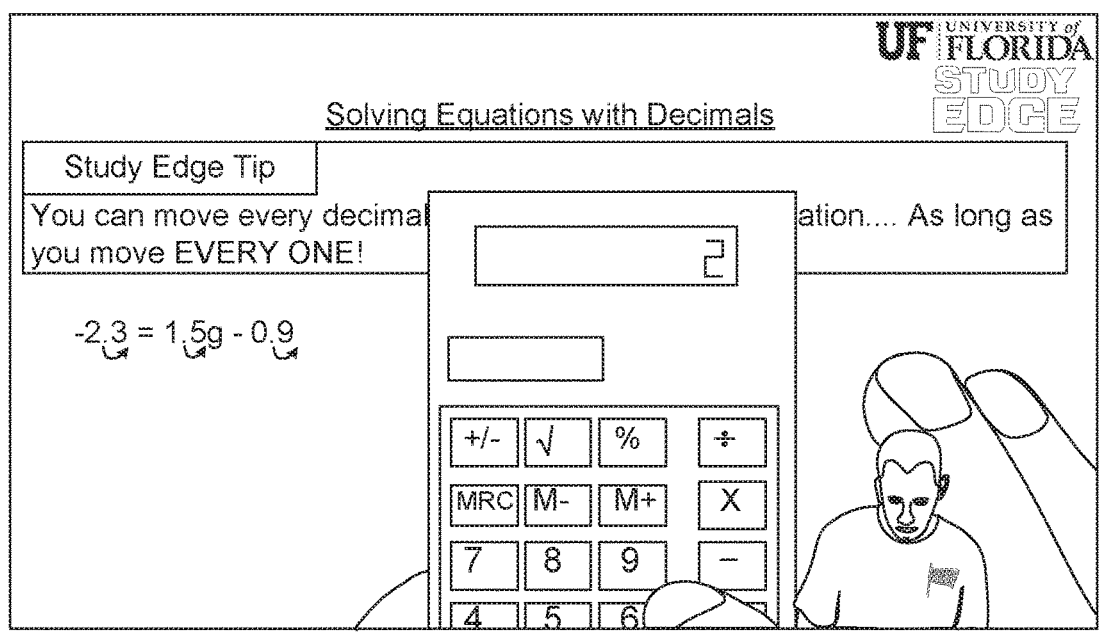
FIG. 55 shows a video presentation in which an image of a presenter looking downward is superimposed over whiteboard content on which the presenter is manipulating a calculator with his hand.
Figure 56:
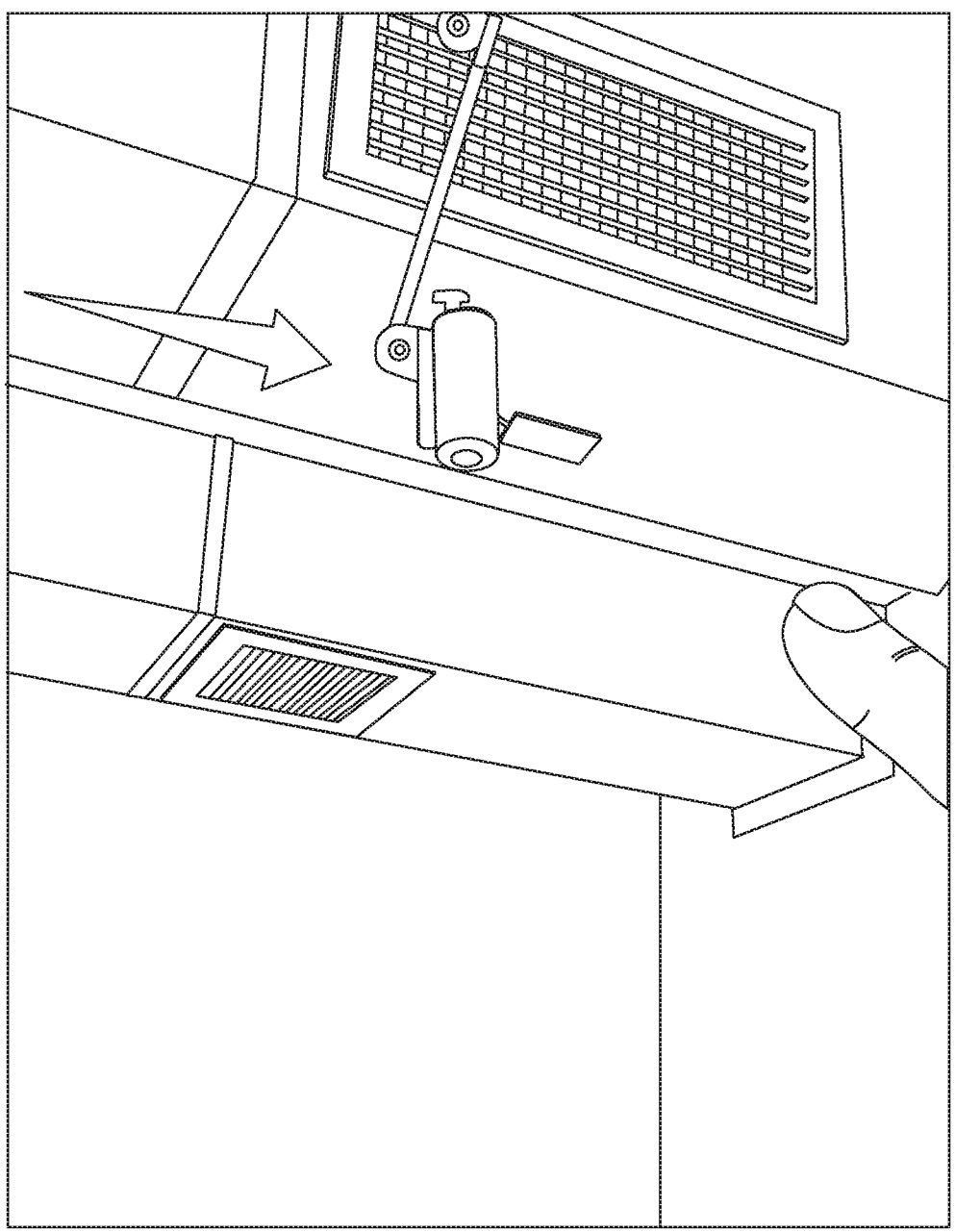
FIG. 56 shows a presentation whiteboard camera mounted on an adjustable boom attached to the ceiling.

For example, FIG. 51 shows an example embodiment of a system configuration 5100 which may be used for conducting and/or recording a live stream video presentation session via a mobile device. As illustrated in the example embodiment of FIG. 51, the video presentation system configuration 5100 may include, but are not limited to, one or more of the following feature(s)/component(s) (or combinations thereof):

Physical background 5102 (or other color background, which is compatible for use with Chroma key compositing).

A mobile device 5110 (such as a smart phone or tablet) which includes first video recording device (e.g., front facing camera, 5112), which may be used to capture and generate a video feed of the Presenter 5104.

A second video recording device (e.g., rear facing camera of mobile device 5110), which may be used to capture and generate a video feed of a presentation whiteboard, notes, annotations, documents, etc.

A video recording/presentation server having functionality similar to that described in FIG. 17.

An electronic whiteboard (such as, for example, a notebook computer), which may be configured or designed enable the Presenter to generate digital content (e.g., notes, annotations, images, text, documents, slides, etc.) to be displayed as part of the presentation whiteboard feed. According to different embodiments, the electronic whiteboard may be configured or designed to communicate with the video recording/presentation server via wired and/or wireless interface(s).

Confidence Monitor (e.g., mobile device display 5114) having functionality similar to that described in FIG. 17.

A remote controller having functionality similar to that described in FIG. 17. In at least some embodiments, functionality relating to the remote controller may be implemented via software running on the mobile device.

A Remote Annotation Device having functionality similar to that described in FIG. 17. In at least some embodiments, functionality relating to the remote annotation device may be implemented via software running on the mobile device.

One or more interfaces (e.g., wireless communication interface 5121) for enabling the mobile device to communicate with one or more local and/or remote network device(s), system(s), network(s) etc.

And/or other feature(s)/component(s) described and/or referenced herein.

In the specific example embodiment of FIG. 51, the mobile phone/device 5110 is mounted on a tripod, and the Presenter is shown standing in front of a solid colored backdrop 5102 (e.g., green screen, white screen, solid colored wall, etc.). However, in alternate embodiments, the conducting and/or recording of live stream video presentation sessions may be performed without the use of a green screen backdrop and/or tripod.

For example, in at least some embodiments, images, videos, slides, documents, animation, drawings, and/or other media/content may be streamed by the mobile device (e.g., as a whiteboard video-feed of a mobile presentation) and displayed on the mobile device display, while concurrently, a front facing camera and/or microphone of the mobile device may be used to capture real-time audio/video content of the Presenter which may be superimposed or overlaid over the whiteboard video-feed as narrations, comments, and/or Presenter video feeds. In at least one embodiment, the Presenter may hold the mobile device by hand, rather than using a tripod or other device mount.

According to different embodiments, one or more aspects of the live stream video presentation session may be implemented via use of an application running at the mobile device 5110. For example, in one embodiment, an application running at the mobile device 5110 may be configured or designed to include functionality for enabling or performing one or more of the following (or combinations thereof):

Generating and/or displaying one or more mobile video presentation GUIs for facilitating streamed video presentation(s) conducted via the mobile device.

Recording and/or broadcasting (e.g., in real-time) the Presenter video feed.

Recording and/or broadcasting (e.g., in real-time) the presentation whiteboard video feed.

Performing (e.g., in real-time) Chroma key compositing operations for compositing the Presenter video feed and the presentation whiteboard video feed.

Generating (e.g., in real-time) display output for displaying (or streaming) the Presenter video feed, the presentation whiteboard video feed, and/or composite video feeds.

And/or other types of video presentation/digital compositing aspects described and/or referenced herein.

In other embodiments, an application running at the mobile device 5110 may be configured or designed to communicate with a local and/or remote video presentation server which may be configured or designed to provide functionality relating to one or more of the video presentation and digital compositing aspects disclosed herein. For example, in one embodiment, the mobile device 5110 may be configured or designed to capture the Presenter video feed and/or presentation whiteboard video feed, and to transmit such video feed(s) to a remote video presentation server for performing various operations such as, for example: performing Chroma key compositing operations for compositing the Presenter video feed and the presentation whiteboard video feed; generating display output for displaying (or streaming) the Presenter video feed, the presentation whiteboard video feed, and/or composite video feeds; etc.

FIGS. 42-50 show example screenshots of various mobile video presentation GUIs which may be utilized for implementing one or more of the mobile device based video presentation and digital compositing aspects disclosed herein. In at least some embodiments, at least a portion of the mobile presentation GUIs of FIGS. 42-50 may be generated by a video presentation application running at the mobile device.

Figure 42:
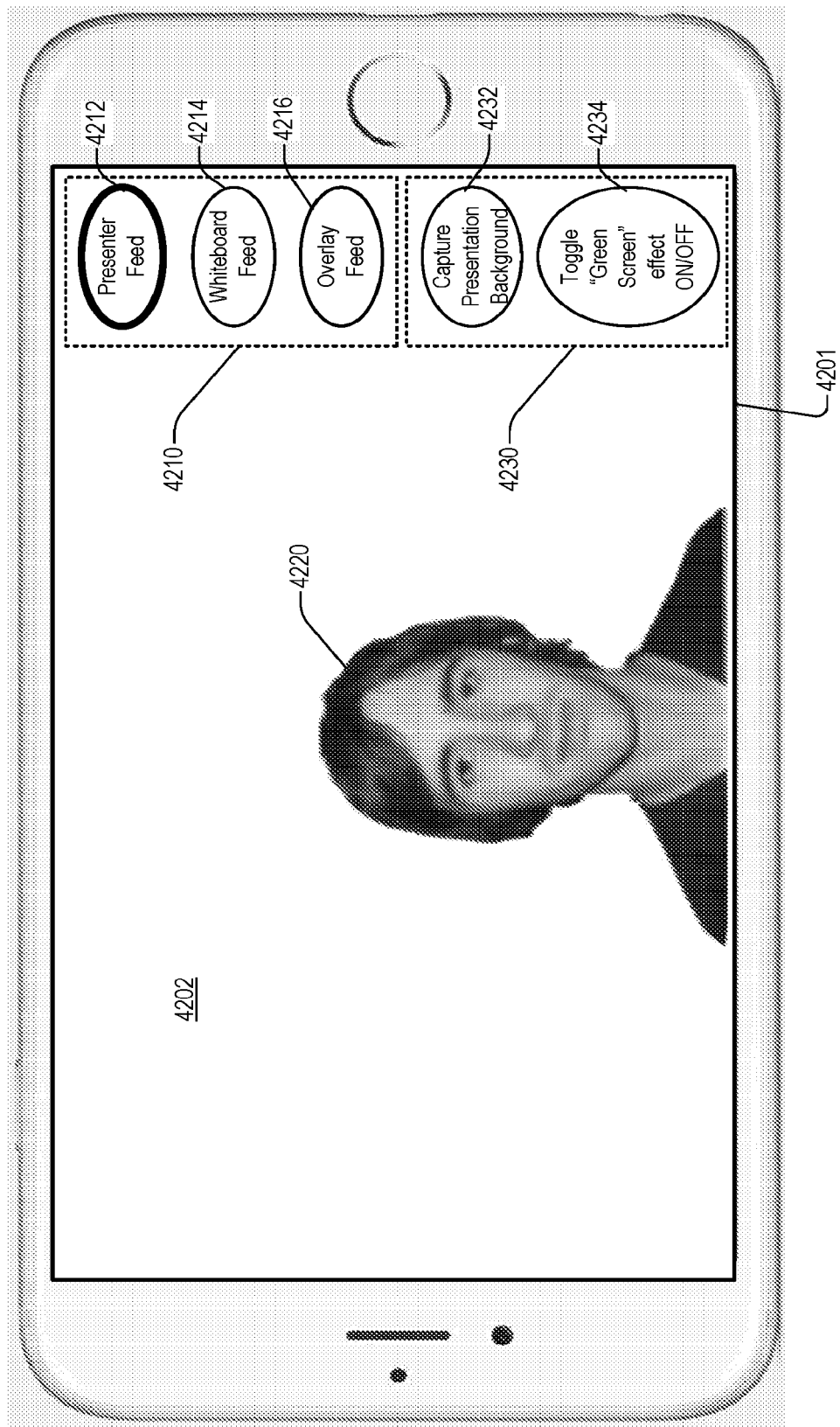
FIGS. 42-51 show example screenshots and system diagrams which may be utilized for implementing one or more of the mobile device based video presentation and digital compositing aspects disclosed herein.

FIG. 42 illustrates an example screenshot of a graphical user interface (GUI) 4201 which may be configured or designed include functionality for enabling a user to initiate and/or perform various operation(s) and/or action(s) relating to mobile device based video presentations and digital compositing techniques.

For example, as illustrated in the example embodiment of FIG. 42, GUI 4201 includes a Video Feed Selection GUI portion 4210 which provides functionality for enabling a user to selectively switch between desired video feeds, including, for example, one or more of the following (or combinations thereone or more of the following (or combinations thereof):

Presenter Video Feed 4212.

Whiteboard video feed (e.g., presentation whiteboard video feed) 4214.

Overlay video feed 4216. In at least one embodiment, the Overlay video feed may be implemented as a Chroma key composite video feed of the Presenter video feed which is superimposed or overlayed over the presentation whiteboard video feed (e.g., as illustrated, for example, in FIG. 44).

And/or other feeds which may be streamed from the mobile device to be used as part of the video presentation.

In at least one embodiment, the selection of the video feed (e.g., initiated via video feed selection GUI portion 4210) may be used to control the video feed which is displayed on mobile device display. In some embodiments, the selection of the video feed (e.g., initiated via video feed selection GUI portion 4210) may be used to control the video feed which is streamed to the end user(s).

As illustrated in the example embodiment of FIG. 42, GUI 4201 also includes a Chroma Key Filtering GUI portion 4230 which provides functionality for enabling a user to initiate, and/or perform one or more of the following operation(s), action(s), and/or feature(s) (or combinations thereof):

Functionality 4232 for capturing and/or identifying the presentation background or backdrop (e.g., 5102, FIG. 51) for use in performing Chroma key compositing operations relating to the Presenter video feed.

Functionality 4234 for enabling the user to selectively enable/disable use of the Chroma key compositing feature (e.g., "Green Screen effect") on one or more channels/feeds of the video presentation.

And/or other types of video presentation functionality described and/or referenced herein.

In the example screenshot embodiment of FIG. 42, it is assumed that the user (e.g., the Presenter) has elected to display the Presenter Video feed (e.g., by tapping on the "Presenter Feed" button 4212), and has also enabled Chroma key filtering functionality to be applied to the Presenter Video feed to thereby generate a Chroma key filtered Presenter Video feed (e.g., as illustrated at the mobile device display of FIG. 42) in which the Presenter 4220 is visible, and the Presenter's backdrop 4202 has been filtered to be non-visible.

According to different embodiments, the Video Presentation System may be configured or designed to utilize various techniques for properly identifying characteristics of the presentation background for use in performing Chroma key compositing operations relating to the Presenter video feed. For example, in at least one embodiment, a user (e.g., the Presenter) may tap on the "Capture Presentation Background" button 4232 to cause the mobile device to capture an image of a portion of the background or backdrop which the Presenter will stand in front of during recording or streaming of the Presenter video feed. Using the captured image, the system may automatically identify the color and/or pattern of the backdrop/background (along with identifying other visual characteristics), and may use the identified backdrop color/pattern for performing Chroma key compositing operations relating to the Presenter video feed.

"Green Screen" Functionality.

In at least one embodiment, the Video Presentation System may be configured or designed to include "Green Screen" Chroma key compositing functionality for use in implementing Chroma key compositing operations relating to the video presentation. For example, the Presenter may stand in front of a solid colored backdrop (e.g., green screen, white screen, solid colored wall, etc.), and a mobile device may be positioned to allow the mobile device camera to view the Presenter and background (e.g., as illustrated in FIG. 51). In one embodiment, a Video Presentation Application running at the mobile device may automatically and dynamically detect and identify the solid colored regions around the Presenter as background, and uses Chroma key color compositing to remove (or filter out) the background from the Presenter Video Feed, as illustrated, for example, in FIG. 42. In one embodiment, the Presenter may tap on the "Capture Presentation Background" button 4232 to cause the mobile device to capture an image of the backdrop (or portion thereof). Using the captured image, the system may automatically identify the color of the backdrop/background, and may use the identified backdrop color for performing "green screen" type Chroma key compositing operations relating to the video presentation.

Background Filtering Functionality.

In at least one embodiment, the Video Presentation System may be configured or designed to include Background Filtering functionality which may be used for implementing Chroma key compositing operations relating to the video presentation. For example, in one embodiment, the Presenter (or other person) may use the mobile device to take a picture of the background scene which will be behind the Presenter during the presentation. Using the captured background image, the system may automatically scan and/or identify visible features of the background image (e.g., colors, patterns, shading, shadows, etc.), and may automatically associate these identified visible features as "Presenter Background" content. Subsequently, when the Presenter is delivering his or her presentation, a Video Presentation Application running at the mobile device may automatically and dynamically detect and filter out the Presenter Background content portion(s) from the Presenter video feed.

Alternatively, in at least some embodiments, the Video Presentation System may be configured or designed to include automated facial recognition functionality which may be used for implementing Chroma key compositing operations relating to the video presentation. For example, in one embodiment, the automated facial recognition functionality may analyze the video content of the Presenter which has been captured by the mobile device's front camera video feed, and automatically identify the portions of content corresponding to the Presenter's face, head, hair, body, etc. Using this information, the system may also automatically identify other portions of content from the Presenter video feed (e.g., content other than the Presenter's face, head, hair, body, etc.) as "Presenter Background" content, and may automatically filter out the Presenter Background content portion(s) when generating the Presenter video feed.

Additionally, in at least some embodiments, the Video Presentation System may be configured or designed to utilize other techniques for automatically distinguishing between portions of content corresponding to the Presenter (e.g., the Presenter's face, head, hair, body, hands, etc.) and portions of content corresponding to Presenter Background content such as, for example, one or more of the following (or combinations thereof):

Using distance or camera focal length to distinguish between portions of content corresponding to the Presenter (e.g., the Presenter's face, head, hair, body, hands, etc.) and portions of content corresponding to Presenter Background.

Using motion to distinguish between portions of content corresponding to the Presenter (e.g., the Presenter's face, head, hair, body, hands, etc.) and portions of content corresponding to Presenter Background.

Using contrast differentiation to distinguish between portions of content corresponding to the Presenter (e.g., the Presenter's face, head, hair, body, hands, etc.) and portions of content corresponding to Presenter Background.

Etc.

Foreground/Background Identification Functionality.

In at least one embodiment, the Video Presentation System may be configured or designed to include functionality for enabling a user (e.g., Presenter) to provide input to the system for use in identifying foreground and/or background elements of the Presenter video feed. For example, in one embodiment, the mobile device may be configured to display a live or real-time version of the Presenter video feed, and the Presenter may tap on displayed elements of the Presenter video feed, and identify whether the identified elements are foreground or background. In some embodiments, the mobile device may be configured to display a recorded version of the Presenter video feed, and the Presenter may tap on displayed elements of the Presenter video feed, and identify whether the identified elements are foreground or background. In this way, the user is able to provide input to the system for use in identifying foreground and/or background elements of the Presenter video feed. In some embodiments, the Video Presentation System may be configured or designed to include artificial learning/intelligence capabilities for enabling the Video Presentation System to be trained to automatically identify and/or to learn detect and identify background elements of the Presenter video feed. Once the background elements have been identified by the system, the system may automatically and dynamically detect and filter out identified background elements from the Presenter video feed.

In at least some embodiments, some or all of the functions and/or features of the video presentation techniques described herein may be implemented via one or more applications running at the mobile device. For example, in some embodiments, a Video Presentation Application running on a mobile device may be configured or designed to cause the mobile device to execute machine readable instructions for implementing various types of functionality at the mobile device, including, for example, one or more of the following of (or combinations thereof):

Green Screen Functionality
  Foreground/Background Identification Functionality
  Background Filtering Functionality
  Multicast streaming functionality;
  And/or other types of video presentation functionality described and/or referenced herein.

Alternatively, in at least some embodiments, some or all of the functions and/or features of the video presentation techniques described herein may be implemented via one or more local and/or remote servers. For example, in some embodiments, the Video Presentation System may include a remote server which includes functionality for providing various types of functions and/or features of the video presentation techniques described herein, including, for example, one or more of the following of (or combinations thereof): Green Screen Functionality; Foreground/Background Identification Functionality; Background Filtering Functionality; and/or other types of video presentation functionality described and/or referenced herein. For example, in some embodiments, the mobile device may be configured or designed to stream video feeds of the Presenter (e.g., which includes Presenter Background content) and the presentation content to a remote presentation server. The remote presentation server may be configured or designed to include functionality for automatically facilitating, enabling, initiating, and/or performing one or more of the following operation(s), action(s), and/or feature(s) (or combinations thereof):

Identifying Presenter Background content in the Presenter Video feed, and automatically generating a filtered Presenter Video feed in which the Presenter Background content portion(s) has been filtered out.
  Generating a composite video presentation feed comprising a Chroma key composite video image of the filtered Presenter Video feed overlaid or superimposed over a portion of the Presentation Content feed.
  Simultaneously streaming the composite video presentation feed to a plurality of different end users.
  And/or other types of video presentation functionality described and/or referenced herein.

Figure 43:
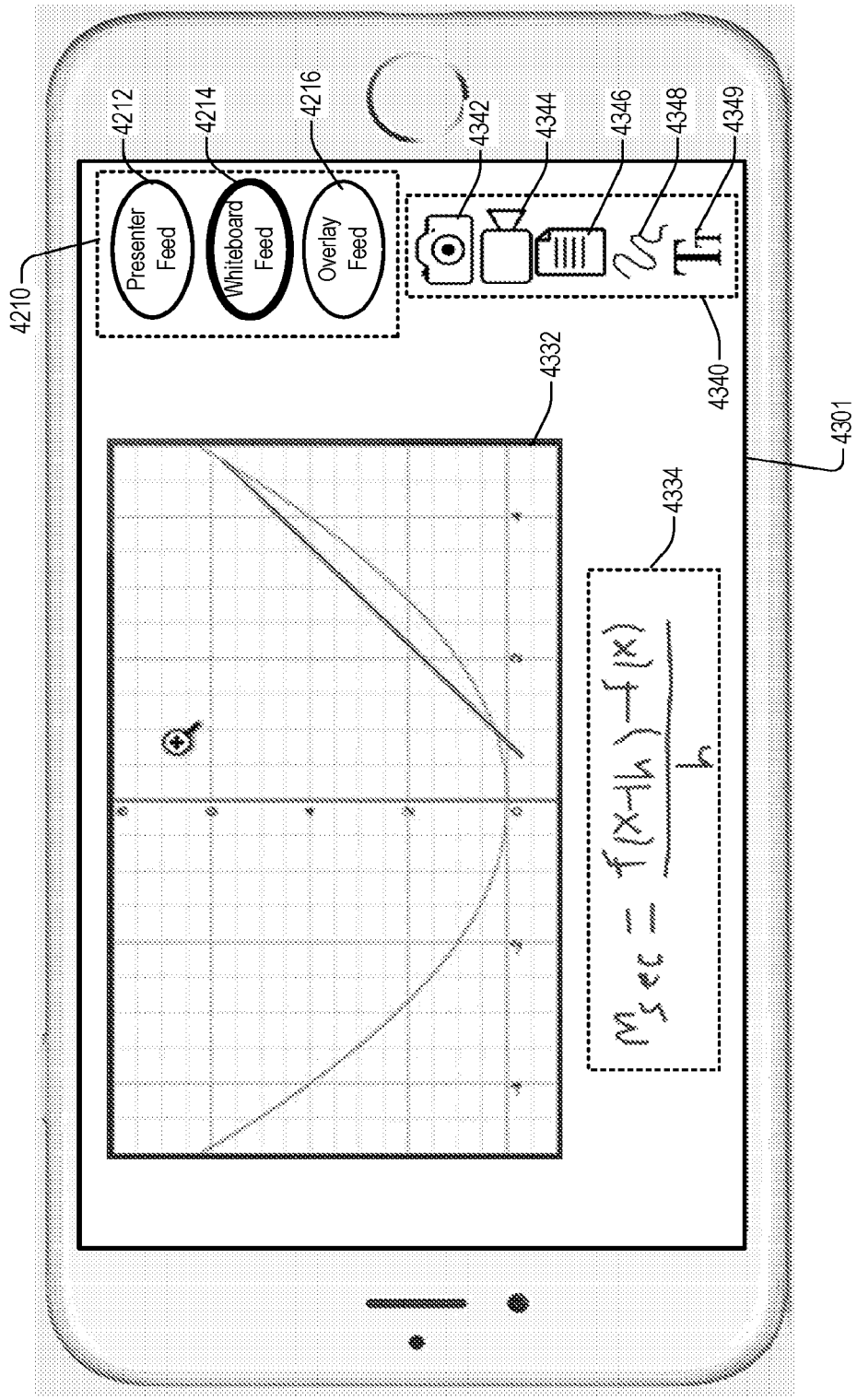

FIG. 43 illustrates an example screenshot of a graphical user interface (GUI) 4301 in which the Video Feed Selection GUI portion 4210 has been configured (e.g., via the user's input) to display a whiteboard video feed (e.g., presentation whiteboard video feed) on the mobile device display. According to different embodiments, the whiteboard video feed may be configured or designed to include various types of content from one or more different sources such as, for example, one or more of the following (or combinations thereof):

Image(s) captured by one of the mobile device's camera(s).
  Video feed captured by one of the mobile device's camera(s). For example, in one embodiment, a front camera of the mobile device may be used to capture a live (or recorded) Presenter video feed, while a rear camera of the mobile device may simultaneously be used to capture a live (or recorded) video feed of content which is to be displayed as part of the presentation whiteboard.
  Content (e.g., images, videos, files, graphs, documents, etc.) stored in the local memory of the mobile device.
  Content (e.g., images, videos, files, graphs, documents, etc.) accessed or retrieved from remote network devices.
  Content (e.g., images, videos, files, graphs, documents, etc.) produced by $3^{rd}$ party applications running on the mobile device.
  Content (e.g., images, videos, files, graphs, documents, etc.) generated using whiteboard presentation tools such as those illustrated, for example, in FIG. 43 (e.g., whiteboard presentation tools 4340, FIG. 9 (e.g., whiteboard presentation tools 910, 950), etc. For example, in at least one embodiment, a whiteboard editor GUI (e.g., having features similar to that of Interactive Whiteboard GUI 901 of FIG. 9) may be used to generate the graph 4332 which is displayed as part of the presentation whiteboard content of FIG. 43.
  Annotations made by the presenter or other persons. For example, in one embodiment, the Presenter may generate annotations to be displayed as part of the presentation whiteboard content by directly writing (e.g., via use of a stylus or finger) on the mobile device touch screen. This is illustrated, for example, by the hand-drawn equation shown at 4334 of FIG. 43.
  Digital feed(s) of the mobile device display and/or other display devices.
  And/or other types of content described and/or referenced herein.

As illustrated in the example embodiment of FIG. 43, GUI 4301 also includes a Whiteboard Presentation Tool GUI portion 4330 which may be configured or designed to include functionality for enabling the Presenter (or other user) to initiate or perform various types of actions and/or operations relating to the presentation whiteboard feed and associated content. For example, as illustrated in the example embodiment of FIG. 43, Whiteboard Presentation Tool GUI portion 4330 may include one or more of the following (or combinations thereof):

- Image-related Functionality (4342), such as, for example: using the mobile device to to access and/or capture image(s) to be displayed as a part of the presentation whiteboard content; inserting image(s) into the presentation whiteboard; editing images displayed (and/or to be displayed) at the presentation whiteboard; deleting images displayed at the presentation whiteboard; etc.
- Video-related Functionality (4344), such as, for example: using the mobile device to access and/or capture video(s) to be displayed as a part of the presentation whiteboard content; inserting video(s) into the presentation whiteboard; editing videos displayed (and/or to be displayed) at the presentation whiteboard; deleting videos displayed at the presentation whiteboard; etc.
- Document-related Functionality (4346), such as, for example: using the mobile device to generate and/or access document(s) to be displayed as a part of the presentation whiteboard content; inserting document(s) into the presentation whiteboard; editing documents displayed (and/or to be displayed) at the presentation whiteboard; deleting document(s) displayed at the presentation whiteboard; etc.
- Annotation-related Functionality (4348), such as, for example: using the mobile device to generate and/or access annotations(s) to be displayed as a part of the presentation whiteboard content; inserting annotation(s) into the presentation whiteboard; editing annotations displayed (and/or to be displayed) at the presentation whiteboard; deleting annotation(s) displayed at the presentation whiteboard; etc.
- Text-related Functionality (4349), such as, for example: using the mobile device to generate and/or access text to be displayed as a part of the presentation whiteboard content; inserting text into the presentation whiteboard; editing text displayed (and/or to be displayed) at the presentation whiteboard; deleting text displayed at the presentation whiteboard; etc.
- Equation-related Functionality, such as, for example: using the mobile device to generate and/or access equation(s) to be displayed as a part of the presentation whiteboard content; inserting equation(s) into the presentation whiteboard; editing equations displayed (and/or to be displayed) at the presentation whiteboard; deleting equation(s) displayed at the presentation whiteboard; etc.
- Graph-related Functionality, such as, for example: using the mobile device to generate and/or access graph(s) to be displayed as a part of the presentation whiteboard content; inserting graph(s) into the presentation whiteboard; editing graphs displayed (and/or to be displayed) at the presentation whiteboard; deleting graph(s) displayed at the presentation whiteboard; etc.
- Drawing-related Functionality, such as, for example: using the mobile device to generate and/or access drawing(s) to be displayed as a part of the presentation whiteboard content; inserting drawing(s) into the presentation whiteboard; editing drawings displayed (and/or to be displayed) at the presentation whiteboard; deleting drawing(s) displayed at the presentation whiteboard; etc.
- Chemistry-related Functionality, such as, for example: using the mobile device to generate and/or access chemical structure(s) to be displayed as a part of the presentation whiteboard content; inserting chemical structure(s) into the presentation whiteboard; editing chemical structures displayed (and/or to be displayed) at the presentation whiteboard; deleting chemical structure(s) displayed at the presentation whiteboard; etc.
- And/or other types of whiteboard-related functionality described and/or referenced herein.

Figure 44:
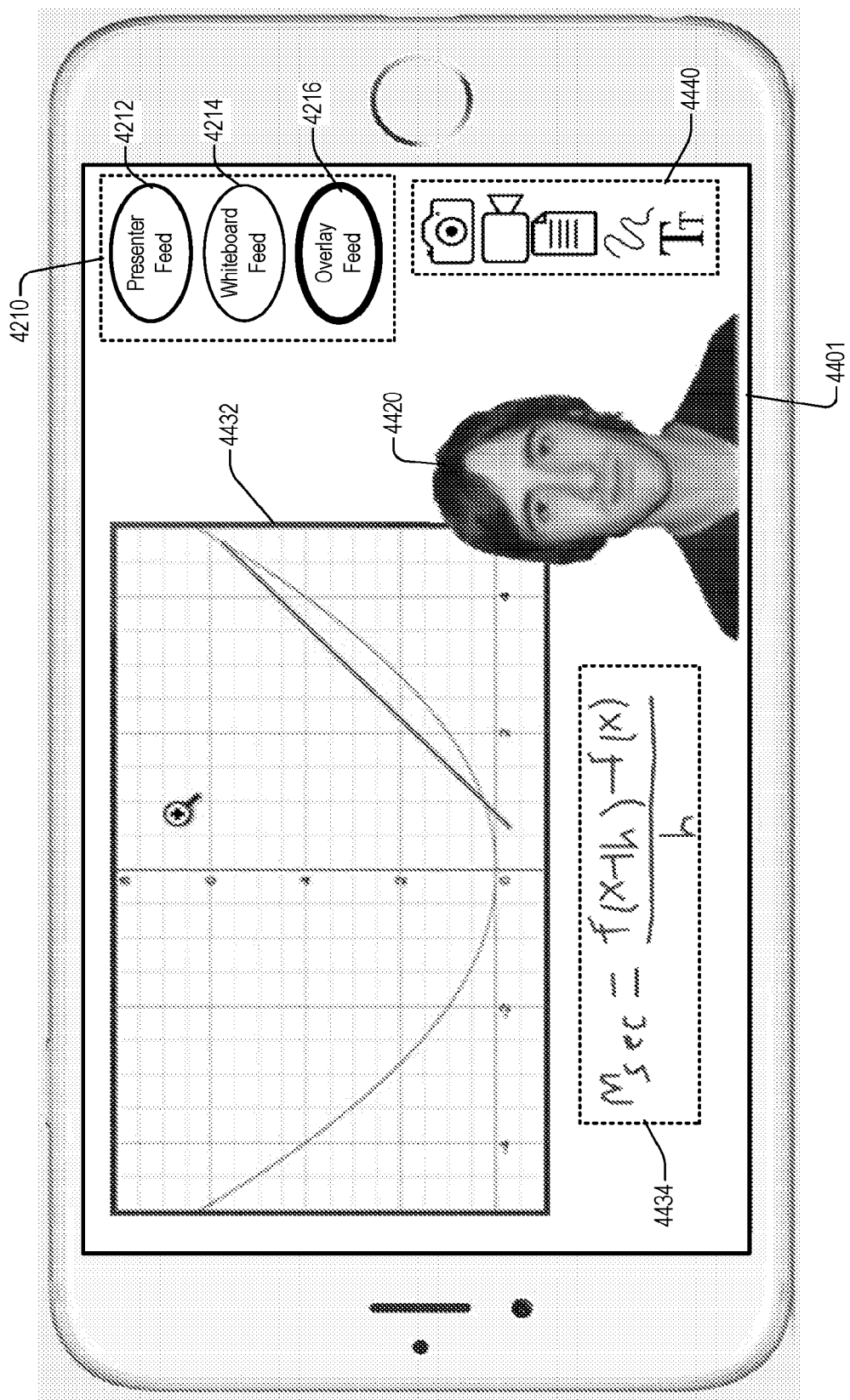

FIG. 44 illustrates an example screenshot of a graphical user interface (GUI) 4401 in which the Video Feed Selection GUI portion 4210 has been configured (e.g., via the user's input) to display an overlay video feed at the mobile device display. In at least one embodiment, the overlay video feed may be implemented as a Chroma key composite video feed of the Presenter video feed (e.g., 4420) which is superimposed or overlayed over the presentation whiteboard video feed (e.g., 4432, 4434), as illustrated, for example, in FIG. 44. In at least some embodiments, the selection of the video feed (e.g., initiated via video feed selection GUI portion 4210) may also be used to control the output video feed which is streamed to the end user(s).

As illustrated in the example embodiments of FIGS. 44-50, the overlay video feed may be configured or designed to be displayed as a "picture-in-picture" (PiP) video presentation, which, for example, may collectively and simultaneously display a Chroma key composite video feed of the Presenter video feed and presentation whiteboard video feed. According to different embodiments, examples of the different types of content which may be displayed as part of the presentation whiteboard video feed may include, but is not limited to, one or more of the following (or combinations thereof):

- manual/hand drawn notes;
- whiteboard canvas(es);
- annotations;
- text;
- animations;
- pictures, images or other graphical content;
- videos;
- spreadsheets;
- slide show;
- documents/content generated by computer software (such as, for example, Microsoft Word, Microsoft Power Point, etc.);
- etc.

Unlike conventional video presentation techniques, the displayed presentation content (whether it be a PowerPoint slide, an electronic whiteboard, an image of a physical document, an iPad display, graphics, etc.) is not projected onto a screen behind the Presenter, but rather, is presented via separate display layer (e.g., in real-time), concurrently with the display of the Presenter video feed. For example, as illustrated in the example embodiment of FIG. 44, the Presenter video feed (e.g., shown at 4420) is overlaid or superimposed (e.g., via a separate overlay layer) over the displayed content (e.g., 4432, 4434) of the presentation whiteboard feed. In at least some embodiments, the Presenter may swipe the mobile device touchscreen to cause (e.g., in real-time, while recording or streaming the video presentation) the displayed presentation whiteboard content to change. For example, the Presenter may swipe the mobile device touchscreen to advance a slide show, display a new photo, video or document, etc. In at least some embodiments, the modification of the presentation whiteboard content by the Presenter in this manner does not affect the displayed content of the Presenter video feed portion (e.g., 4420) of the overlay video feed.

Additionally, as illustrated in the example embodiment of FIG. 44, a Chroma key compositing technique may be used to enable the Presenter video feed to display only the superimposed image of the Presenter (e.g., 4420), without displaying any of the background scene (e.g. background scene behind the Presenter), and without displaying any other distracting images, objects or other content. In this way, the video presentation and digital compositing techniques described herein provide the benefit of significantly reducing or eliminating the "visual clutter" and unpleasant contrast, which typically accompanies conventional picture-in-picture displays.

In some embodiments, the video feed of the Presenter may be configured or designed to be displayed (e.g., at the end user's system) via an overlay layer (or overlay window), which is dynamically adjustable (e.g., by the end user) in size, position, transparency, etc. For example, as illustrated in the example screenshot GUIs of FIGS. 44-50, the user may select and move the Presenter overlay window (e.g., 4420) to a different desired location within the Video Presentation GUI, and/or may resize (e.g., reduce/enlarge) the Presenter image to make it larger (e.g., as illustrated in FIG. 48) or smaller (e.g., as illustrated in FIGS. 45, 46).

Additionally, as illustrated in the example screenshot GUIs of FIGS. 44-50, the displayed presentation whiteboard content/objects (e.g., 4432, 4434, etc.) may also dynamically adjustable (e.g., by the end user and/or by the Presenter) in size, position, transparency, etc. For example, as illustrated in the example screenshot GUIs of FIGS. 44-50, the user may move selected presentation whiteboard content/objects (e.g., 4432, 4434, etc.) to a different desired location within the Video Presentation GUI, and/or may resize (e.g., reduce/enlarge) selected presentation whiteboard content/objects to make them larger or smaller.

Figure 45:
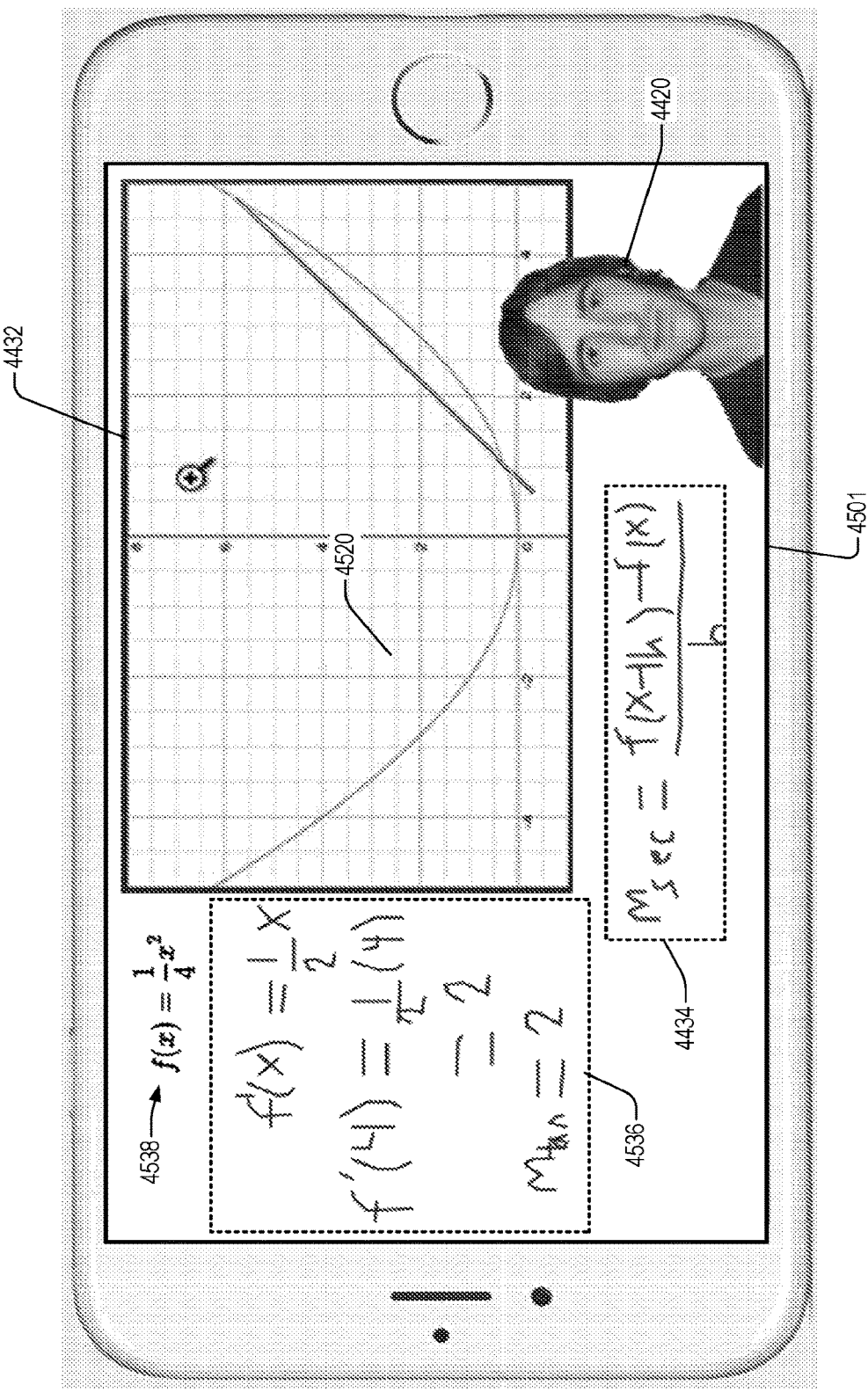
Figure 46:
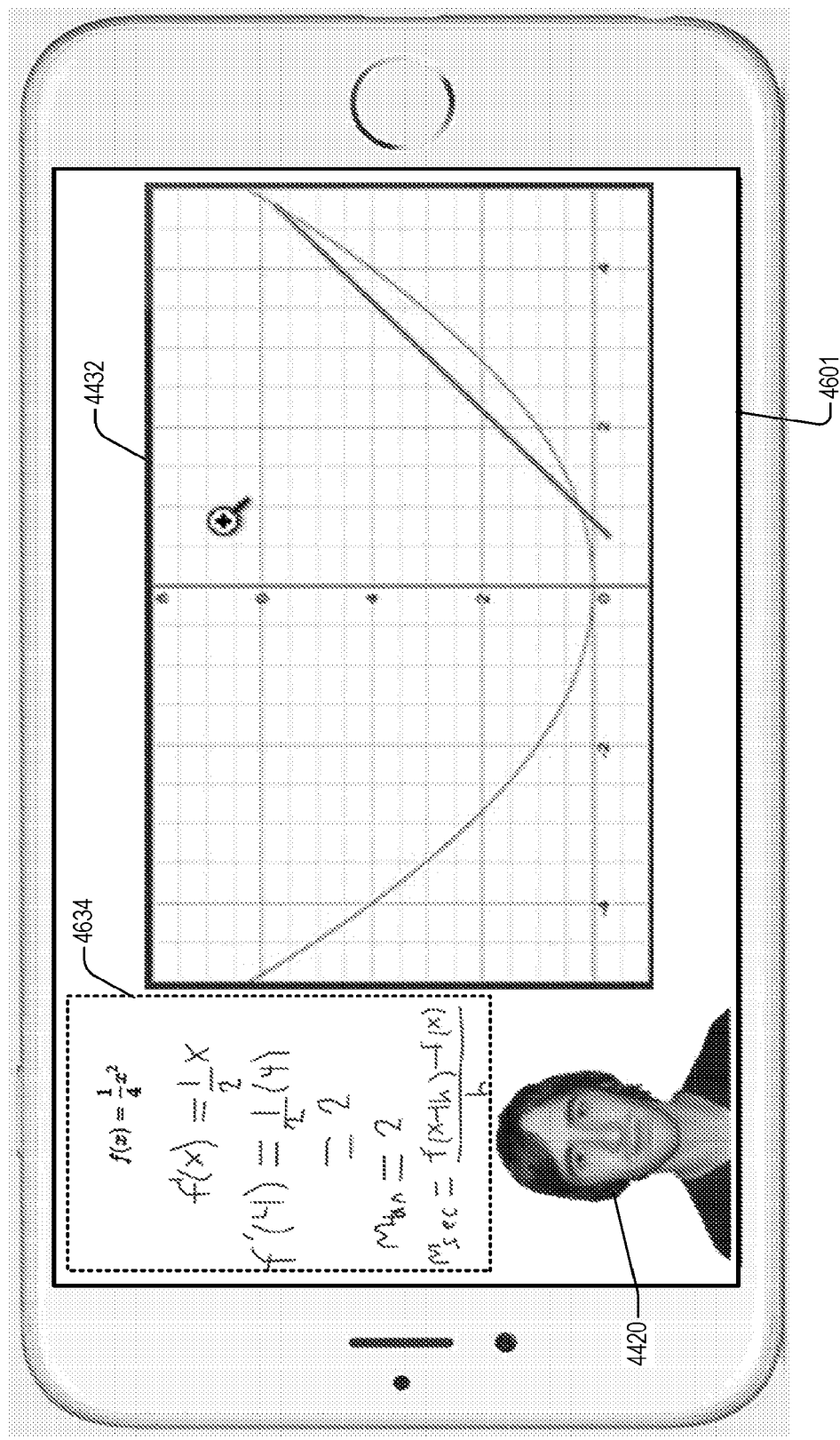

By way of illustration, starting with the Video Presentation GUI content and layout as shown in FIG. 44, a Presenter may elect to dynamically reconfigure (e.g., in real-time, while recording or streaming the video presentation) selected aspects of the layout and/or content of the Video Presentation GUI to cause the overlay presentation feed to appear as illustrated in the Video Presentation GUI 4501 of FIG. 45. In this particular example, the Presenter may initiate or perform (e.g., in real-time, while recording or streaming the video presentation) various operations to cause the overlay presentation feed to appear as illustrated in the Video Presentation GUI 4501 of FIG. 45, including, for example:

Resize and/or move the Presenter feed overlay (e.g., 4420).
Resize and/or move graph 4432.
Resize and/or move annotation content 4434.
Insert additional annotation content 4536.
Insert and position equation 4538.
Hide display of the Video Feed Selection GUI and Whiteboard Presentation Tool GUI.
Toggle presenter feed on/off during duration of recording or streaming
Etc.

In another example, the Presenter may elect to dynamically reconfigure (e.g., in real-time, while recording or streaming the video presentation) selected aspects of the layout and/or content of the Video Presentation GUI to cause the overlay presentation feed to appear as illustrated in the Video Presentation GUI 4601 of FIG. 46. In this particular example, the Presenter may initiate or perform (e.g., in real-time, while recording or streaming the video presentation) various operations to cause the overlay presentation feed to appear as illustrated in the Video Presentation GUI 4601 of FIG. 46, including, for example:

Resize and/or move the Presenter feed overlay (e.g., 4420).
Resize and/or move graph 4432.
Resize and/or move annotation content, equation content, etc. (e.g., 4634).
Toggle presenter feed on/off during duration of recording or streaming
Etc.

Figure 47:
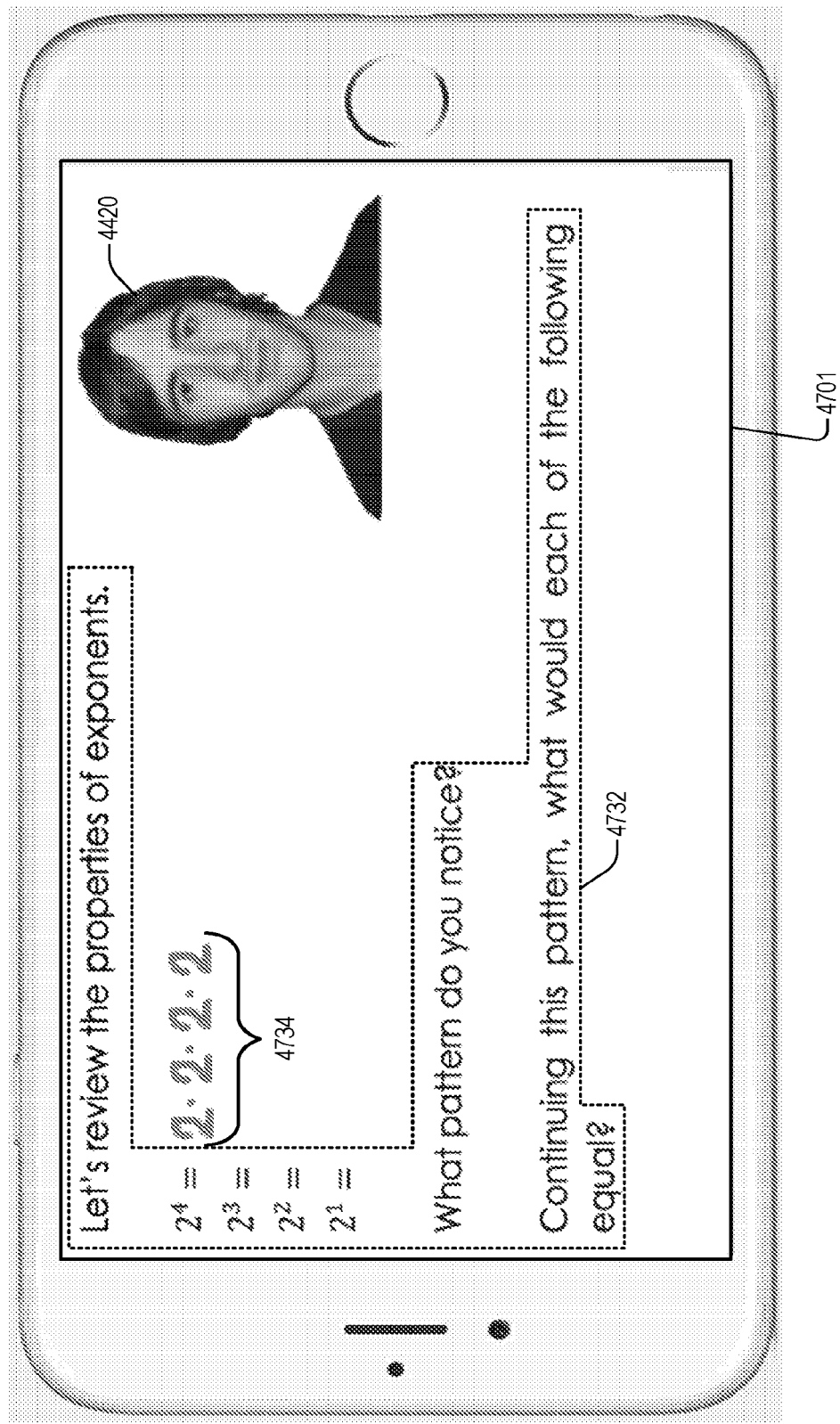
Figure 48:
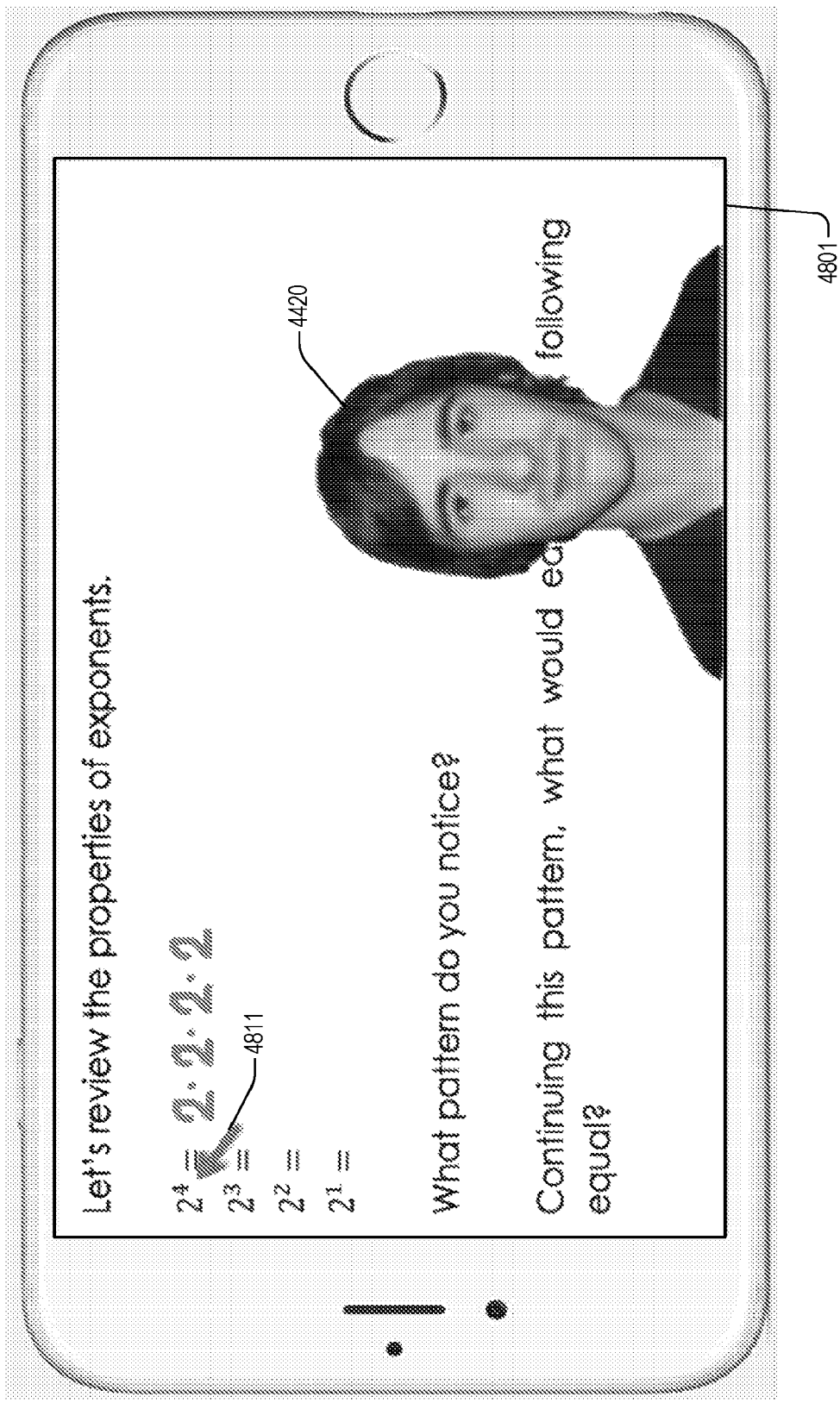

In a different example, the Presenter may elect to dynamically reconfigure (e.g., in real-time, while recording or streaming the video presentation) selected aspects of the layout and/or content of the Video Presentation GUI to cause the overlay presentation feed to appear as illustrated in the Video Presentation GUI 4701 of FIG. 47. In this particular example, the Presenter may initiate or perform (e.g., in real-time, while recording or streaming the video presentation) various operations to cause the overlay presentation feed to appear as illustrated in the Video Presentation GUI 4701 of FIG. 47, including, for example:

Remove previously displayed presentation whiteboard elements/content.
Resize and/or move the Presenter feed overlay (e.g., 4420).
Insert text content 4732. In one embodiment, the user may access text editor functionality for generating and inserting text content 4732 into the electronic presentation whiteboard. In other embodiments, the displayed text content 4732 may correspond to a portion of a document or image (e.g., snapshot of textbook page) which has been inserted (or copied and pasted) into the electronic presentation whiteboard.
Insert additional annotation content 4734.
Etc.

In the specific example embodiment of FIG. 48, it is assumed that the Presenter has enlarged and moved the Presenter feed overlay 4420. Additionally, it is assumed in this example that the Presenter has enabled display and use of a presentation pointer (4811). In some embodiments, the Presenter may operate and control the presentation pointer (e.g., in real-time, while recording or streaming the video presentation) via hand/finger gestures performed on the mobile device touchscreen display. In other embodiments, the Presenter may operate and control the presentation pointer (e.g., in real-time, while recording or streaming the video presentation) via use of a wireless mouse pointer or other wireless device.

Figure 49:
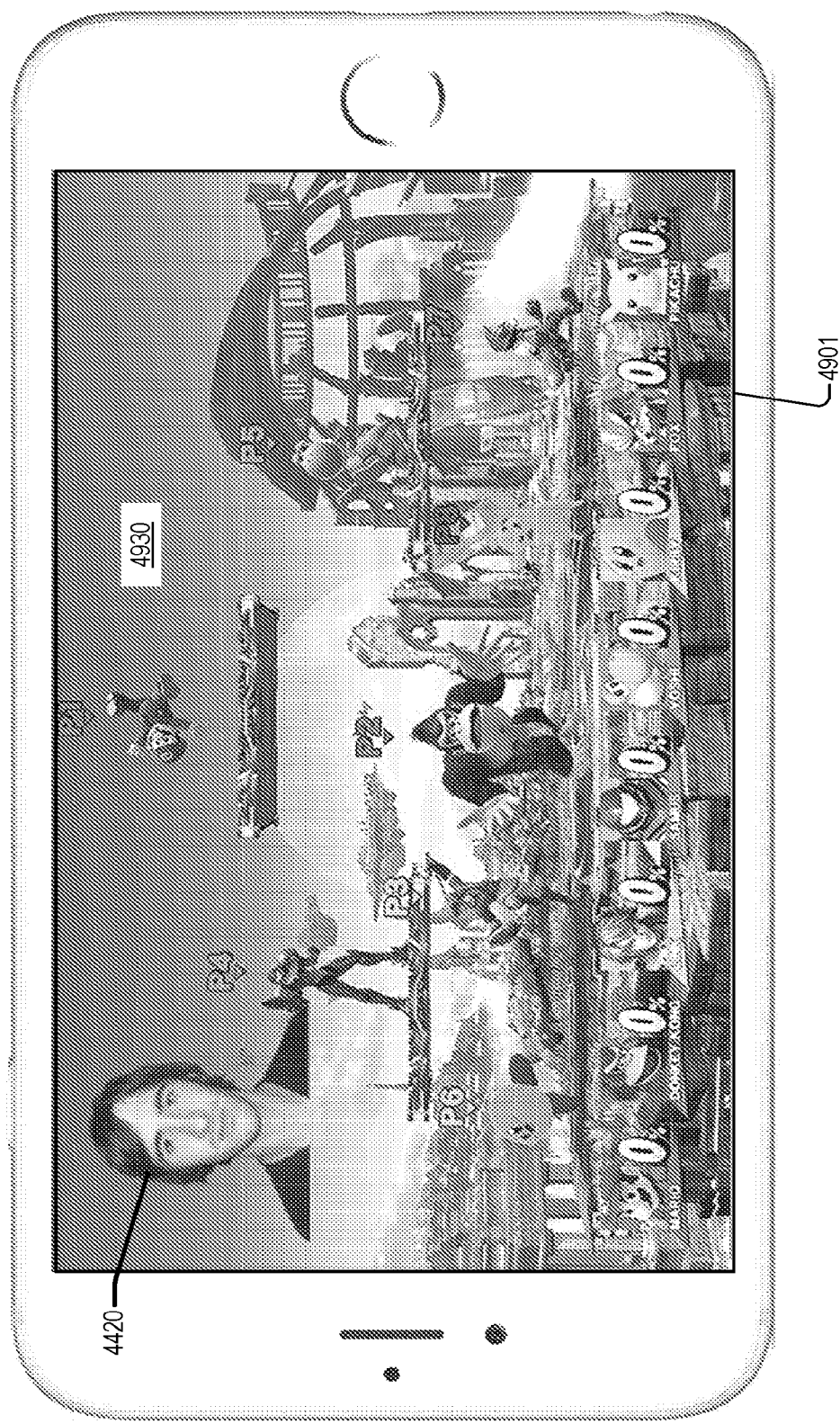
Figure 50:
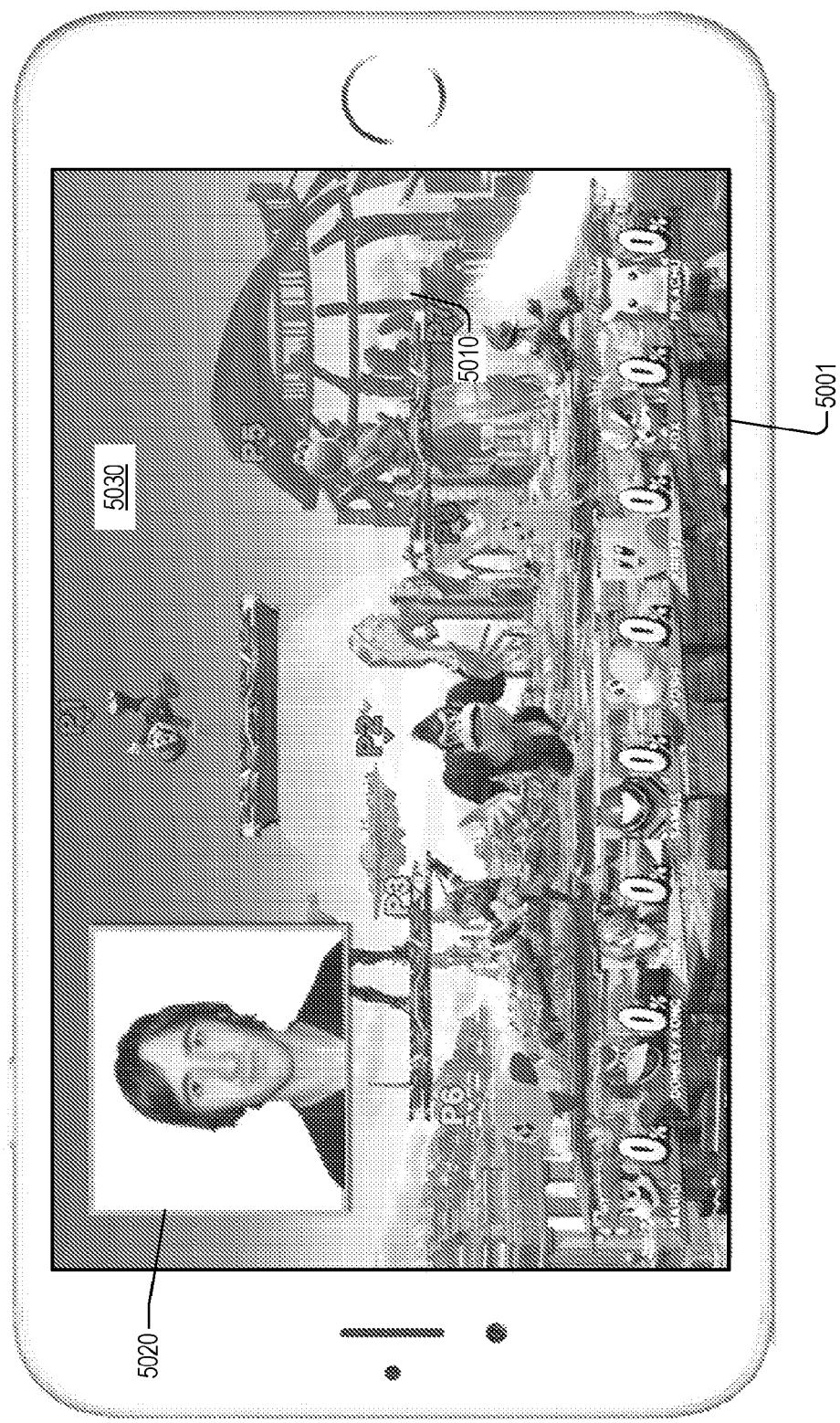

FIG. 49 illustrates an example screenshot of an overlay video feed which is displayed via the mobile device display. In the specific example of FIG. 49, it is assumed that the Presenter desires to use his mobile device to conduct a streamed video presentation of himself as he is playing a video game on the mobile device. As part of the streamed video presentation, the Presenter wants viewers to be able to see the video game graphics/content, and also to see the Presenter's face and facial expressions as he plays the video game (e.g., in real-time).

Accordingly, the Presenter may dynamically configure selected aspects of the layout and/or content of the Video Presentation GUI to cause the overlay presentation feed to appear as illustrated in the Video Presentation GUI 4901 of FIG. 49. As illustrated in the example embodiment of FIG. 49, the Presenter video feed portion (e.g., 4420) is superimposed or overlayed over a presentation background feed (e.g., 4930) which, in this particular example, has been configured to display a video game feed of a video game application running at the mobile device. According to different embodiments, the displayed video game content may be generated by a video game application running at the mobile device and/or running on a remote server. In some embodiments, the video game feed may be generated in real-time, as the Presenter is playing the video game. In other embodiments, the video game feed may be generated using one or more pre-recorded video clip(s) of the video game display.

In at least one embodiment, the Presenter video feed portion (e.g., 4420) may be superimposed over the presentation background feed (e.g., 4930) using Chroma key compositing technique(s) described and/or referenced herein. In other embodiments, as illustrated, for example, in the Video Presentation GUI 5001 of FIG. 50, the Presenter video feed portion may be superimposed or overlayed over the presentation background feed 5030 using a picture-in-picture overlay window (e.g., 5020).

According to different embodiments, the video presentation system may be configured or designed to include functionality for simultaneously or concurrently multicasting multiple feeds of a mobile video presentation to a plurality of end users. For example, in one embodiment, the video presentation feed(s) generated at the mobile device may be transmitted to one or more local and/or remote server(s) which include functionality for simultaneously or concurrenly multicasting multiple feeds of a mobile video presentation to a plurality of end users. In other embodiments, the mobile device may be configured or designed to include functionality for simultaneously or concurrently multicasting (e.g., from the mobile device) multiple feeds of a mobile video presentation to a plurality of end users.

Picture-in-Picture (PIP) Applications

In addition to educational video presentations, various aspects and features of the video presentation and digital compositing techniques described herein may also be advantageously employed in video display techniques utilizing Picture-in-Picture (PIP) technology, such as, for example, television displays, video streaming displays, and/or other display systems utilizing Picture-in-Picture (PIP) technology.

Figure 26:
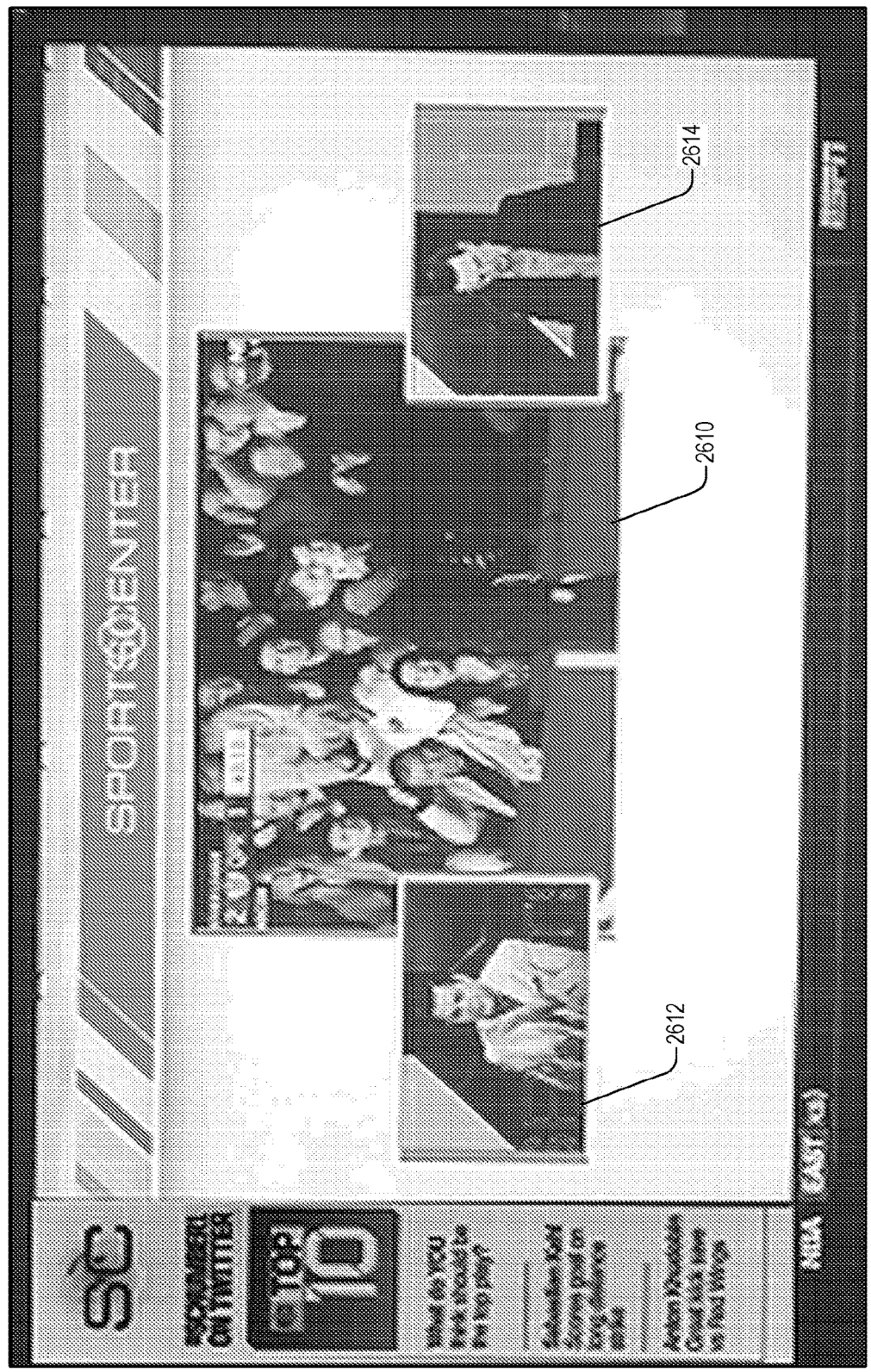
FIGS. 26 and 28 illustrate example screenshots of conventional Picture-in-Picture (PiP) display techniques.
Figure 28:

For example, FIGS. 26 and 28 illustrate example screenshot embodiments of currently existing Picture-in-Picture (PIP) display techniques. More specifically, FIG. 26 shows an example screenshot of a sports-related web page 2600 which has been configured or designed to display a main video presentation window 2610 and separate PiP commentator windows 2612, 2614, wherein each PiP commentator window may include a video feed of a respectively different commentator who may be commenting on the activity displayed within the main video presentation window, and/or may be participating in a discussion with other commentator(s) displayed via other PiP commentator windows of the web page 2600. A viewer wishing to observe and follow along with the various activities occurring on the web page 2600 may be required to continually shift his or her focus and/or attention from one of the displayed video windows (e.g., 2610, 2612, 2614) to another. As a result, the viewer's eye never quite knows where to "rest". Additionally, as illustrated in the example embodiment of FIG. 26, the content displayed in each PiP commentator window includes not only an image of the commentator, but also unnecessarily includes distracting background images and/or scenery which is viewable behind the commentator.

Figure 27:
FIGS. 27 and 29 illustrate example screenshot embodiments of Picture-in-Picture (PiP) configurations utilizing various inventive PiP display techniques disclosed herein.

In contrast, FIG. 27 illustrates an alternate example screenshot embodiment of a similar sports-related web page, in which features of the video presentation and digital compositing techniques described herein are utilized to generate and display new and improved Picture-in-Picture (PiP) window configurations (e.g., 2712, 2714). As illustrated in the example embodiment of FIG. 27, the sports-related web page 2700 has been configured or designed to display a main video presentation window 2710 and separate digitally composite PiP commentator "windows" or overlay regions 2712, 2714. In at least one embodiment, each digitally composite PiP commentator region may be configured or designed to display a respective video feed of a respectively different commentator who may be commenting on the activity displayed within the main video presentation window, and/or may be participating in discussions with other commentator(s) displayed via other digitally composite PiP commentator windows of the web page 2700. As illustrated in the example embodiment of FIG. 27, the content displayed in each digitally composite PiP commentator region (e.g., 2712, 2714) includes only the image of the commentator, and omits display of the distracting background images/scenery behind the commentator. Using the digitally composite PiP display techniques illustrated in FIG. 27, a viewer will have an easier time in observing and following along with the activities and discussions occurring on the web page 2700 (as compared to that of FIG. 26).

FIG. 28 shows an example screenshot of a PiP television display 2800 having a primary display window 2810 for displaying TV content (e.g., police drama) associated with a first TV channel, and having a PiP window 2820 for displaying different TV content (e.g., tennis match) associated with a different TV channel. While, this type of PiP configuration may be useful for displaying non-synchronized dual-channel presentations, there are numerous drawbacks and disadvantages for using this type of PiP configuration for displaying educational video presentations and/or other types of synchronized dual-channel presentations, as discussed previously herein. as illustrated in the example embodiment of FIG. 28, a person is watching the police drama, and can glance at the tennis match intermittently (for instance, to see the score). One channel does not add nor detract from the other. In educational videos, having the PIP block a portion of the underlying screen content may be detrimental to the student and/or educational experience.

Figure 29:
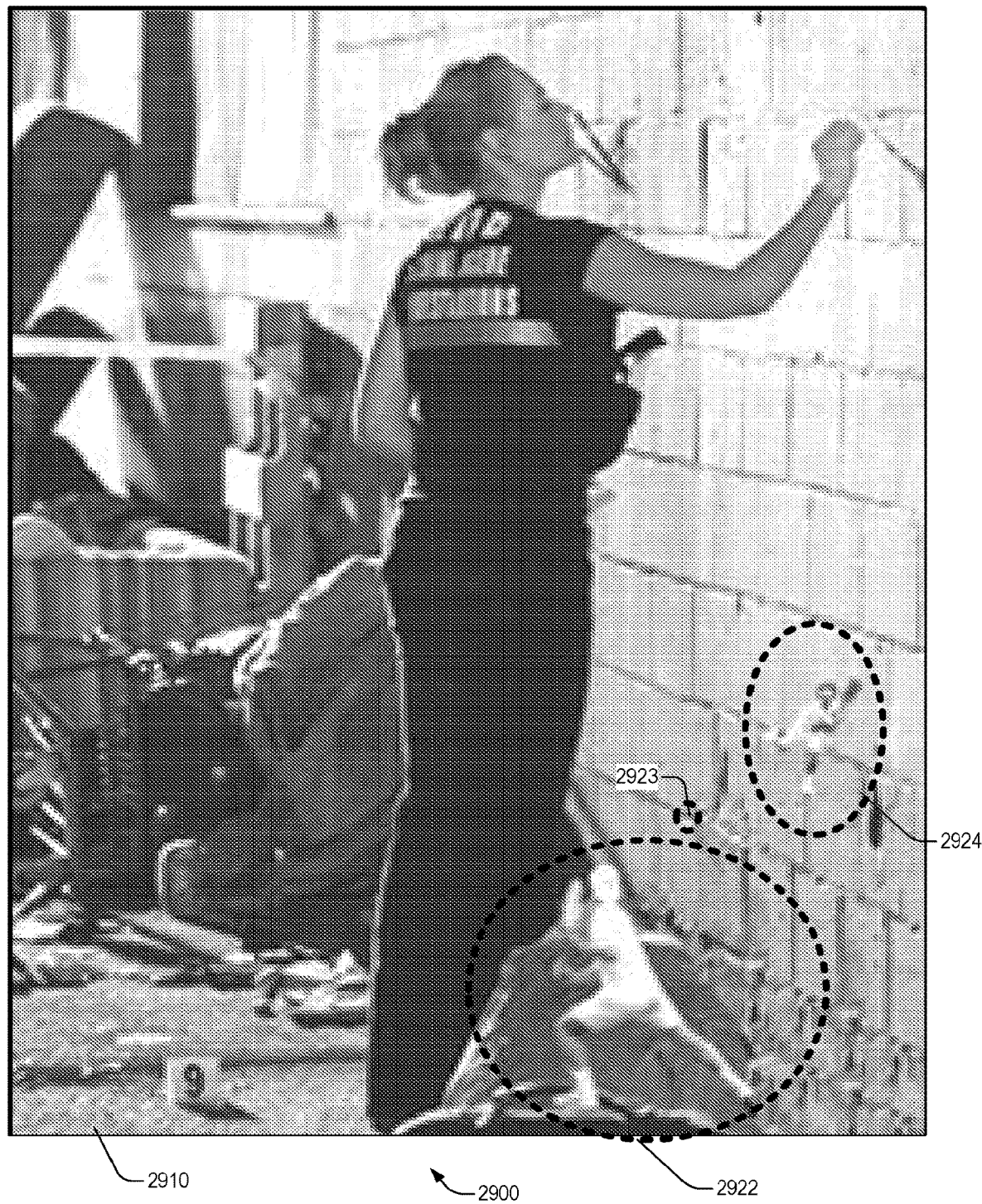

FIG. 29 illustrates an alternate example screenshot embodiment of a PiP television display, in which features of the video presentation and digital compositing techniques described herein are utilized to generate and display a digitally composite Picture-in-Picture (PiP) window configuration having a primary display window 2910 for displaying TV content (e.g., police drama) associated with a first TV channel, and having a digitally composite PiP portions (e.g., 2922, 2923, 2924) for displaying filtered portions of TV content (e.g., players of a tennis match) associated with a different TV channel. In at least one embodiment, each digitally composite PiP region (e.g., 2922, 2923, 2924) may be configured or designed to display only filtered portions of content (such as, for example, people, moving objects, etc.) derived from the broadcast or streamed content of a given TV channel (or other video source). Additionally, as illustrated in the example embodiment of FIG. 29, the filtered content displayed in the digitally composite PiP regions (e.g., 2922, 2923, 2924) may deliberately omit display of unwanted or distracting images/scenery.

Figure 2:
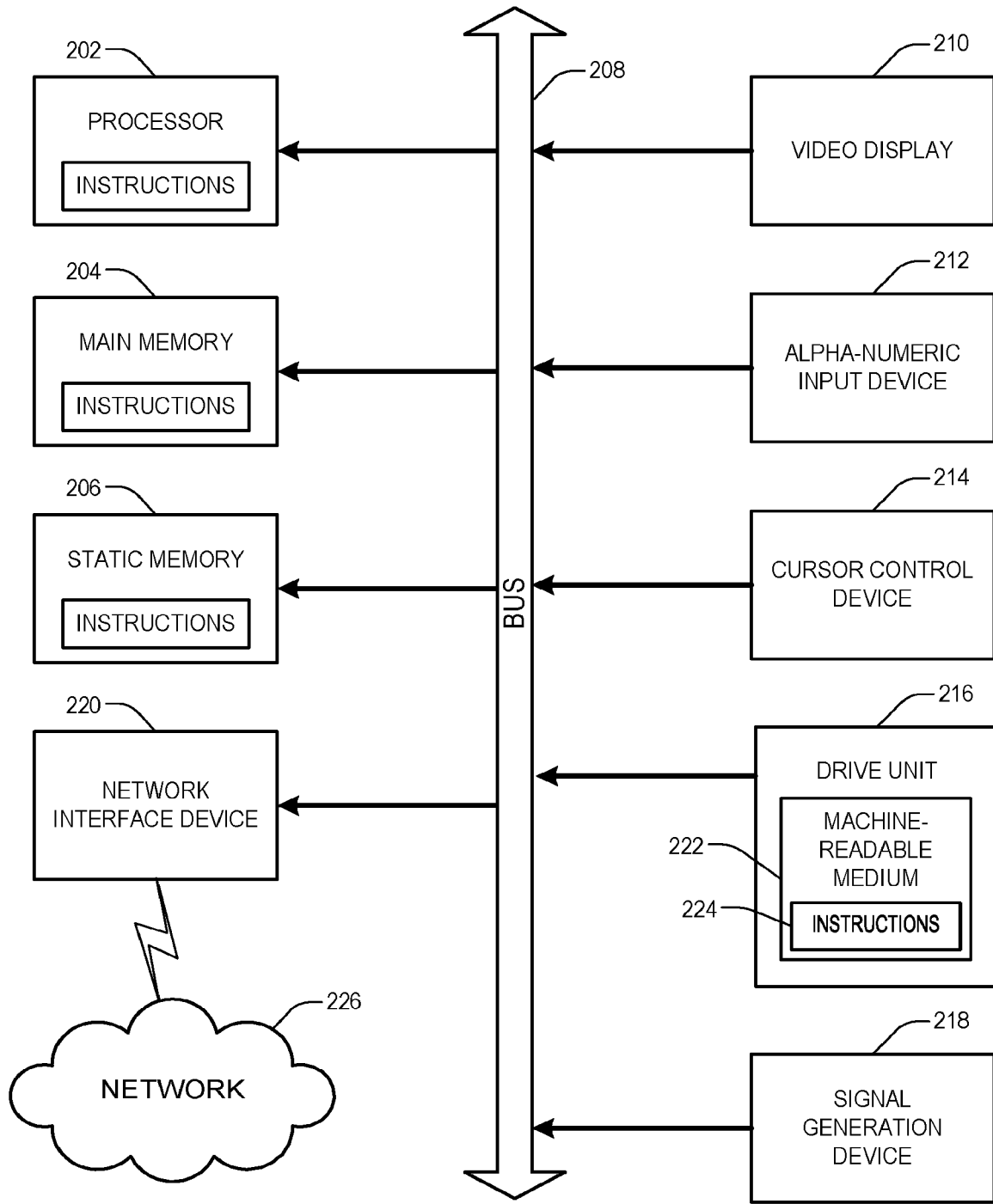
FIG. 2 shows a diagrammatic representation of machine in the exemplary form of a client (or end user) computer system.

FIG. 2 shows a diagrammatic representation of machine in the exemplary form of a client (or end user) computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a Presenter) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and annotations/drawings are to be regarded in an illustrative rather than a restrictive sense.

According to various embodiments, Client Computer System 200 may include a variety of components, modules and/or systems for providing various types of functionality. For example, in at least one embodiment, Client Computer System 200 may include a web browser application which is operable to process, execute, and/or support the use of scripts (e.g., JavaScript, AJAX, etc.), Plug-ins, executable code, virtual machines, HTML5 vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

UI Components such as those illustrated, described, and/or referenced herein.

Database Components such as those illustrated, described, and/or referenced herein.

Processing Components such as those illustrated, described, and/or referenced herein.

Other Components which, for example, may include components for facilitating and/or enabling the Client Computer System to perform and/or initiate various types of Online Social Education operations, activities, and functions such as those described herein.

Figure 3:
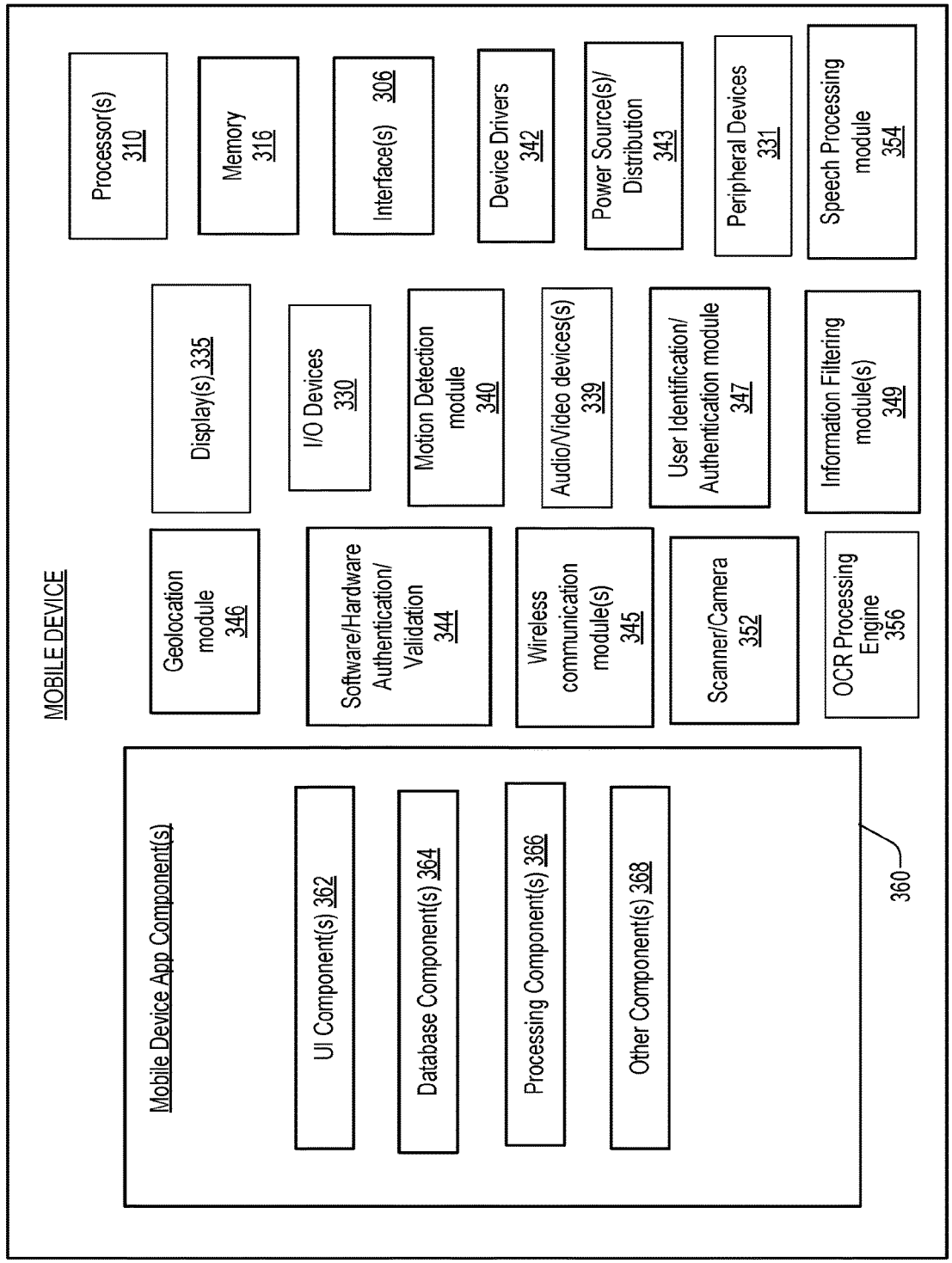
FIG. 3 is a simplified block diagram of an example client system in accordance with a specific embodiment.

FIG. 3 is a simplified block diagram of an example client system 300 in accordance with a specific embodiment. In at least one embodiment, the client system may include Online Social Education Mobile Device App Component(s) which have been configured or designed to provide functionality for enabling or implementing at least a portion of the various online social education and video presentation techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

Processor(s) 310
Device Drivers 342
Memory 316
Interface(s) 306
Power Source(s)/Distribution 343
Geolocation module 346
Display(s) 335
I/O Devices 330
Audio/Video devices(s) 339
Peripheral Devices 331
Motion Detection module 340
User Identification/Authentication module 347
Mobile Device App Component(s) 360
UI Component(s) 362
Database Component(s) 364
Processing Component(s) 366
Software/Hardware Authentication/Validation 344
Wireless communication module(s) 345
Information Filtering module(s) 349
Speech Processing module 354
Scanner/Camera 352

OCR Processing Engine 356 etc.

As illustrated in the example of FIG. 3 Mobile Device 300 may include a variety of components, modules and/or systems for providing various functionalities. For example, as illustrated in FIG. 3, Mobile Device 300 may include Mobile Device Application components (e.g., 360), which, for example, may include, but are not limited to, one or more of the following (or combinations thereof):

UI Components 362 such as those illustrated, described, and/or referenced herein.

Database Components 364 such as those illustrated, described, and/or referenced herein.

Processing Components 366 such as those illustrated, described, and/or referenced herein.

Other Components 368 which, for example, may include components for facilitating and/or enabling the Mobile Device to perform and/or initiate various types of Online Social Education operations, activities, and functions such as those described herein.

In at least one embodiment, the Mobile Device Application component(s) may be operable to perform and/or implement various types of Online Social Education/Interactive Study Wall functions, operations, actions, and/or other features such as, for example, one or more of those described and/or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, etc. (or combinations thereof) described and/or referenced herein.

According to different embodiments, one or more different threads or instances of the Mobile Device Application component(s) may be initiated in response to detection of one or more conditions or events satisfying one or more different types of minimum threshold criteria for triggering initiation of at least one Online Social Education feature, action or operation of the Mobile Device Application component(s). Various examples of conditions or events, which may trigger initiation and/or implementation of one or more different threads or instances of the Mobile Device Application component(s), may include, but are not limited to, one or more types of conditions and/or events described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more different types of data, metadata, and/or other information described and/or referenced herein.

According to different embodiments, Mobile Device 300 may further include, but is not limited to, one or more of the following types of components, modules and/or systems (or combinations thereof):

At least one processor 310. In at least one embodiment, the processor(s) 310 may include one or more commonly known CPUs, which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 316, which, for example, may include volatile memory (e.g., RAM), non-volatile memory (e.g., disk memory, FLASH memory, EPROMs, etc.), unalterable memory, and/or other types of memory. In at least one implementation, the memory 316 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various online social education and video presentation techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the online social education and video presentation techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 306 which, for example, may include wired interfaces and/or wireless interfaces. In at least one implementation, the interface(s) 306 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 342. In at least one implementation, the device driver(s) 342 may include functionality similar to at least a portion of functionality implemented by one or more computer system driver devices such as those described herein and/or generally known to one having ordinary skill in the art.

At least one power source (and/or power distribution source) 343. In at least one implementation, the power source may include at least one mobile power source (e.g., battery) for allowing the client system to operate in a wireless and/or mobile environment. For example, in one implementation, the power source 343 may be implemented using a rechargeable, thin-film type battery. Further, in embodiments where it is desirable for the device to be flexible, the power source 343 may be designed to be flexible.

Geolocation module 346 which, for example, may be configured or designed to acquire geolocation information from remote sources and use the acquired geolocation information to determine information relating to a relative and/or absolute position of the client system.

Motion detection component 340 for detecting motion or movement of the client system and/or for detecting motion, movement, gestures and/or other input data from user. In at least one embodiment, the motion detection component 340 may include one or more motion detection sensors such as, for example, MEMS (Micro Electro Mechanical System) accelerometers, that can detect the acceleration and/or other movements of the client system as it is moved by a user.

User Identification/Authentication module 347. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 335. According to various embodiments, such display(s) may be implemented using, for example, LCD display technology, OLED display technology, and/or other types of conventional display technology. In at least one implementation, display(s) 335 may be adapted to be flexible or bendable. Additionally, in at least one embodiment the information displayed on display(s) 335 may utilize e-ink technology (such as that available from E Ink Corporation, Cambridge, Mass., www.eink.com), or other suitable technology for reducing the power consumption of information displayed on the display(s) 335.

One or more user I/O Device(s) 330 such as, for example, keys, buttons, scroll wheels, cursors, touchscreen sensors, audio command interfaces, magnetic strip reader, optical scanner, etc.

Audio/Video device(s) 339 such as, for example, components for recording, editing, and/or displaying audio/visual media which, for example, may include cameras, Presenters, microphones, media presentation components, wireless transmitter/receiver devices for enabling wireless audio and/or visual communication between the client system 300 and remote devices (e.g., radios, telephones, computer systems, etc.). For example, in one implementation, the audio system may include componentry for enabling the client system to function as a cell phone or two-way radio device.

Other types of peripheral devices 331 which may be useful to the users of various client systems, such as, for example: PDA functionality; memory card reader(s); fingerprint reader(s); image projection device(s); social networking peripheral component(s); etc.

Information filtering module(s) 349, which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 349 may also be adapted to display, in real-time, filtered information to the user based upon a variety of criteria such as, for example, geolocation information, contextual activity information, and/or other types of filtering criteria described and/or referenced herein.

Wireless communication module(s) 345. In one implementation, the wireless communication module 345 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 344 which, for example, may be used for authenticating and/or validating local hardware and/or software components, hardware/software components residing at a remote device, game play information, wager information, user information and/or identity, etc.

Scanner/Camera Component(s) (e.g., 352) which may be configured or designed for use in scanning identifiers and/or other content from other devices and/or objects such as for example: mobile device displays, computer displays, static displays (e.g., printed on tangible mediums), etc.

OCR Processing Engine (e.g., 356) which, for example, may be operable to perform image processing and optical character recognition of images such as those captured by a mobile device camera, for example.

Speech Processing module (e.g., 354) which, for example, may be operable to perform speech recognition, and may be operable to perform speech-to-text conversion. Etc.

Figure 4:
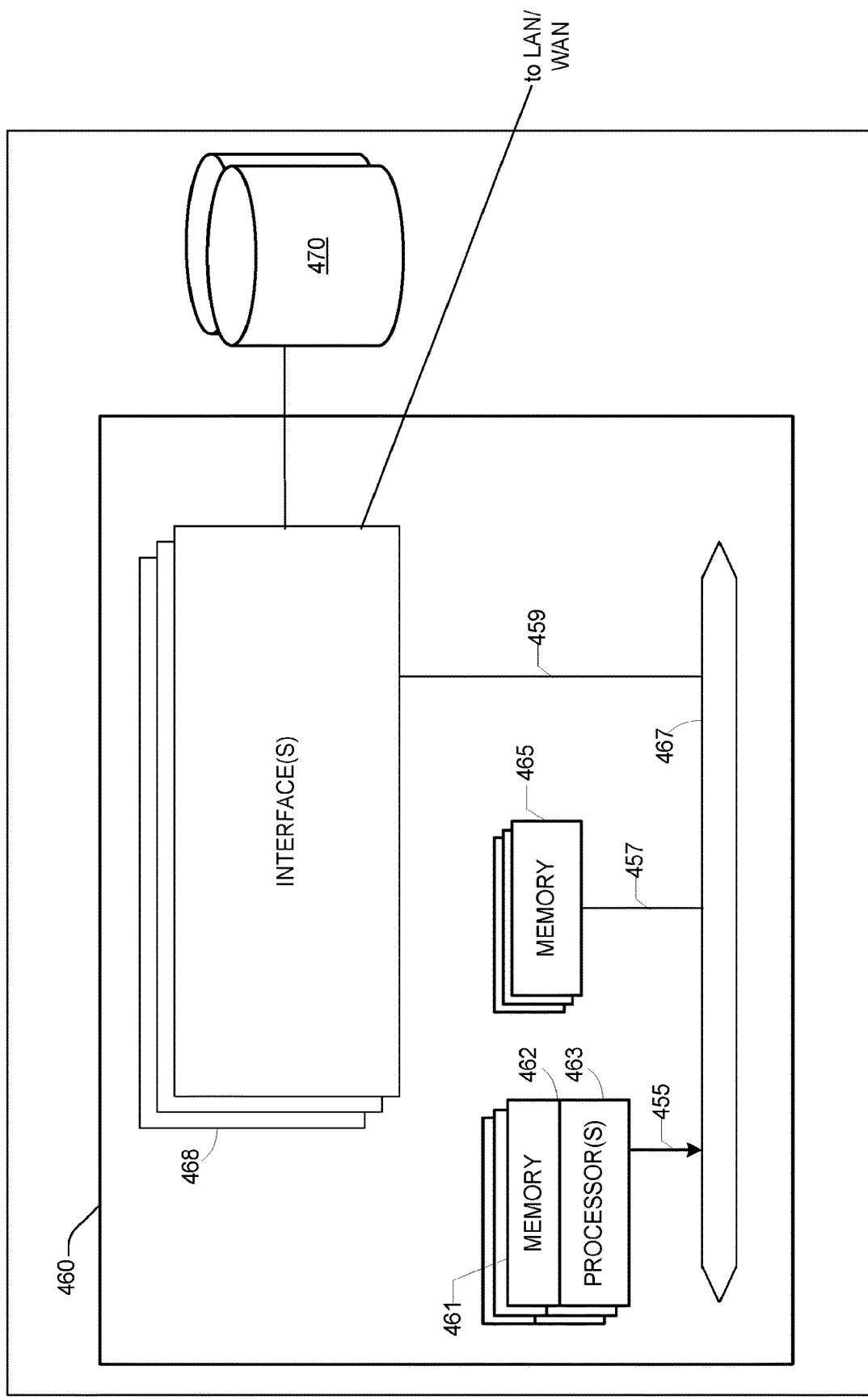
FIG. 4 illustrates an example embodiment of a server system, which may be used for implementing various aspects/features described herein.

FIG. 4 illustrates an example embodiment of a server system 480 which may be used for implementing various aspects/features described herein. In at least one embodiment, the OCD server system 480 includes at least one network device 460, and at least one storage device 470 (such as, for example, a direct attached storage device). In one embodiment, server system 480 may be suitable for implementing at least some of the online social education and video presentation techniques described herein.

In according to one embodiment, network device 460 may include a master central processing unit (CPU) 462, interfaces 468, and a bus 467 (e.g., a PCI bus). When acting under the control of appropriate software or firmware, the CPU 462 may be responsible for implementing specific functions associated with the functions of a desired network device. For example, when configured as a server, the CPU 462 may be responsible for analyzing packets; encapsulating packets; forwarding packets to appropriate network devices; instantiating various types of virtual machines, virtual interfaces, virtual storage volumes, virtual appliances; etc. The CPU 462 preferably accomplishes at least a portion of these functions under the control of software including an operating system (e.g. Linux), and any appropriate system software (such as, for example, AppLogic™ software).

CPU 462 may include one or more processors 463 such as, for example, one or more processors from the AMD, Motorola, Intel and/or MIPS families of microprocessors. In an alternative embodiment, processor 463 may be specially designed hardware for controlling the operations of server system 480. In a specific embodiment, a memory 461 (such as non-volatile RAM and/or ROM) also forms part of CPU 462. However, there may be many different ways in which memory could be coupled to the OSES Server. Memory block 461 may be used for a variety of purposes such as, for example, caching and/or storing data, programming instructions, etc.

The interfaces 468 may be typically provided as interface cards (sometimes referred to as "line cards"). Alternatively, one or more of the interfaces 468 may be provided as on-board interface controllers built into the OSES Server motherboard. Generally, they control the sending and receiving of data packets over the network and sometimes support other peripherals used with the OCD server system 480. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™) 802.16 (WiMax) interfaces, 802.22 interfaces, Cellular standards such as CDMA Interfaces, CDMA2000 interfaces, WCDMA Interfaces, TDMA Interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

In at least one embodiment, some interfaces may be configured or designed to allow the OCD server system 480 to communicate with other network devices associated with various local area network (LANs) and/or wide area networks (WANs). Other interfaces may be configured or designed to allow network device 460 to communicate with one or more direct attached storage device(s) 470.

Although the OSES Server shown in FIG. 4 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 465, which, for example, may include random access memory (RAM)) configured to store data, program instructions for the general-purpose network operations and/or other information relating to the functionality of the various online social education and video presentation techniques described herein. The program instructions may control the operation of an operating system and/or one or more applications, for example. The memory or memories may also be configured to store data structures, and/or other specific non-program information described herein.

Because such information and program instructions may be employed to implement the OSES Servers/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as optical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 5:
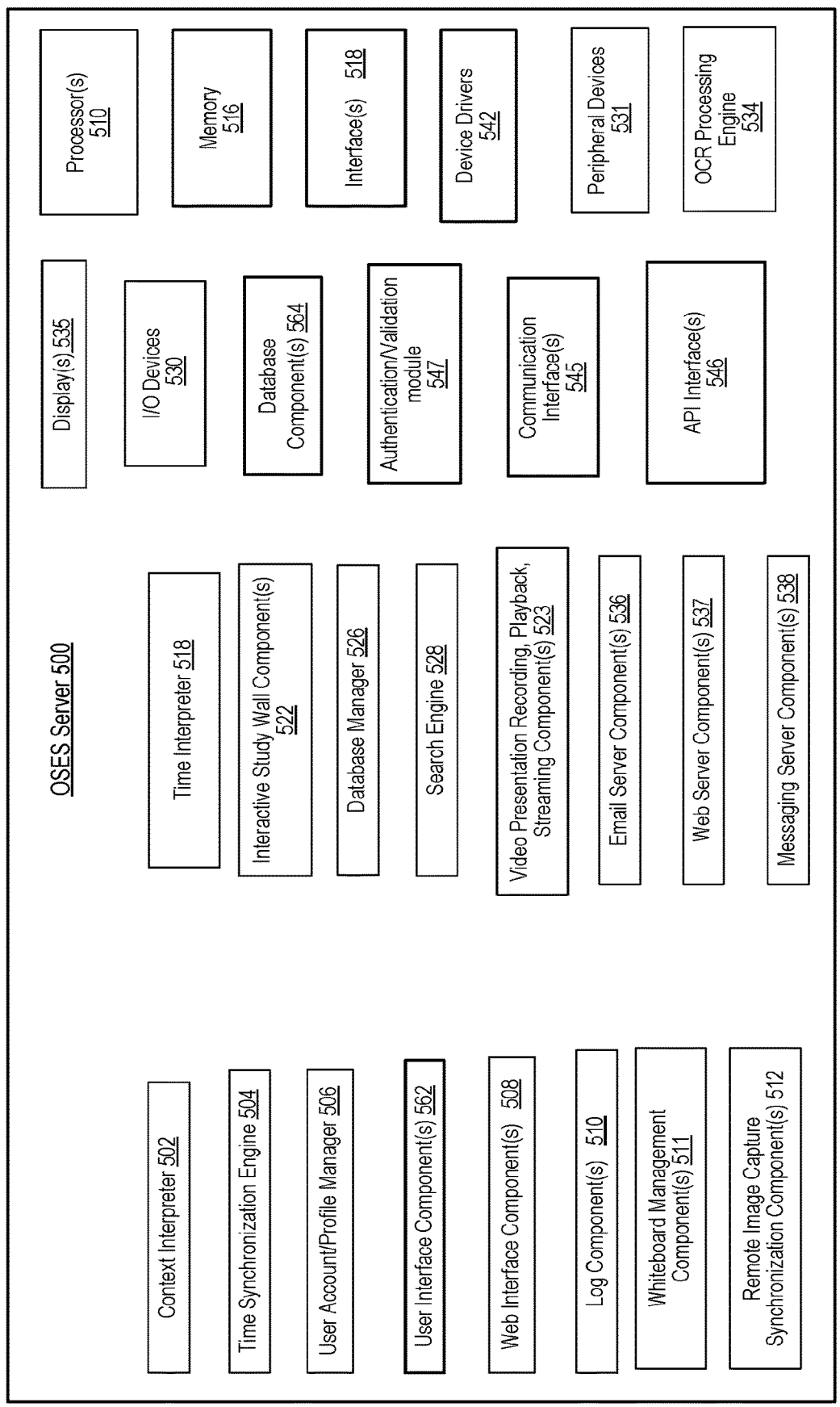
FIG. 5 illustrates an example of a functional block diagram of an Online Social Education System in accordance with a specific embodiment.

FIG. 5 illustrates an example of a functional block diagram of an Online Social Education System in accordance with a specific embodiment.

In at least one embodiment, the Online Social Education System may be operable to perform and/or implement various types of Online Social Education functions, operations, actions, and/or other features, such as, for example, one or more of those described and/or referenced herein.

In at least one embodiment, the Online Social Education System may include a plurality of components operable to perform and/or implement various types of Online Social Education functions, operations, actions, and/or other features such as, for example, one or more of the following (or combinations thereof):

Context Interpreter (e.g., 502) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):
  location-based criteria (e.g., geolocation of client device, geolocation of agent device, etc.)
  time-based criteria
  identity of user(s)
  user profile information
  transaction history information
  recent user activities
  proximate business-related criteria (e.g., criteria which may be used to determine whether the client device is currently located at or near a recognized business establishment such as a bank, gas station, restaurant, supermarket, etc.)
  etc.
Time Synchronization Engine (e.g., 504) which, for example, may be operable to manages universal time synchronization (e.g., via NTP and/or GPS)
Search Engine (e.g., 528) which, for example, may be operable to search for transactions, logs, items, accounts, options in the Online Social Education databases
Configuration Engine (e.g., 532) which, for example, may be operable to determine and handle configuration of various customized configuration parameters for one or more devices, component(s), system(s), process(es), etc.
Time Interpreter (e.g., 518) which, for example, may be operable to automatically and/or dynamically modify or change identifier activation and expiration time(s) based on various criteria such as, for example, time, location, transaction status, etc.
Authentication/Validation Component(s) (e.g., 547) (password, software/hardware info, SSL certificates) which, for example, may be operable to perform various types of authentication/validation tasks such as, for example, one or more of the following (or combinations thereof):
  verifying/authenticating devices,
  verifying/authenticating users,
  verifying passwords, passcodes, SSL certificates, biometric identification information, and/or other types of security-related information
  verify/validate activation and/or expiration times
  etc.
In one implementation, the Authentication/Validation Component(s) may be adapted to determine and/or authenticate the identity of the current user or client system. For example, in one embodiment, the current user may be required to perform a log in process at the mobile client system in order to access one or more features. In some embodiments, the mobile client system may include biometric security components which may be operable to validate and/or authenticate the identity of a user by reading or scanning The user's biometric information (e.g., fingerprints, face, voice, eye/iris, etc.). In at least one implementation, various security features may be incorporated into the mobile client system to prevent unauthorized users from accessing confidential or sensitive information.
  Interactive Study Wall Component(s) (e.g., 522) which, for example, may be operable to perform and/or implement various types of Interactive Study Wall functions, operations, actions, and/or other features, such as, for example, one or more of those described and/or referenced herein.
  White Board Management Component(s) (e.g., 511) which, for example, may be operable to perform and/or implement various types of whiteboard functions, operations, actions, and/or other features, such as, for example, one or more of those described and/or referenced herein.
  Video Presentation Recording, Playback, Streaming Component(s) 523, which, for example, may be operable to facilitate, enable, initiate, and/or perform one or more of the operation(s), action(s), and/or feature(s) relating to the video presentation and digital compositing techniques described herein.
  OCR Processing Engine (e.g., 534) which, for example, may be operable to perform image processing and optical character recognition of images such as those captured by a mobile device camera, for example.
  Database Manager (e.g., 526) which, for example, may be operable to handle various types of tasks relating to database updating, database management, database access, etc.
  Log Component(s) (e.g., 510) which, for example, may be operable to generate and manage transactions history logs, system errors, connections from APIs, etc.
  Web Interface Component(s) (e.g., 508) which, for example, may be operable to facilitate and manage communications and transactions with Online Social Education web portal(s).
  API Interface(s) (e.g., 546) which, for example, may be operable to facilitate and manage communications and transactions with API Interface(s) to Online Education Server System(s) and/or other system(s)/network(s).
  OCR Processing Engine (e.g., 534) which, for example, may be operable to perform image processing and optical character recognition of images such as those captured by a mobile device camera, for example.
  At least one processor 510. In at least one embodiment, the processor(s) 510 may include one or more commonly known CPUs, which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.
  Memory 516, which, for example, may include volatile memory (e.g., RAM), non-volatile memory (e.g., disk memory, FLASH memory, EPROMs, etc.), unalterable memory, and/or other types of memory. In at least one implementation, the memory 516 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the Online Social Education System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 518, which, for example, may include wired interfaces and/or wireless interfaces. In at least one implementation, the interface(s) 518 may include functionality similar to at least a portion of functionality implemented by one or more computer system interfaces such as those described herein and/or generally known to one having ordinary skill in the art.

Device driver(s) 542. In at least one implementation, the device driver(s) 542 may include functionality similar to at least a portion of functionality implemented by one or more computer system driver devices such as those described herein and/or generally known to one having ordinary skill in the art.

One or more display(s) 535. According to various embodiments, such display(s) may be implemented using, for example, LCD display technology, OLED display technology, and/or other types of conventional display technology. In at least one implementation, display(s) 535 may be adapted to be flexible or bendable. Additionally, in at least one embodiment the information displayed on display(s) 535 may utilize e-ink technology (such as that available from E Ink Corporation, Cambridge, Mass., www.eink.com), or other suitable technology for reducing the power consumption of information displayed on the display(s) 535.

Email Server Component(s) 536, which, for example, may be configured or designed to provide various functions and operations relating to email activities and communications.

Web Server Component(s) 537, which, for example, may be configured or designed to provide various functions and operations relating to web server activities and communications.

Messaging Server Component(s) 538, which, for example, may be configured or designed to provide various functions and operations relating to text messaging and/or other social network messaging activities and/or communications.

Etc.

OCD Features/Functionality

Although many of the example embodiments and screenshot GUIs described above have been directed to specific embodiments relating to Interactive Study Wall posts, it will be appreciated that many of the Online Social Education System techniques described herein may also be applied to other types of online, collaborative educational environments such as, for example, webinars, audio/video chat rooms, video whiteboards, video conferences, online forums, online presentations, online collaborative tutorial sessions, and the like. For example, as described in greater detail herein, features and functionality relating to the Online Education techniques described herein may be implemented and/or utilized in other types of online, collaborative educational environments including, for example, webinars, audio/video chat rooms, video conferences, online forums, online collaborative tutorial sessions, online presentations, and the like.

For reference purposes, such other online collaborative educational environments may collectively be referred to as Online Collaborative Discussion (OCD) Environments (or OCD Rooms). According to different embodiments, various different types of OCD Rooms may be hosted by the Online Social Education System and/or 3rd party entities (such as, for example, Webex, Adobe Connect, Skype, etc.). Additionally, one or more of the various OCD Rooms may include functionality for providing Whiteboard GUIs, and/or for hosting collaborative whiteboard forums.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

I claim:

1. A video presentation production system comprising:
a background having a planar surface;
a first video camera configured to capture a live video image of a presenter delivering a live presentation in front of said background, said first video camera having a field of view that does not include objects other than said presenter and said background, said first video camera producing a presenter video feed;
a second video camera configured to capture a live video image of displayed content associated with said live presentation to produce a presentation video feed, wherein said second video camera is above said field of view and out of said field of view of said first video camera, and wherein said displayed content and said first video camera are aligned along a plane perpendicular to said planar surface;
a video presentation server including at least one processor and a memory, said video presentation server being communicatively coupled to said first video camera and to said second video camera and receiving said presenter video feed and said presentation video feed, said video presentation server being operable to cause said at least one processor to execute a plurality of instructions stored in said memory to (i) generate, from said presenter video feed and said presentation video feed using a compositing technique, a synchronized video presentation media stream in real time or near real time while said presenter is delivering said live presentation, such that only said live video image of said presenter from said presenter video feed is superimposed over a portion of said live image of displayed content, and (ii) record or stream said synchronized video presentation media stream; and a confidence monitor being physically positioned adjacent to or behind said first video camera that receives and displays said synchronized video presentation media stream from said video presentation server, such that said presenter is able to concurrently view, while delivering said live presentation, said synchronized video presentation media stream displayed on said confidence monitor while maintaining substantially continuous eye contact with said first video camera.

2. A video presentation production system as recited in claim 1 wherein said live video image of displayed content occupies an entire display window of said confidence monitor.

3. A video presentation production system as recited in claim 1 wherein said live video image of displayed content occupies an entire display window of a user computer.

4. A video presentation production system as recited in claim 1 wherein said video presentation server being further operable to stream said synchronized video presentation media stream to at least one user computer.

5. A video presentation production system as recited in claim 4 wherein said synchronized video presentation media is streamed to said at least one user computer in real time during said live presentation.

6. A video presentation production system as recited in claim 1 wherein said video presentation server being further operable to record said synchronized video presentation media stream in a memory of a computer.

7. A video presentation production system as recited in claim 1 wherein said compositing technique is a Chroma key compositing technique.

8. A video presentation production system as recited in claim 1 further comprising:
a remote controller configured to control said confidence monitor based upon input received from said presenter while maintaining said eye contact with said first video camera, wherein said remote controller causes said confidence monitor to display at least said synchronized video presentation media stream based on said received input.

9. A video presentation production system as recited in claim 1 further comprising:
a remote annotation device operable by said presenter and configured to enable said presenter to selectively add annotations to said presentation video feed while said presenter is delivering said live presentation, wherein said video presentation server is configured to include said annotations in said synchronized video presentation media stream.

10. A video presentation production system as recited in claim 1 wherein said displayed content also includes a live video image of an electronic whiteboard, a tablet computer, a video, or a document generated by computer software.

11. A video presentation production system as recited in claim 1 wherein said video presentation server is located remote from said presenter.

12. A video presentation production system as recited in claim 1 wherein said live video image of displayed content does not include said video presentation server.

13. A video presentation production system as recited in claim 1 wherein said displayed content does not originate from a computing device.

14. A video presentation production system as recited in claim 1 wherein said displayed content is located directly below said field of view of said first video camera.

15. A video presentation production system as recited in claim 14 wherein said displayed content does not originate from a computing device.

16. A video presentation production system as recited in claim 1 wherein said second video camera is aligned along said plane perpendicular to said background.

17. A video presentation production system as recited in claim 1 wherein said second video camera is communicatively coupled to said video presentation server via an HDMI cable.

18. A video presentation production system as recited in claim 17 wherein said second video camera has a power cable separate from said HDMI cable.

19. A video presentation production system as recited in claim 1 wherein said confidence monitor is larger than, separate from, and not integrated with said first video camera.

20. A video presentation production system as recited in claim 1 wherein said confidence monitor is at least three times wider than a width of said first video camera.

21. A video presentation production system as recited in claim 1 wherein said displayed content does not include a wired or wireless connection to said video presentation server.

22. A video presentation production system as recited in claim 1 wherein said synchronized video presentation media stream includes an image of said presenter looking straight downward from said presenter video feed.

23. A video presentation production system as recited in claim 22 wherein said synchronized video presentation media stream includes concurrently said image of said presenter looking straight downward and an image of a portion of a hand of said presenter or an instrument held in said hand from said presentation video feed.

24. A video presentation production system as recited in claim 1 wherein said synchronized video presentation media stream includes concurrently an image of said presenter looking straight downward from said presenter video feed and an image of a portion of a hand of said presenter or an instrument held in said hand from said presentation video feed that is touching an object on, or writing on, annotating or pointing to, said displayed content.

25. A method for displaying a synchronized video presentation media stream, said method comprising:
receiving a presenter video feed in real time or near real time while a presenter is delivering a live presentation, said presenter video including a live video image of said presenter in front of a background having a planar surface delivering said live presentation captured via a first video camera, said first video camera having a field of view that does not include objects other than said presenter and said background;
receiving a presentation video feed captured via a second video camera, said presentation video feed including a live video image of displayed content associated with said live presentation, wherein said second video camera is above said field of view and out of said field of view of said first video camera, and wherein said displayed content and said first video camera are aligned along a plane perpendicular to said planar surface;
generating, via at least one processor using (i) said presenter video feed and (ii) said presentation video feed using a compositing technique, a synchronized video presentation media stream of said live presentation in real time or near real time while said presenter is delivering said live presentation, such that only said live video image of said presenter from said presenter video feed is superimposed over a portion of said live image of displayed content;

recording or streaming said synchronized video presentation media stream;

arranging a confidence monitor adjacent to or behind said first video camera; and displaying said synchronized video presentation media stream on said confidence monitor such that said presenter is able to concurrently view, while delivering said live presentation, said synchronized video presentation media stream displayed on said confidence monitor while maintaining substantially continuous eye contact with said first video camera.

26. A method as recited in claim 25 further comprising: streaming said synchronized video presentation media stream to at least one user computer.

27. A method as recited in claim 26 further comprising: streaming said synchronized video presentation media stream to said at least one user computer in real time during said live presentation.

28. A method as recited in claim 25 further comprising: recording said synchronized video presentation media stream in a memory of a computer.

29. A method as recited in claim 25 wherein said compositing technique is a Chroma key compositing technique.

30. A method as recited in claim 25 wherein said second video camera is above said displayed content and out of said field of view of said first video camera.

31. A method as recited in claim 25 further comprising: configuring a remote controller to control said confidence monitor based upon input received from said presenter while maintaining said eye contact with said first video camera, wherein said remote controller causes said confidence monitor to display at least said synchronized video presentation media stream based on said received input.

32. A method as recited in claim 25 further comprising: configuring a remote annotation device to enable said presenter to selectively add annotations to said presentation video feed while said presenter is delivering said live presentation, wherein said annotations are included in said synchronized video presentation media stream.

33. A method as recited in claim 25 wherein said displayed content also includes a live video image of an electronic whiteboard, a tablet computer, a video, or a document generated by computer software.

34. A method as recited in claim 25 wherein a video presentation server performs said generating and is located remote from said presenter.

35. A method as recited in claim 25 wherein said live video image of displayed content does not include said video presentation server.

36. A method as recited in claim 25 wherein said displayed content does not originate from a computing device.

37. A method as recited in claim 25 wherein said displayed content is located directly below said field of view of said first video camera.

38. A method as recited in claim 37 wherein said displayed content does not originate from a computing device.

39. A method as recited in claim 25 wherein said second video camera is aligned along said plane perpendicular to said background.

40. A method as recited in claim 25 wherein a video presentation server performs said generating and wherein said second video camera is communicatively coupled to said video presentation server via an HDMI cable.

41. A method as recited in claim 40 wherein said second video camera has a power cable separate from said HDMI cable.

42. A method as recited in claim 25 wherein said confidence monitor is larger than, separate from, and not integrated with said first video camera.

43. A method as recited in claim 25 wherein said confidence monitor is at least three times wider than a width of said first video camera.

44. A method as recited in claim 25 wherein a video presentation server performs said generating and wherein said displayed content does not include a wired or wireless connection to said video presentation server.

45. A method as recited in claim 25 wherein said synchronized video presentation media stream includes an image of said presenter looking straight downward from said presenter video feed.

46. A method as recited in claim 45 wherein said synchronized video presentation media stream includes concurrently said image of said presenter looking straight downward and an image of a portion of a hand of said presenter or an instrument held in said hand from said presentation video feed.

47. A method as recited in claim 25 wherein said synchronized video presentation media stream includes concurrently an image of said presenter looking straight downward from said presenter video feed and an image of a portion of a hand of said presenter or an instrument held in said hand from said presentation video feed that is touching an object on, or writing on, annotating or pointing to, said displayed content.

* * * * *